US011494973B2

(12) United States Patent
Boyadzhiev et al.

(10) Patent No.: US 11,494,973 B2
(45) Date of Patent: Nov. 8, 2022

(54) GENERATING FLOOR MAPS FOR BUILDINGS FROM AUTOMATED ANALYSIS OF VISUAL DATA OF THE BUILDINGS' INTERIORS

(71) Applicant: Zillow, Inc., Seattle, WA (US)

(72) Inventors: Ivaylo Boyadzhiev, Seattle, WA (US); Pierre Moulon, Seattle, WA (US)

(73) Assignee: Zillow, Inc., Seattle, WA (US)

( * ) Notice: Subject to any disclaimer, the term of this patent is extended or adjusted under 35 U.S.C. 154(b) by 0 days.

(21) Appl. No.: 17/493,701

(22) Filed: Oct. 4, 2021

(65) Prior Publication Data
US 2022/0028156 A1 Jan. 27, 2022

Related U.S. Application Data

(63) Continuation of application No. 17/080,604, filed on Oct. 26, 2020, now Pat. No. 11,164,361.
(Continued)

(51) Int. Cl.
*G06T 15/10* (2011.01)
*H04N 5/232* (2006.01)
(Continued)

(52) U.S. Cl.
CPC ............... *G06T 15/10* (2013.01); *G06T 7/55* (2017.01); *G06T 7/73* (2017.01); *H04N 5/23238* (2013.01); *G06T 2207/10016* (2013.01)

(58) Field of Classification Search
None
See application file for complete search history.

(56) References Cited

U.S. PATENT DOCUMENTS 5,140,352 A  8/1992 Moore et al.
6,031,540 A  2/2000 Golin et al.
(Continued)

FOREIGN PATENT DOCUMENTS

EP  2413097 A2  2/2012
EP  2505961 A2  10/2012
(Continued)

OTHER PUBLICATIONS

CubiCasa | From video to floor plan in under 5 minutes, retrieved on Mar. 26, 2019, from https://www.cubi.casa/, 6 pages.
(Continued)

*Primary Examiner* — Frank S Chen
(74) *Attorney, Agent, or Firm* — VLP Law Gro up LLP; James A. D. White

(57) ABSTRACT

Techniques are described for using computing devices to perform automated operations for analyzing video (or other image sequences) acquired in a defined area, as part of generating mapping information of the defined area for subsequent use (e.g., for controlling navigation of devices, for display on client devices in corresponding GUIs, etc.). The defined area may include an interior of a multi-room building, and the generated information may include a floor map of the building, such as from an analysis of some or all image frames of the video (e.g., 360° image frames from 360° video) using structure-from-motion techniques to identify objects with associated plane and normal orthogonal information, and then clustering detected planes and/or normals from multiple analyzed images to determine likely wall locations. The generating may be further performed without using acquired depth information about distances from the video capture locations to objects in the surrounding building.

20 Claims, 22 Drawing Sheets

Related U.S. Application Data

(60) Provisional application No. 62/927,032, filed on Oct. 28, 2019.

(51) Int. Cl.
  *G06T 7/55* (2017.01)
  *G06T 7/73* (2017.01)

(56) References Cited

U.S. PATENT DOCUMENTS

| | | |
|---|---|---|
| 6,141,034 A | 10/2000 | McCutchen |
| 6,317,166 B1 | 11/2001 | McCutchen |
| 6,320,584 B1 | 11/2001 | Golin et al. |
| 6,323,858 B1 | 11/2001 | Gilbert et al. |
| 6,337,683 B1 | 1/2002 | Gilbert et al. |
| 6,654,019 B2 | 11/2003 | Gilbert et al. |
| 6,683,608 B2 | 1/2004 | Golin et al. |
| 6,690,374 B2 | 2/2004 | Park et al. |
| 6,731,305 B1 | 5/2004 | Park et al. |
| 6,738,073 B2 | 5/2004 | Park et al. |
| 7,050,085 B1 | 5/2006 | Park et al. |
| 7,129,971 B2 | 10/2006 | McCutchen |
| 7,196,722 B2 | 3/2007 | White et al. |
| 7,525,567 B2 | 4/2009 | McCutchen |
| 7,620,909 B2 | 11/2009 | Park et al. |
| 7,627,235 B2 | 12/2009 | McCutchen et al. |
| 7,782,319 B2 | 8/2010 | Ghosh et al. |
| 7,791,638 B2 | 9/2010 | McCutchen |
| 7,909,241 B2 | 3/2011 | Stone et al. |
| 7,973,838 B2 | 7/2011 | McCutchen |
| 8,072,455 B2 | 12/2011 | Temesvari et al. |
| 8,094,182 B2 | 1/2012 | Park et al. |
| RE43,786 E | 11/2012 | Cooper |
| 8,463,020 B1 | 6/2013 | Schuckmann et al. |
| 8,517,256 B2 | 8/2013 | Stone et al. |
| 8,520,060 B2 | 8/2013 | Zomet et al. |
| 8,523,066 B2 | 9/2013 | Stone et al. |
| 8,523,067 B2 | 9/2013 | Stone et al. |
| 8,528,816 B2 | 9/2013 | Stone et al. |
| 8,540,153 B2 | 9/2013 | Stone et al. |
| 8,594,428 B2 | 11/2013 | Aharoni et al. |
| 8,654,180 B2 | 2/2014 | Zomet et al. |
| 8,666,815 B1 | 3/2014 | Chau |
| 8,699,005 B2 | 4/2014 | Likholyot |
| 8,705,892 B2 | 4/2014 | Aguilera et al. |
| RE44,924 E | 6/2014 | Cooper et al. |
| 8,854,684 B2 | 10/2014 | Zomet |
| 8,861,840 B2 | 10/2014 | Bell et al. |
| 8,861,841 B2 | 10/2014 | Bell et al. |
| 8,879,828 B2 | 11/2014 | Bell et al. |
| 8,953,871 B2 | 2/2015 | Zomet |
| 8,989,440 B2 | 3/2015 | Klusza et al. |
| 8,996,336 B2 | 3/2015 | Malka et al. |
| 9,021,947 B2 | 5/2015 | Landa |
| 9,026,947 B2 | 5/2015 | Lee et al. |
| 9,035,968 B2 | 5/2015 | Zomet |
| 9,041,796 B2 | 5/2015 | Malka et al. |
| 9,071,714 B2 | 6/2015 | Zomet |
| 9,129,438 B2 | 9/2015 | Aarts et al. |
| 9,151,608 B2 | 10/2015 | Malka et al. |
| 9,165,410 B1 | 10/2015 | Bell et al. |
| 9,171,405 B1 | 10/2015 | Bell et al. |
| 9,324,190 B2 | 4/2016 | Bell et al. |
| 9,361,717 B2 | 6/2016 | Zomet |
| 9,396,586 B2 | 7/2016 | Bell et al. |
| 9,438,759 B2 | 9/2016 | Zomet |
| 9,438,775 B2 | 9/2016 | Powers et al. |
| 9,489,775 B1 | 11/2016 | Bell et al. |
| 9,495,783 B1 | 11/2016 | Samarasekera et al. |
| 9,576,401 B2 | 2/2017 | Zomet |
| 9,619,933 B2 | 4/2017 | Spinella-Marno et al. |
| 9,635,252 B2 | 4/2017 | Accardo et al. |
| 9,641,702 B2 | 5/2017 | Bin-Nun et al. |
| 9,760,994 B1 | 9/2017 | Bell et al. |
| 9,786,097 B2 | 10/2017 | Bell et al. |
| 9,787,904 B2 | 10/2017 | Birkler et al. |
| 9,836,885 B1 | 12/2017 | Eraker et al. |
| 9,852,351 B2 | 12/2017 | Aguilera Perez et al. |
| 9,953,111 B2 | 4/2018 | Bell et al. |
| 9,953,430 B1 | 4/2018 | Zakhor |
| 9,990,760 B2 | 6/2018 | Aguilera Perez et al. |
| 9,990,767 B1 | 6/2018 | Sheffield et al. |
| 10,026,224 B2 | 7/2018 | Bell et al. |
| 10,030,979 B2 | 7/2018 | Bjorke et al. |
| 10,055,876 B2 | 8/2018 | Ford et al. |
| 10,068,344 B2 | 9/2018 | Jovanovic et al. |
| 10,083,522 B2 | 9/2018 | Jovanovic et al. |
| 10,102,639 B2 | 10/2018 | Bell et al. |
| 10,102,673 B2 | 10/2018 | Eraker et al. |
| 10,120,397 B1 | 11/2018 | Zakhor et al. |
| 10,122,997 B1 | 11/2018 | Sheffield et al. |
| 10,127,718 B2 | 11/2018 | Zakhor et al. |
| 10,127,722 B2 | 11/2018 | Shakib et al. |
| 10,139,985 B2 | 11/2018 | Mildrew et al. |
| 10,163,261 B2 | 12/2018 | Bell et al. |
| 10,163,271 B1 | 12/2018 | Powers et al. |
| 10,181,215 B2 | 1/2019 | Sedeffow |
| 10,192,115 B1 | 1/2019 | Sheffield et al. |
| 10,204,185 B2 | 2/2019 | Mrowca et al. |
| 10,210,285 B2 | 2/2019 | Wong et al. |
| 10,235,797 B1 | 3/2019 | Sheffield et al. |
| 10,242,400 B1 | 3/2019 | Eraker et al. |
| 10,339,716 B1 | 7/2019 | Powers et al. |
| 10,366,531 B2 | 7/2019 | Sheffield |
| 10,395,435 B2 | 8/2019 | Powers et al. |
| 2006/0256109 A1 | 11/2006 | Acker et al. |
| 2010/0232709 A1 | 9/2010 | Zhang et al. |
| 2012/0072052 A1* | 3/2012 | Powers .............. G06F 3/04815 701/2 |
| 2012/0075414 A1 | 3/2012 | Park et al. |
| 2012/0293613 A1 | 11/2012 | Powers et al. |
| 2013/0050407 A1 | 2/2013 | Brinda et al. |
| 2013/0226451 A1 | 8/2013 | O'Neill et al. |
| 2013/0278755 A1 | 10/2013 | Starns et al. |
| 2013/0325244 A1 | 12/2013 | Wang et al. |
| 2013/0342533 A1 | 12/2013 | Bell et al. |
| 2014/0043436 A1 | 2/2014 | Bell et al. |
| 2014/0044343 A1 | 2/2014 | Bell et al. |
| 2014/0044344 A1 | 2/2014 | Bell et al. |
| 2014/0125658 A1 | 5/2014 | Bell et al. |
| 2014/0125767 A1 | 5/2014 | Bell et al. |
| 2014/0125768 A1 | 5/2014 | Bell et al. |
| 2014/0125769 A1 | 5/2014 | Bell et al. |
| 2014/0125770 A1 | 5/2014 | Bell et al. |
| 2014/0236482 A1 | 8/2014 | Dorum et al. |
| 2014/0267631 A1 | 9/2014 | Powers et al. |
| 2014/0307100 A1 | 10/2014 | Myllykoski et al. |
| 2014/0320674 A1 | 10/2014 | Kuang |
| 2014/0336920 A1 | 11/2014 | Burrell et al. |
| 2015/0116691 A1 | 4/2015 | Likholyot |
| 2015/0189165 A1 | 7/2015 | Milosevski et al. |
| 2015/0204676 A1 | 7/2015 | Zhang et al. |
| 2015/0262421 A1 | 9/2015 | Bell et al. |
| 2015/0269785 A1 | 9/2015 | Bell et al. |
| 2015/0302636 A1 | 10/2015 | Arnoldus et al. |
| 2015/0310596 A1 | 10/2015 | Sheridan et al. |
| 2015/0332464 A1 | 11/2015 | O'Keefe et al. |
| 2016/0055268 A1 | 2/2016 | Bell et al. |
| 2016/0134860 A1 | 5/2016 | Jovanovic et al. |
| 2016/0140676 A1 | 5/2016 | Fritze et al. |
| 2016/0217225 A1 | 7/2016 | Bell et al. |
| 2016/0260250 A1 | 9/2016 | Jovanovic et al. |
| 2016/0286119 A1 | 9/2016 | Rondinelli |
| 2016/0300385 A1 | 10/2016 | Bell et al. |
| 2017/0034430 A1 | 2/2017 | Fu et al. |
| 2017/0067739 A1 | 3/2017 | Siercks et al. |
| 2017/0194768 A1 | 7/2017 | Powers et al. |
| 2017/0195654 A1 | 7/2017 | Powers et al. |
| 2017/0263050 A1 | 9/2017 | Ha et al. |
| 2017/0324941 A1 | 11/2017 | Birkler |
| 2017/0330273 A1 | 11/2017 | Holt et al. |
| 2017/0337737 A1 | 11/2017 | Edwards et al. |
| 2018/0007340 A1 | 1/2018 | Stachowski |
| 2018/0025536 A1 | 1/2018 | Bell et al. |

(56) References Cited

U.S. PATENT DOCUMENTS

| | | |
|---|---|---|
| 2018/0075168 A1 | 3/2018 | Tiwari et al. |
| 2018/0139431 A1 | 5/2018 | Simek et al. |
| 2018/0143023 A1 | 5/2018 | Bjorke et al. |
| 2018/0143756 A1 | 5/2018 | Mildrew et al. |
| 2018/0144487 A1 | 5/2018 | Bell et al. |
| 2018/0144535 A1 | 5/2018 | Ford et al. |
| 2018/0144547 A1 | 5/2018 | Shakib et al. |
| 2018/0144555 A1 | 5/2018 | Ford et al. |
| 2018/0146121 A1 | 5/2018 | Hensler et al. |
| 2018/0146193 A1 | 5/2018 | Safreed et al. |
| 2018/0146212 A1 | 5/2018 | Hensler et al. |
| 2018/0165871 A1 | 6/2018 | Mrowca |
| 2018/0203955 A1 | 7/2018 | Bell et al. |
| 2018/0241985 A1 | 8/2018 | O'Keefe et al. |
| 2018/0293793 A1 | 10/2018 | Bell et al. |
| 2018/0300936 A1 | 10/2018 | Ford et al. |
| 2018/0306588 A1 | 10/2018 | Bjorke et al. |
| 2018/0348854 A1 | 12/2018 | Powers et al. |
| 2018/0365496 A1 | 12/2018 | Hovden et al. |
| 2019/0012833 A1 | 1/2019 | Eraker et al. |
| 2019/0026956 A1 | 1/2019 | Gausebeck et al. |
| 2019/0026957 A1 | 1/2019 | Gausebeck |
| 2019/0026958 A1 | 1/2019 | Gausebeck et al. |
| 2019/0035165 A1 | 1/2019 | Gausebeck |
| 2019/0041972 A1 | 2/2019 | Bae |
| 2019/0050137 A1 | 2/2019 | Mildrew et al. |
| 2019/0051050 A1 | 2/2019 | Bell et al. |
| 2019/0051054 A1 | 2/2019 | Jovanovic et al. |
| 2019/0072395 A1 | 3/2019 | Namboodiri et al. |
| 2019/0087067 A1 | 3/2019 | Hovden et al. |
| 2019/0122422 A1 | 4/2019 | Sheffield et al. |
| 2019/0164335 A1 | 5/2019 | Sheffield et al. |
| 2019/0180104 A1 | 6/2019 | Sheffield et al. |
| 2019/0251645 A1 | 8/2019 | Winans |
| 2019/0287164 A1 | 9/2019 | Eraker et al. |
| 2020/0005428 A1 | 1/2020 | Sedeffow |
| 2020/0061839 A1* | 2/2020 | Deyle ............... G06Q 10/087 |
| 2021/0409669 A1* | 12/2021 | Wang ............... H04N 13/117 |

FOREIGN PATENT DOCUMENTS

| | | | |
|---|---|---|---|
| EP | 2506170 | A2 | 10/2012 |
| KR | 101770648 | B1 | 8/2017 |
| KR | 101930796 | B1 | 12/2018 |
| WO | 2005091894 | A2 | 10/2005 |
| WO | 2016154306 | A1 | 9/2016 |
| WO | 2018204279 | A1 | 11/2018 |
| WO | 2019083832 | A1 | 5/2019 |
| WO | 2019104049 | A1 | 5/2019 |
| WO | 2019118599 | A2 | 6/2019 |

OTHER PUBLICATIONS

CubiCasa FAQ & Manual, retrieved on Mar. 26, 2019, from https://www.cubi.casa/faq/, 5 pages.

Cupix Home, retrieved on Mar. 26, 2019, from https://www.cupix.com/, 1 page.

Cupix—FAQ, retrieved on Mar. 26, 2019, from https://www.cupix.com/faq.html, 3 pages.

IGuide: 3D Virtual Tours, retrieved on Mar. 26, 2019, from https://goiguide.com/, 6 pages.

immoviewer.com | Automated Video Creation & Simple Affordable 3D 360 Tours, retrieved on Mar. 26, 2019, from https://www.immoviewer.com/, 5 pages.

MagicPlan | #1 Floor Plan App, Construction & Surveying Samples, retrieved on Mar. 26, 2019, from https://www.magicplan.app/, 9 pages.

EyeSpy360 Virtual Tours | Virtual Tour with any 360 camera, retrieved on Mar. 27, 2019, from https://www.eyespy360.com/en-us/, 15 pages.

Indoor Reality, retrieved on Mar. 27, 2019, from https://www.indoorreality.com/, 9 pages.

InsideMaps, retrieved on Mar. 27, 2019, from https://www.insidemaps.com/, 7 pages.

IStaging | Augmented & Virtual Reality Platform For Business, retrieved on Mar. 27, 2019, from https://www.istaging.com/en/, 7 pages.

Metareal, retrieved on Mar. 27, 2019, from https://www.metareal.com/, 4 pages.

PLNAR—The AR 3D Measuring / Modeling Platform, retrieved on Mar. 27, 2019, from https://www.plnar.co, 6 pages.

YouVR Global, retrieved on Mar. 27, 2019, from https://global.youvr.io/, 9 pages.

GeoCV, retrieved on Mar. 28, 2019, from https://geocv.com/, 4 pages.

Biersdorfer, J.D., "How To Make A 3-D Model Of Your Home Renovation Vision," in The New York Times, Feb. 13, 2019, retrieved Mar. 28, 2019, 6 pages.

Chen et al. "Rise of the indoor crowd: Reconstruction of building interior view via mobile crowdsourcing." In: Proceedings of the 13th ACM Conference on Embedded Networked Sensor Systems. Nov. 4, 2015, 13 pages.

Immersive 3D for the Real World, retrieved from https://matterport.com/, on Mar. 27, 2017, 5 pages.

Learn About Our Complete 3D System, retrieved from https://matterport.com/how-it-works/, on Mar. 27, 2017, 6 pages.

Surefield FAQ, retrieved from https://surefield.com/faq, on Mar. 27, 2017, 1 page.

Why Surefield, retrieved from https://surefield.com/why-surefield, on Mar. 27, 2017, 7 pages.

Schneider, V., "Create immersive photo experiences with Google Photo Sphere," retrieved from http://geojournalism.org/2015/02/create-immersive-photo-experiences-with-google-photo-sphere/, on Mar. 27, 2017, 7 pages.

Tango (platform), Wikipedia, retrieved from https://en.wikipedia.org/wiki/Tango_(platform), on Jun. 12, 2018, 5 pages.

Zou et al. "LayoutNet: Reconstructing the 3D Room Layout from a Single RGB Image" in arXiv:1803.08999, submitted Mar. 23, 2018, 9 pages.

Lee et al. "RoomNet: End-to-End Room Layout Estimation" in arXiv:1703.00241v2, submitted Aug. 7, 2017, 10 pages.

Time-of-flight camera, Wikipedia, retrieved from https://en.wikipedia.org/wiki/Time-of-flight_camera, on Aug. 30, 2018, 8 pages.

Magicplan—Android Apps on Go . . . , retrieved from https://play.google.com/store/apps/details?id=com.sensopia.magicplan, on Feb. 21, 2018, 5 pages.

Pintore et al., "AtlantaNet: Inferring the 3D Indoor Layout from a Single 360 Image beyond the Manhattan World Assumption", ECCV 2020, 16 pages.

Cowles, Jeremy, "Differentiable Rendering", Aug. 19, 2018, accessed Dec. 7, 2020 at https://towardsdatascience.com/differentiable-rendering-d00a4b0f14be, 3 pages.

Yang et al., "DuLa-Net: A Dual-Projection Network for Estimating Room Layouts from a Single RGB Panorama", in arXiv:1811.11977[cs.v2], submitted Apr. 2, 2019, 14 pages.

Sun et al., "HoHoNet: 360 Indoor Holistic Understanding with Latent Horizontal Features", in arXiv:2011.11498[cs.v2], submitted Nov. 24, 2020, 15 pages.

Nguyen-Phuoc et al., "RenderNet: A deep convolutional network for differentiable rendering from 3D shapes", in arXiv:1806.06575[cs.v3], submitted Apr. 1, 2019, 17 pages.

Convolutional neural network, Wikipedia, retrieved from https://en.wikipedia.org/wiki/Convolutional_neural_network, on Dec. 7, 2020, 25 pages.

Patil et al., "LayoutGMN: Neural Graph Matching for Structural Layout Similarity", in Proceedings of the IEEE/CVF Conference on Computer Vision and Pattern Recognition (CVPR 2021), Jun. 2021, 10 pages (pp. 11048-11057).

Pintore et al., "State-of-the-art in Automatic 3D Reconstruction of Structured Indoor Environments", in Computer Graphics Forum / Eurographics 2020 vol. 39 No. 2, 2020, 33 pages.

Schlichtkrull et al., "Modeling Relational Data with Graph Convolutional Networks", in arXiv:1703.06103v4 [stat.ML], submitted Oct. 26, 2017, 9 pages.

(56) References Cited

OTHER PUBLICATIONS

Simonovsky et al., "GraphVAE: Towards Generation of Small Graphs Using Variational Autoencoders", in arXiv:1802.03480v1 [cs.LG], submitted Feb. 9, 2018, 10 pages.
Velickovic et al., "Graph Attention Networks", in arXiv:1710.10903v3 [stat.ML], submitted Feb. 4, 2018, 12 pages.
Wang et al., "GraphGAN: Graph Representation Learning with Generative Adversarial Nets", in arXiv:1711.08267v1 [cs.LG], submitted Nov. 22, 2017, 8 pages.
Xu et al., "How Powerful Are Graph Neural Networks?", in arXiv:1810.00826v3 [cs.LG], submitted Feb. 22, 2019, 17 pages.
Zeng et al., "Deep Floor Plan Recognition Using a Multi-Task Network with Room-Boundary-Guided Attention", in arXiv:1908.11025v1 [cs.CV], submitted Aug. 29, 2019, 9 pages.
Zhang et al., "Link Prediction Based on Graph Neural Networks", in 32nd Conference on Neural Information Processing Systems (NIPS 2018), 2018, 17 pages.
Park et al., "Symmetric Graph Convolutional Autoencoder for Unsupervised Graph Representation Learning", in Proceedings of the 2019 IEEE/CVF International Conference on Computer Vision (ICCV 2019), 2019, 10 pages.
Euclidian Distance, Wikipedia, retrieved from https://en.wikipedia.org/wiki/Euclidian_distance on Apr. 7, 2020, 3 pages.
Graph Edit Distance, Wikipedia, retrieved from https://en.wikipedia.org/wiki/Graph_edit_distance on Apr. 7, 2020, 3 pages.
Hamilton et al., "Inductive Representation Learning on Large Graphs", in 31st Conference on Neural Information Processing Systems (NIPS 2017), 2017, 19 pages.
Kipf et al., "Variational Graph Auto-Encoders", in arXiv:1611.07308v1 [stat.ML], submitted Nov. 21, 2016, 3 pages.
Cao et al., "MolGAN: An Implicit Generative Model For Small Molecular Graphs", in arXiv:1805.11973v1 [stat.ML], submitted May 30, 2018, 11 pages.
Chen et al., "Intelligent Home 3D: Automatic 3D-House Design from Linguistic Descriptions Only", in arXiv:2003.00397v1 [cs.CV], submitted Mar. 1, 2020, 14 pages.
Cucurull et al., "Context-Aware Visual Compatibility Prediction", in arXiv:1902.03646v2 [cs.CV], submitted Feb. 12, 2019, 10 pages.
Fan et al., "Labeled Graph Generative Adversarial Networks", in arXiv:1906.03220v1 [cs.LG], submitted Jun. 7, 2019, 14 pages.
Gong et al., "Exploiting Edge Features in Graph Neural Networks", in arXiv:1809.02709v2 [cs.LG], submitted Jan. 28, 2019, 10 pages.
Genghis Goodman, "A Machine Learning Approach to Atlincial Floorplan Generation", University of Kentucky Theses and Dissertations—Computer Science, 2019, accessible at https://uknowledge.uky.edu/cs_etds/89, 40 pages.
Grover et al., "node2vec: Scalable Feature Learning for Networks", in arXiv:1607.00653v1 [cs.SI], submitted Jul. 3, 2016, 10 pages.
Kang et al., "A Review of Techniques for 3D Reconstruction of Indoor Environments", in ISPRS International Journal Of Geo-Information 2020, May 19, 2020, 31 pages.
Kipf et al., "Semi-Supervised Classification With Graph Convolutional Networks", in arXiv:1609.02907v4 [cs.LG], submitted Feb. 22, 2017, 14 pages.
Li et al., "Graph Matching Networks for Learning the Similarity of Graph Structured Objects", in Proceedings of the 36th International Conference on Machine Learning (PMLR 97), 2019, 18 pages.
Liu et al., "Hyperbolic Graph Neural Networks", in 33rd Conference on Neural Information Processing Systems (NeurIPS 2019), 2019, 12 pages.
Merrell et al., "Computer-Generated Residential Building Layouts", in ACM Transactions on Graphics, Dec. 2010, 13 pages.
Nauata et al., "House-GAN: Relational Generative Adversarial Networks for Graph-constrained House Layout Generation", in arXiv:2003.06988v1 [cs.CV], submitted Mar. 16, 2020, 17 pages.

\* cited by examiner

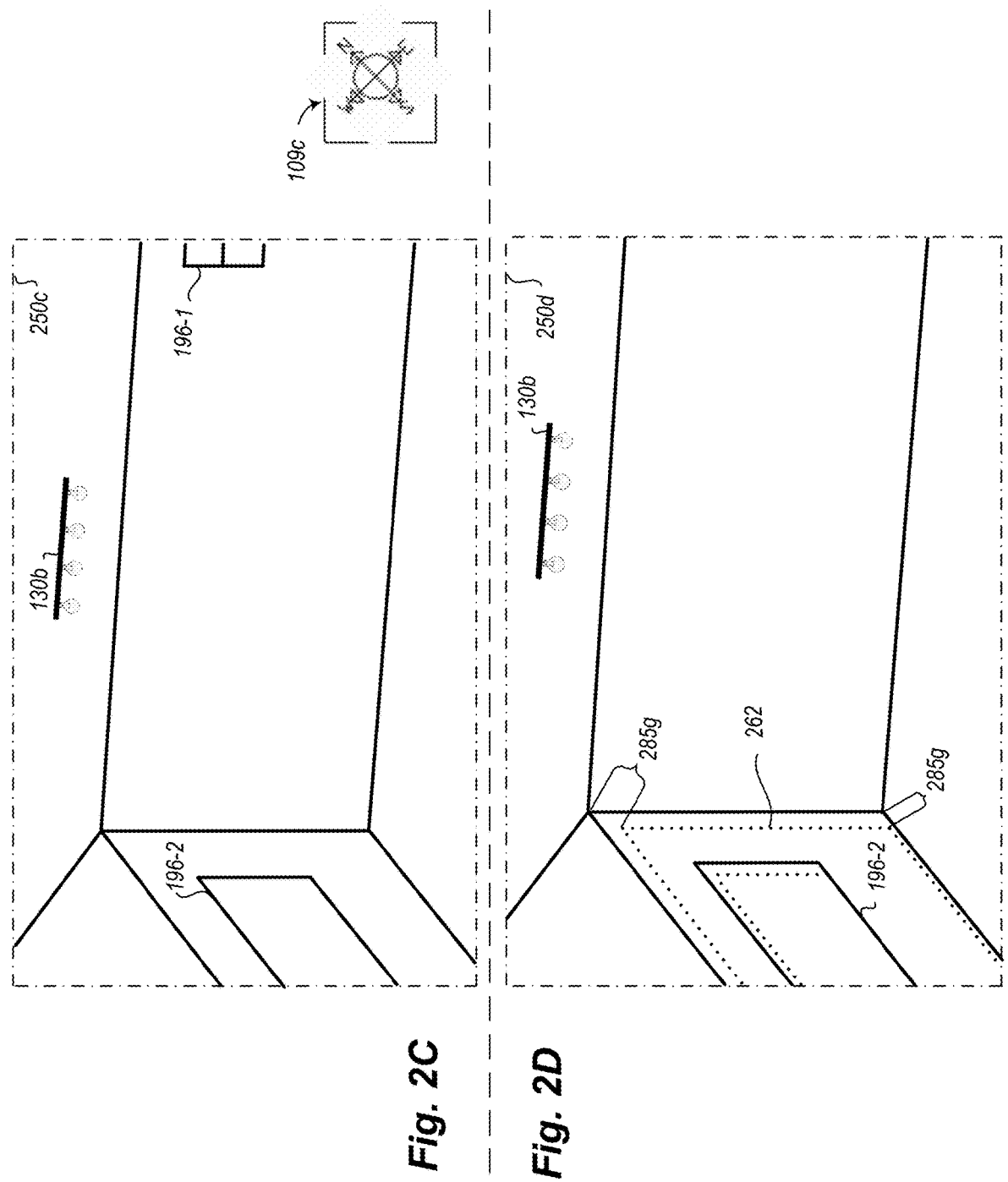

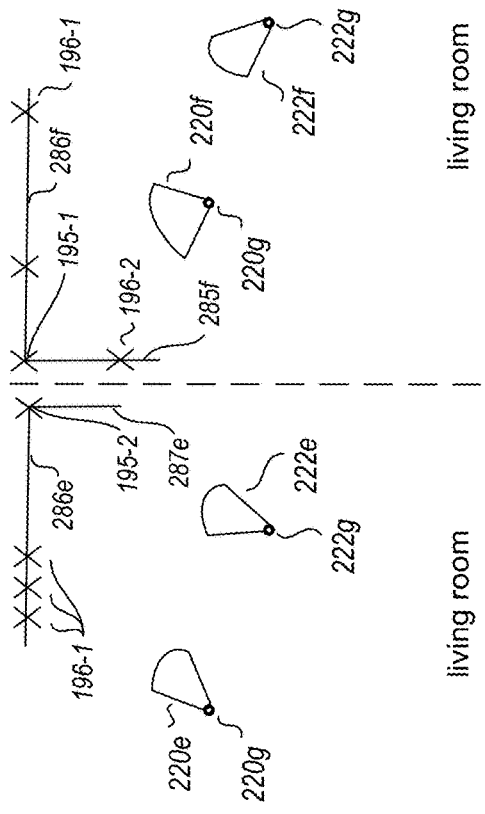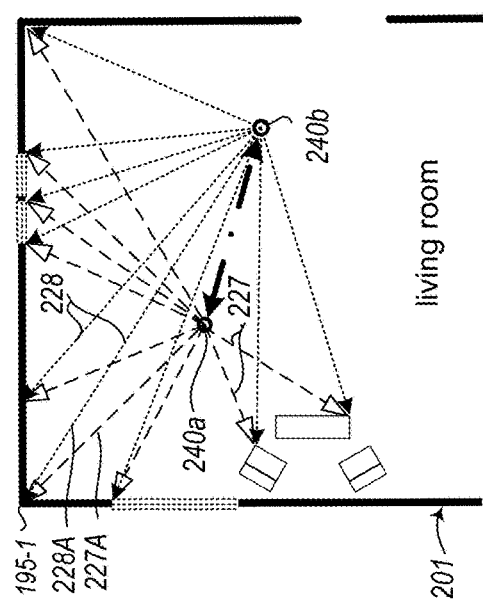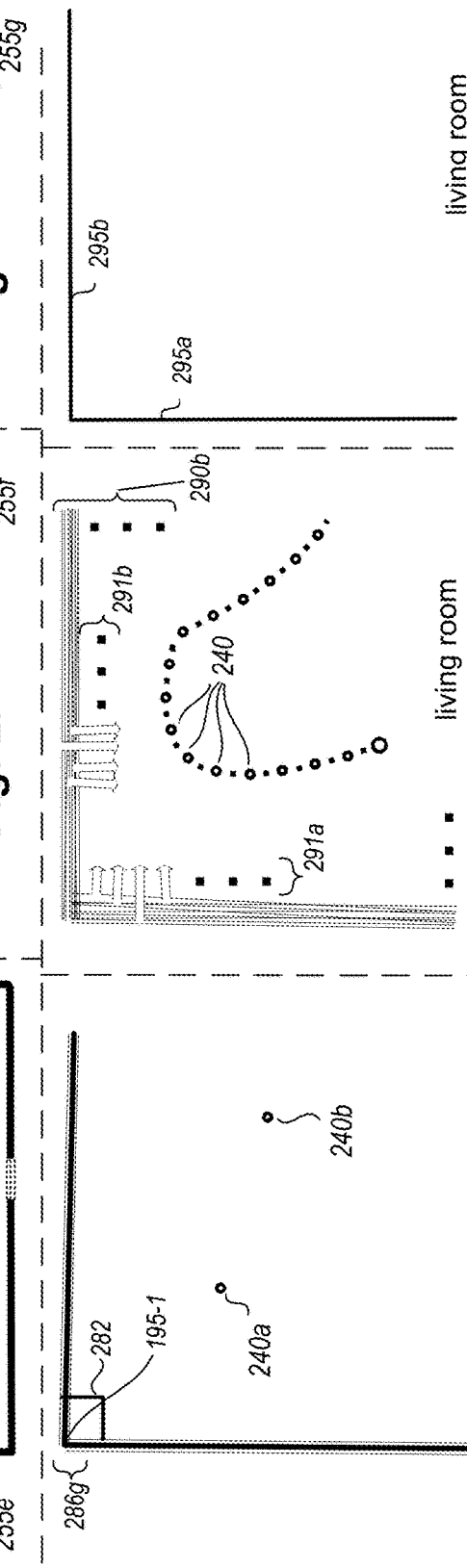

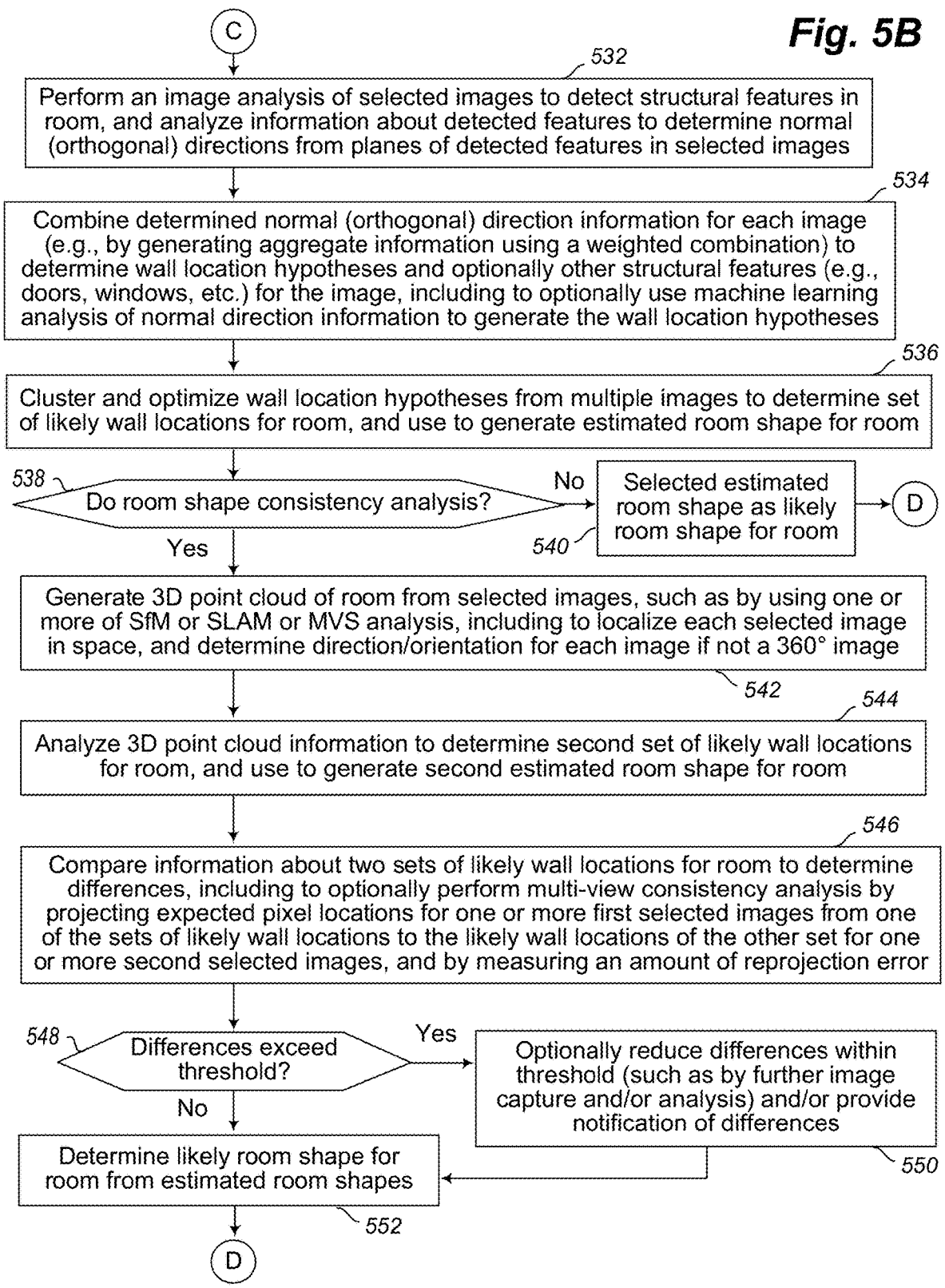

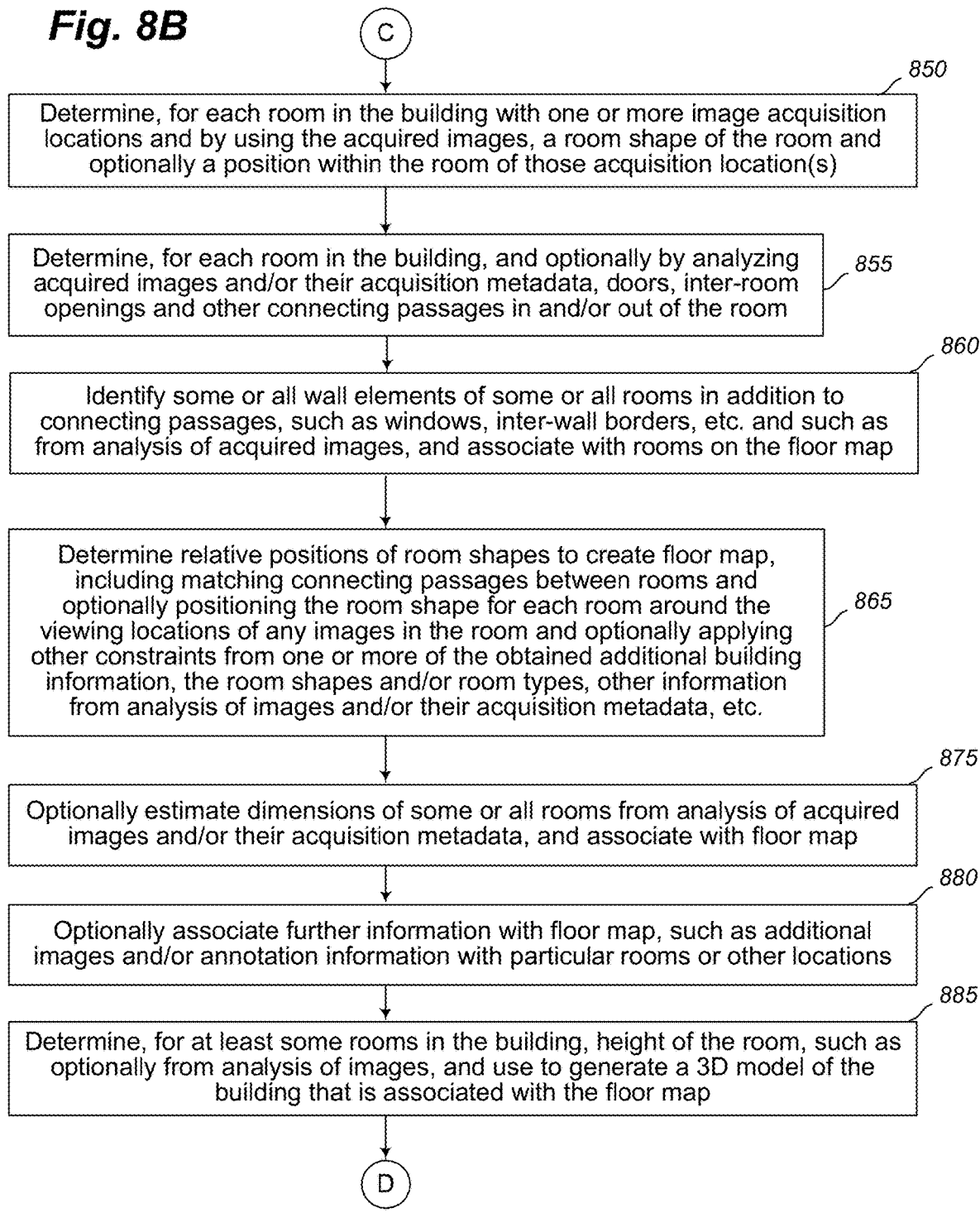

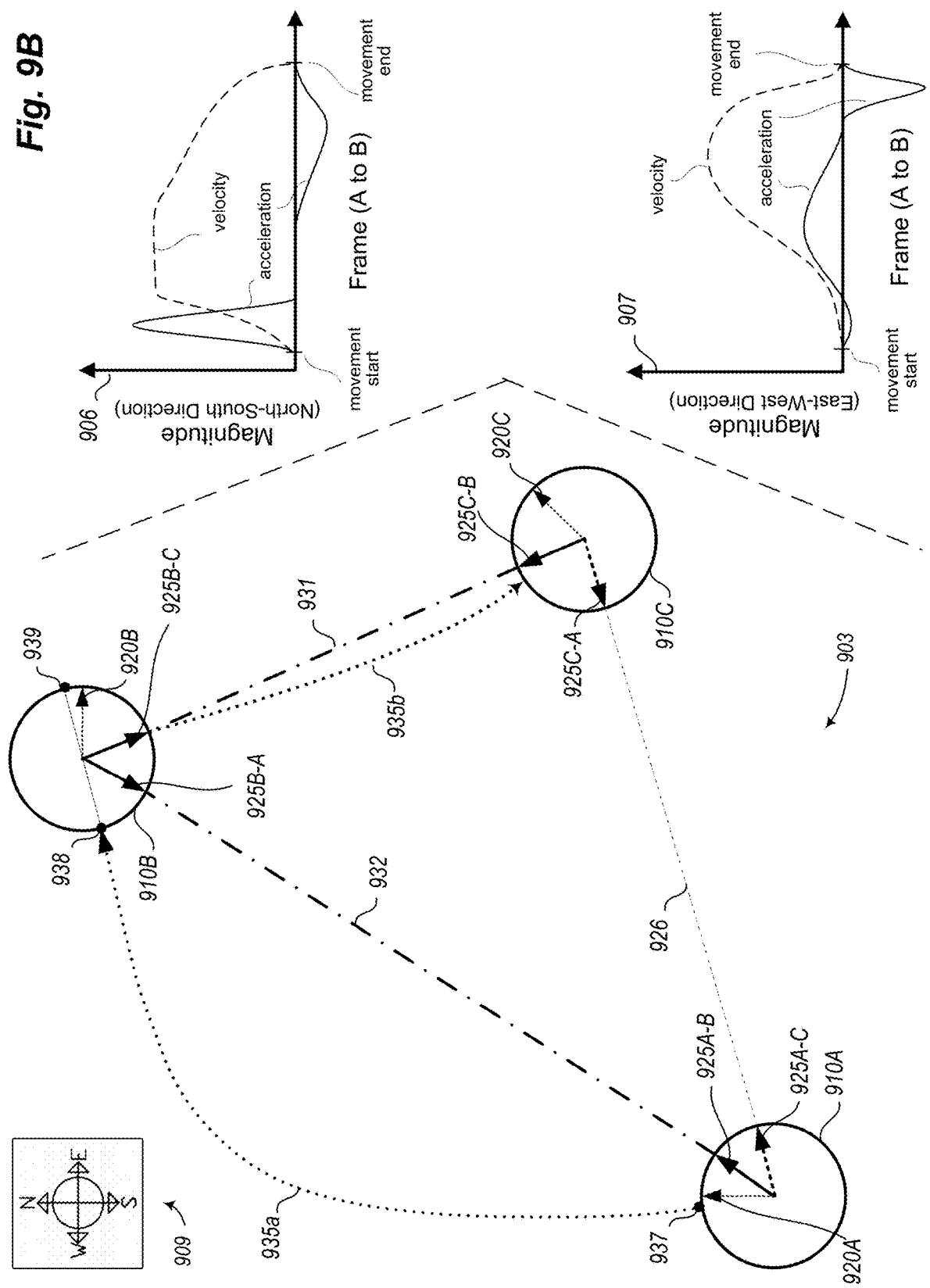

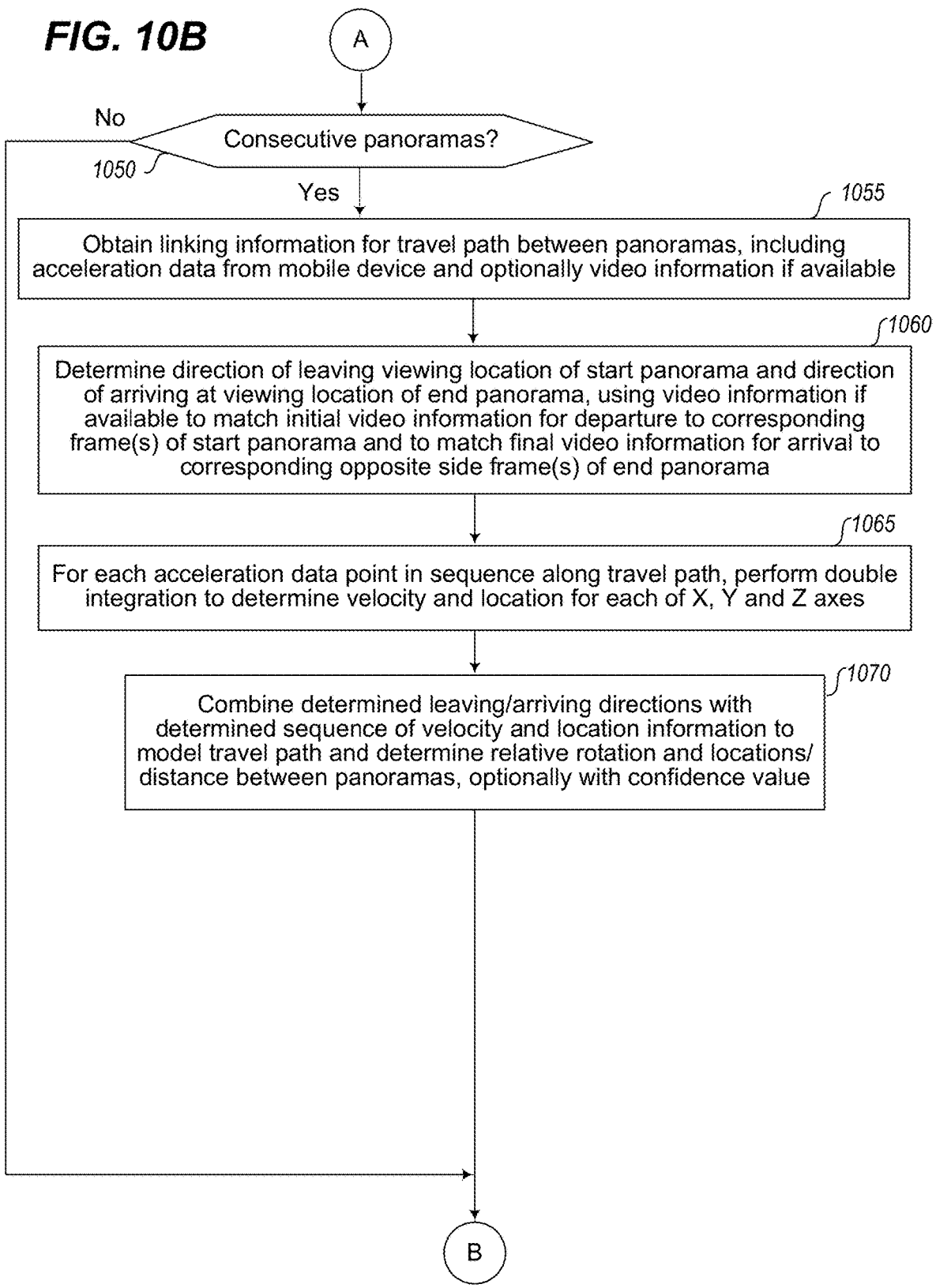

GENERATING FLOOR MAPS FOR BUILDINGS FROM AUTOMATED ANALYSIS OF VISUAL DATA OF THE BUILDINGS' INTERIORS

CROSS-REFERENCE TO RELATED APPLICATIONS

This application is a continuation of co-pending U.S. patent application Ser. No. 17/080,604, filed Oct. 26, 2020 and entitled "Generating Floor Maps For Buildings From Automated Analysis Of Visual Data Of The Buildings' Interiors", which is hereby incorporated by reference in its entirety. U.S. patent application Ser. No. 17/080,604 claims the benefit of U.S. Provisional Patent Application No. 62/927,032, filed Oct. 28, 2019 and entitled "Generating Floor Maps For Buildings From Automated Analysis Of Video Of The Buildings' Interiors," which is hereby incorporated by reference in its entirety.

TECHNICAL FIELD

The following disclosure relates generally to techniques for automatically generating mapping information for a defined area using video or related visual image sequences acquired of the area, and for subsequently using the generated mapping information in one or more manners, such as to automatically generate a floor map of a building from analysis of video captured in the building's interior.

BACKGROUND

In various fields and circumstances, such as architectural analysis, property inspection, real estate acquisition and development, remodeling and improvement services, general contracting and other circumstances, it may be desirable to view information about the interior of a house, office, or other building without having to physically travel to and enter the building, including to determine actual as-built information about the building rather than design information from before the building is constructed. However, it can be difficult or impossible to effectively display visual information about building interiors to users at remote locations, such as to enable a user to fully understand the layout and other details of the interior.

BRIEF DESCRIPTION OF THE DRAWINGS

FIGS. 5A-5B illustrate an example embodiment of a flow diagram for a Visual data-To-Floor Map (VTFM) system routine in accordance with an embodiment of the present disclosure.

FIGS. 8A-8B illustrate an example embodiment of a flow diagram for a Mapping Information Generation Manager (MIGM) system routine in accordance with an embodiment of the present disclosure.

FIGS. 9A-9B illustrate examples of analyzing and using information acquired from an interior of a building in order to generate and provide a representation of that interior.

FIGS. 10A-10B depict a process flow for a panorama connection routine in accordance with an embodiment of the present disclosure.

DETAILED DESCRIPTION

Figure 1A:
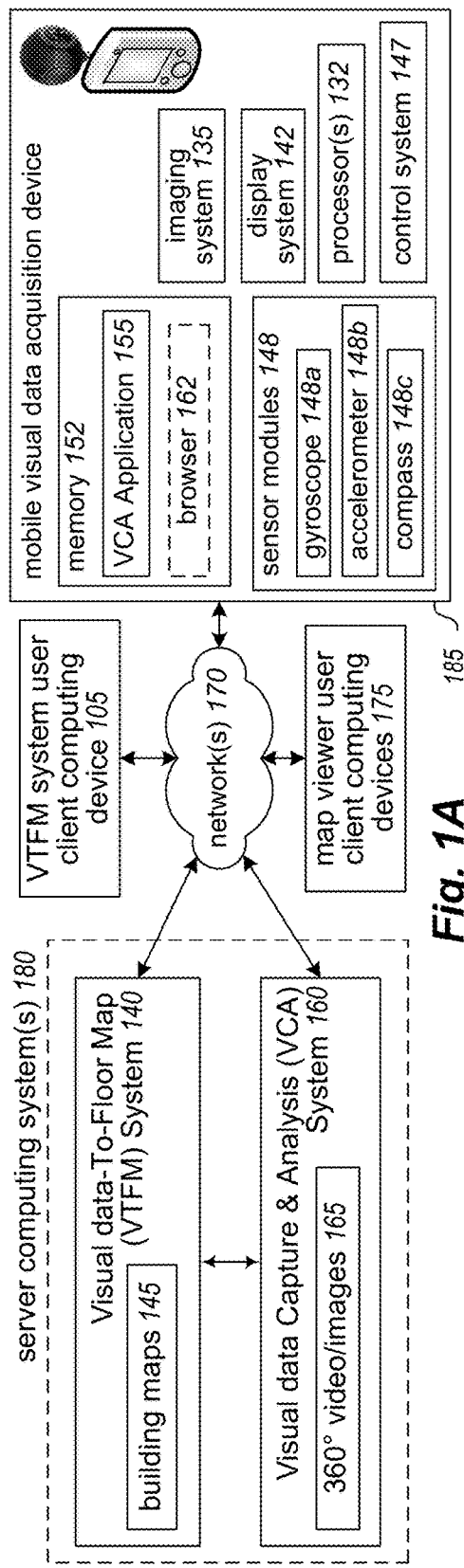
FIGS. 1A-1B are diagrams depicting an exemplary building interior environment and computing system(s) for use in embodiments of the present disclosure, such as for performing automated operations to generate mapping information representing the building interior.

The present disclosure describes techniques for using one or more computing devices to perform automated operations related to analyzing video acquired along a path through a defined area, as part of generating mapping information of the defined area for subsequent use in one or more further automated manners, or instead analyzing other types of image sequences along such a path followed by similar generating of mapping information. In at least some embodiments, the defined area includes an interior of a multi-room building (e.g., a house, office, etc.), and the generated information includes a 3D (three-dimensional) floor map model of the building that is generated from an analysis of image frames of continuous video acquired along a path through the interior of the building, with the image analysis identifying shapes and sizes of objects in the building interior (e.g., doors, windows, walls, etc.), as well as determining borders between walls, floors and ceilings. The captured video may, for example, be 360° video (e.g., video with frames that are each a spherical panorama image having 360° of coverage along at least one plane, such as 360° of coverage along a horizontal plane and around a vertical axis) acquired using a video acquisition device with a spherical camera having one or more fisheye lenses to capture 360 degrees horizontally, and in at least some such embodiments, the generating of the mapping information is further performed without having or using information acquired from any depth-sensing equipment about distances from the acquisition locations of the video/images to walls or other objects in the surrounding building interior. In addition, in at least some embodiments, the mapping-related information generated from the analysis of the video image frames (or other sequence of images) includes a 2D (two-dimensional) floor map of the building, such as an overhead view (e.g., an orthographic top view) of a schematic floor map, but without including or displaying height information in the same manner as visualizations of the 3D floor map model—if the 3D floor map model is generated first based on three-dimensional information obtained from the image analysis, such a 2D floor map may, for example, be generated from the 3D floor map model by removing height-related information for the rooms of the building. The generated 3D floor map model and/or 2D floor map and/or other generated mapping-related information may be further used in one or more manners in various embodiments, such as for controlling navigation of mobile devices (e.g., autonomous vehicles), for display on one or more client devices in corresponding GUIs (graphical user interfaces), etc. Additional details are included below regarding the automated operations of the computing device(s) involved in the generating of the mapping information, and some or all of the techniques described herein may, in at least some embodiments, be performed via automated operations of a Visual data-To-Floor Map ("VTFM") system, as discussed further below.

In at least some embodiments, the automated operations of the VTFM system may include selecting, from one or more videos captured of at least the interior of a building (e.g., along a path through the multiple rooms of a house or other multi-room building), video frames to include in an image group with a sequence of multiple images to use in the automated analysis and determination of a floor map (and optionally other mapping related information) for the building—in other embodiments in which another type of sequence of images of a building's interior are available that are not video frames (e.g., with each image having an acquisition location that is separated by only small distances from acquisition location(s) of one or more neighboring images, such as 3 feet or less, or 6 feet or less), similar automated techniques may be used to select an image group with a sequence of some or all of those images to use in the automated analysis and determination of the mapping related information for the building. The selection of the sequence of video frames or other images to use in the image group may be performed in various manners in various embodiments, including to select all available frames/images or instead to select only a subset of the available frames/images, such as frames/images that satisfy one or more defined criteria (e.g., a defined quantity or percentage of the frames/images; frames/images acquired at acquisition locations and/or in acquisition directions/orientations that differ from that of one or more neighboring frames/images in the group by at most a defined maximum distance or direction/orientation and/or that differ from that of one or more neighboring frames/images in the group by at least a defined minimum distance or direction/orientation; frames/images that satisfy other criteria, such as with respect to lighting and/or blur; etc.). At least some frames/images may further have associated acquisition metadata (e.g., one or more of acquisition time; acquisition location, such as GPS coordinates or other indication of location; acquisition direction and/or orientation; etc.), including data acquired from IMU (inertial measurement unit) sensors or other sensors of the acquisition device, and such acquisition metadata may further optionally be used as part of the frame/image selection process in at least some embodiments and situations.

In at least some such embodiments, some or all of the available frames or other images for selection in an image group may be 360° panorama images with 360° of horizontal coverage, but in at least some of those embodiments with less than 360° of vertical coverage (or other panorama images with a width exceeding a height by more than a typical aspect ratio, such as more than 16:9 or 3:2 or 7:5 or 4:3 or 5:4 or 1:1)—it will be appreciated that a user viewing such a panorama image may be permitted to move the viewing direction within the panorama image to different orientations to cause different subset images (or "views") to be rendered within the panorama image, and that such a panorama image may in some situations be represented in a spherical coordinate system (including, if the panorama image is represented in a spherical coordinate system and particular view is being rendered, to convert the image being rendered into a planar coordinate system, such as for a perspective image view before it is displayed). In situations involving such a panorama image, a corresponding image selected for the image group may be the entire such panorama image or instead a portion of it (e.g., a portion fitting a defined size and/or aspect ratio, in a defined direction and/or orientation, etc.). Thus, as used subsequently herein, the 'images' selected for the image group may be video frames and/or still images, and may be 360° images and/or other panorama images with less than 360° of coverage and/or non-panorama perspective images in a defined direction and/or orientation (including a subset 'view' of a panorama image in a particular viewing direction). Additional details are included below regarding automated operations of device(s) implementing a Visual data Capture and Analysis (VCA) system involved in acquiring images and optionally acquisition metadata.

The automated operations of the VTFM system may, in at least some embodiments, further include analyzing images from the image group to determine a 3D shape of each room in the building, such as to reflect the geometry of the surrounding structural elements of the building. For example, the images from the image group that are acquired within a particular room may be analyzed to determine features visible in the content of multiple such images in order to determine various information for the room, such as to determine the direction and/or orientation of the acquisition device when it took particular images, a path through the room traveled by the acquisition device, etc.—in at least some such embodiments, the analysis of the images may be performed using one or more of simultaneous localization and mapping (SLAM) techniques and/or other structure-from-motion (SfM) techniques, multiple-view stereovision (MVS) techniques, etc., such as to 'register' the camera positions for the images in a common frame of reference so as to 'align' the images, and to estimate 3D locations and shapes of objects in the room. As one non-exclusive example, if the images from the image group are not video frames but are instead a 'dense' set of images that are separated by at most a defined distance (e.g., 6 feet), SfM analysis techniques may be used to generate a 3D point cloud for each of one or more rooms in which those images were acquired, with the 3D point cloud(s) representing a 3D shape of each of the room(s) and including 3D points along walls of the room and at least some of the ceiling and floor of the room, and optionally with 3D points corresponding to other objects in the room(s), if any. As another non-exclusive example, if the images from the image group are video frames from a video acquired in one or more rooms, SLAM and/or SfM techniques may be used to generate a 3D point cloud for each of the room(s), with the 3D point cloud(s) representing a 3D shape of each of the room(s) and including 3D points along walls of the room and at least some of the ceiling and floor of the room, and optionally with 3D points corresponding to other objects in the room(s), if any. As part of the analysis of the images in a room, the automated operations of the VTFM system further include determining planes for detected features and normal (orthogonal) directions to those planes—it will be appreciated that while some such plane and normal information may correspond to objects in the room that are not part of the building structure (e.g., furniture in the center of the room), many or most or all (if there are not any such objects) of the determined planes and normals will correspond to walls of the room. The VTFM system then aggregates such plane and normal information across multiple images from the image group in the room, and clusters similar planes and/or similar normals (e.g., those that differ from each other in location and angle by at most a maximum distance and degree, or other distance measure) to form hypotheses of likely wall locations (and optionally of other likely locations, such as for the floor and/or ceiling of the room)—as part of doing so, machine learning techniques may be used in at least some embodiments to predict which aggregated plane/normal information corresponds to flat walls, such as based on prior training. After likely wall locations are determined, the VTFM system may further apply constraints of one or more types to connect the various likely wall locations and form an estimated room shape for the room, such as constraints that include 90° angles between walls and/or between walls and floor (e.g., as part of the so-called 'Manhattan world assumption' involving typical use of parallel and perpendicular surfaces in buildings), constraints to correspond to typical room shapes, etc.

In addition to identifying wall locations, the automated analysis of images in a room by the VTFM system may further include identifying other types of features in the room in at least some embodiments, such as one or more of the following: corners where at least three surfaces meet; borders between adjacent walls; borders between walls and a floor; borders between walls and a ceiling; windows and/or sky-lights; passages into and/or out of the room, such as doorways and other openings in walls, stairs, hallways, etc.; other structures, such as countertops, bath tubs, sinks, fireplaces, and furniture; etc.—if so, at least some such features (e.g., corners and borders) may further be used as part of the automated room shape determination (e.g., as constraints to connect likely wall locations), while other such features (e.g., doorways or other passages) may be used to assist in connecting multiple room shapes together, and yet other such features (e.g., windows, bath tubs, sinks, etc.) may have corresponding information included in the resulting generated floor map or other mapping related information. In some embodiments, the identification of doorways and/or other inter-room passages may include using machine learning analysis of object-related information generated from the image analysis (e.g., from an SfM, MVS and/or SLAM analysis), while in other embodiments the identification of doorways and/or other inter-room passages may be performed in other manners (e.g., by detecting where the identified path of the mobile acquisition device during the video capture passes through planar surfaces identified as likely walls). The automated analysis of the images may identify at least some such features based at least in part on identifying different content within the passages than outside them (e.g., different colors, shading, etc.), identifying their outlines, etc. In addition, in at least some embodiments, the automated analysis of the images may further identify additional information, such as an estimated room type (whether based on shape and/or other features identified in the room), dimensions of objects (e.g., objects of known size), etc., which may be further used during generation of a floor map and/or other mapping related information as discussed further below. Additional details are included below regarding automated operations to determine room shapes and other room information based on analysis of images from the room, including with respect to FIGS. 2A-2J.

In addition, when analysis of the images from the image group provide a 3D point cloud or other 3D representation of a shape of a room, such information may further be used in at least some embodiments together with the information about the room shape that is generated from the analysis of normal and planar information, such as to assess consistency between the different types of determined room shape information. For example, the locations of walls of the room may be estimated from analysis of a 3D point cloud or other 3D representation of the room shape, and used together with the hypothesized likely wall locations from the analysis of normal and planar information, such as for one or more of the following: to combine the two sets of wall location information to automatically determine a final likely wall location (e.g., to do a weighted average); to compare the two sets of wall location information to determine if errors between them exceed a defined threshold, such as by performing a multi-view consistency analysis involving projecting pixel data from the hypothesized wall locations from one image of the image group in the room to the hypothesized wall locations from another image of the image group in the room (e.g., an immediately preceding or subsequent image in the image group) and measuring an amount of reprojection error, and/or by directly comparing the two sets of wall location information for one or more images to determine if they differ by more than a defined amount (e.g., a defined percentage, a defined linear amount, a defined rotational amount, etc.), and if the determined error exceeds the defined threshold to optionally provide a notification or initiate other activity (e.g., to prompt further data gathering for the room and/or analysis of likely room wall locations, such as to analyze additional images that are not part of the image group); etc.

After determining the estimated room shapes of the rooms in the building, the automated operations of the VTFM system may, in at least some embodiments, further include positioning the multiple room shapes together to form a floor map and/or other related mapping information for the building, such as by connecting the various room shapes. The positioning of the multiple room shapes may include, for example, automatically determining initial placement positions of each room's estimated room shape relative to each other by connecting identified passages between rooms (e.g., to co-locate or otherwise match connecting passage information in two or more rooms that the passage connects), and optionally further applying constraints of one or more types (e.g., that walls of two side-by-side rooms should be parallel and optionally separated by a distance corresponding to an estimated or default thickness of a wall between the rooms, or by otherwise matching shapes of the rooms; by fitting some or all of the room shapes within an exterior shape of some or all of the building, if available; by preventing room shapes from being placed in external locations corresponding to the building exterior, if available, or otherwise positioned where rooms should not be located; by using overall dimensions of the building and/or of particular rooms in the building, if available; etc.) to reach final placement positions for use in the resulting floor map (e.g., to determine relative global positions of the associated room shapes to each other in a common coordinate system or other common frame of reference, such as without knowing the actual measurements of the rooms). In situations with a building having multiple stories or otherwise having multiple levels, the connecting passage information may further be used to associate corresponding portions on different sub-maps of different floors or levels. In addition, if distance scaling information is available for one or more of the images, corresponding distance measurements may be determined, such as to allow room sizes and other distances to be determined and further used for the generated floor map. Additional details are included below regarding automatically determining position placements of the rooms' estimated room shapes relative to each other, including with respect to FIGS. 2K-2O.

In some embodiments, one or more types of additional processing may be further performed, such as to determine additional mapping-related information for a generated floor map or to otherwise associate additional information with a generated floor map. As one example, one or more types of additional information about a building may be received and associated with the floor map (e.g., with particular locations in the floor map), such as additional images, textual and/or audio annotations or other descriptions of particular rooms or other locations, other audio information, such as recordings of ambient noise; overall dimension information, etc. As previously noted, in at least some embodiments, additional processing of images is performed to determine features of one or more types in rooms (e.g., windows, fireplaces, appliances, bath tubs, showers, sinks, etc.), and may be associated with corresponding locations in the floor map, stored and optionally displayed. As another example, in at least some embodiments, additional processing of images is performed to determine estimated distance information of one or more types, such as to measure sizes in images of objects of known size, and use such information to estimate room width, length and/or height dimensions. Such estimated size information for one or more rooms may be associated with the floor map, stored and optionally displayed—if the size information is generated for all rooms within a sufficient degree of accuracy, a more detailed floor map of the building may further be generated, such as with sufficient detail to allow blueprints or other architectural plans to be generated. In addition, if estimated size information includes height information (e.g., from floors to ceilings, such as may be obtained from results of SfM and/or MVS and/or SLAM processing), a 3D model (e.g., with full height information represented) and/or 2.5D (two-and-a-half dimensional) model (e.g., with partial representations of height shown) of some or all of the 2D (two-dimensional) floor map may be created (optionally with information from in-room images projected on the walls of the models), associated with the floor map, stored and optionally displayed. Other types of additional information may be generated or retrieved and used in some embodiments, such as to determine a geographical alignment (e.g., with respect to true north and/or magnetic north) for a building and/or geographical location (e.g., with respect to latitude and longitude, or GPS coordinates) for a building, and to optionally include corresponding information on its generated floor map and/or other generated mapping-related information, and/or to optionally further align the floor map or other generated mapping-related information with other associated external information (e.g., satellite or other external images of the building, including street-level images to provide a 'street view' of the building; information for an area in which the building is located, such as nearby street maps and/or points of interest; etc.). Other information about the building may also be retrieved from, for example, one or more external sources (e.g., online databases, 'crowdsourced' information provided by one or more end users, etc.), and associated with and linked to the floor map and/or to particular locations within the floor map—such additional information may further include, for example, exterior dimensions and/or shape of the building, additional images and/or annotation information acquired corresponding to particular locations within the building (optionally for locations different from viewing locations of the acquired panorama or other images), etc. Such generated floor maps and optionally additional associated information may further be used in various manners, as discussed elsewhere herein.

The described techniques provide various benefits in various embodiments, including to allow floor maps of multi-room buildings and other structures to be generated from videos (or other sequences of images) acquired in the buildings or other structures via automated operations of one or more computing systems, which may provide a particularly rapid process if 360° continuous video or other images are acquired as a capture device is moved through the building, and including doing so without having or using detailed information about distances from images' viewing locations to walls or other objects in a surrounding building or other structure. Furthermore, such automated techniques allow such a floor map to be generated much more quickly than previously existing techniques, and in at least some embodiments with greater accuracy, based at least in part on using information acquired from the actual building environment (rather than from plans on how the building should theoretically be constructed), as well as enabling the capture of changes to structural elements that occur after a building is initially constructed. In addition, in embodiments in which hypothesized wall location information is automatically generated for a room using multiple different techniques (e.g., from analysis of a 3D point cloud or other 3D representation of the room shape, such as generated by a SLAM and/or SfM analysis, and from the analysis of normal and planar information from images in the room) and is used together, the automatically generated wall location information may be determined with even greater degrees of accuracy and/or precision. Such described techniques further provide benefits in allowing improved automated navigation of a building by mobile devices (e.g., semi-autonomous or fully-autonomous vehicles), including to significantly reduce their computing power used and time used to attempt to otherwise learn a building's layout. In addition, in some embodiments the described techniques may be used to provide an improved GUI in which an end user may more accurately and quickly obtain information about a building's interior (e.g., for use in navigating that interior, such as via a virtual tour), including in response to search requests, as part of providing personalized information to the end user, as part of providing value estimates and/or other information about a building to an end user, etc. Various other benefits are also provided by the described techniques, some of which are further described elsewhere herein.

For illustrative purposes, some embodiments are described below in which specific types of information are acquired, used and/or presented in specific ways for specific types of structures and by using specific types of devices—however, it will be understood that the described techniques may be used in other manners in other embodiments, and that the invention is thus not limited to the exemplary details provided. As one non-exclusive example, while floor maps may be generated for houses that do not include detailed measurements for particular rooms or for the overall houses, it will be appreciated that other types of floor maps or other mapping information may be similarly generated in other embodiments, including for buildings (or other structures or layouts) separate from houses. As another non-exclusive example, while video data (e.g., 360° video) may be acquired and used to provide images for image groups in some embodiments, in other embodiments sequences of images may be acquired and used for such image groups in other manners in other embodiments (e.g., by repeatedly moving a camera to acquire still images, such as 360° panorama images, a short distance along a path through a building whose interior will be mapped, such as approximately or exactly every 1 foot or 3 feet or 6 feet or other distance). As yet another non-exclusive example, while floor maps for houses or other buildings may be used for display to assist viewers in navigating the buildings, generated mapping information may be used in other manners in other embodiments. In addition, the term "building" refers herein to any partially or fully enclosed structure, typically but not necessarily encompassing one or more rooms that visually or otherwise divide the interior space of the structure—non-limiting examples of such buildings include houses, apartment buildings or individual apartments therein, condominiums, office buildings, commercial buildings or other wholesale and retail structures (e.g., shopping malls, department stores, warehouses, etc.), etc. The term "acquire" or "capture" as used herein with reference to a building interior, viewing location, or other location (unless context clearly indicates otherwise) may refer to any recording, storage, or logging of media, sensor data, and/or other information related to spatial and/or visual characteristics of the building interior or subsets thereof, such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

Figure 1B:
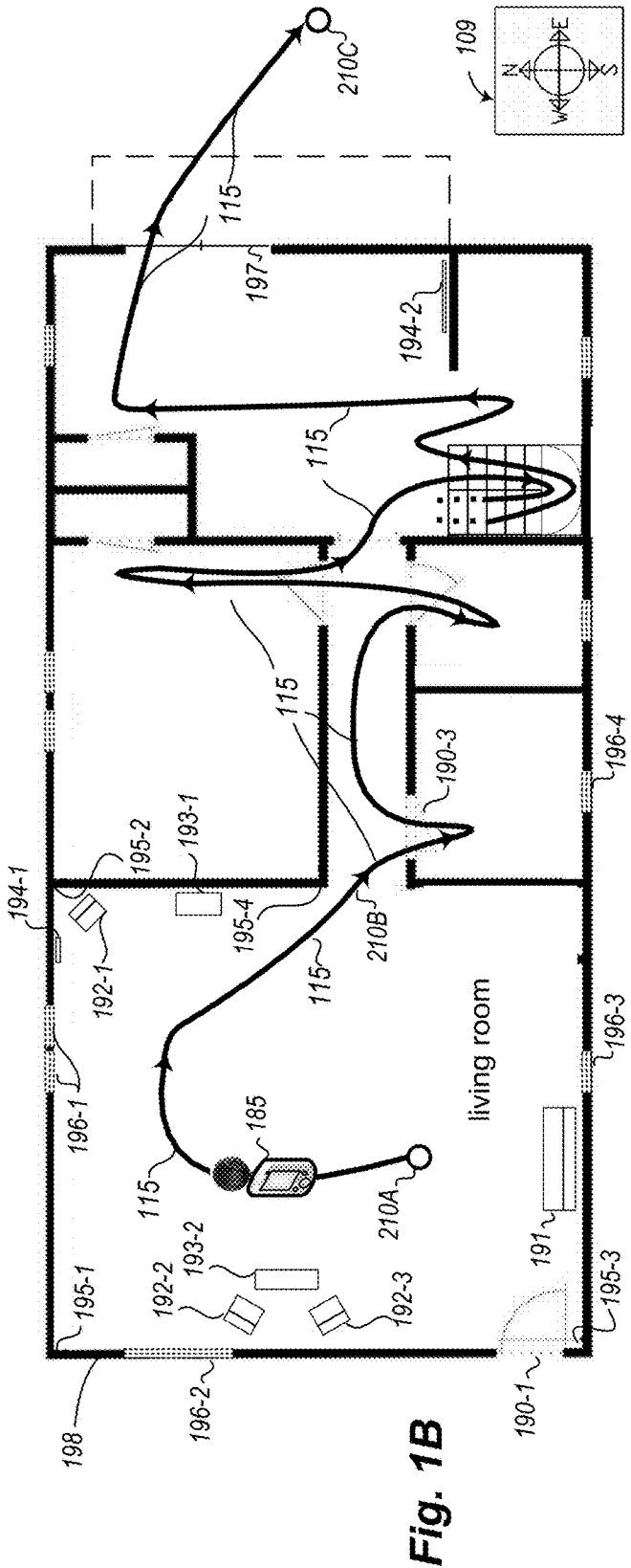
Figure 2A:
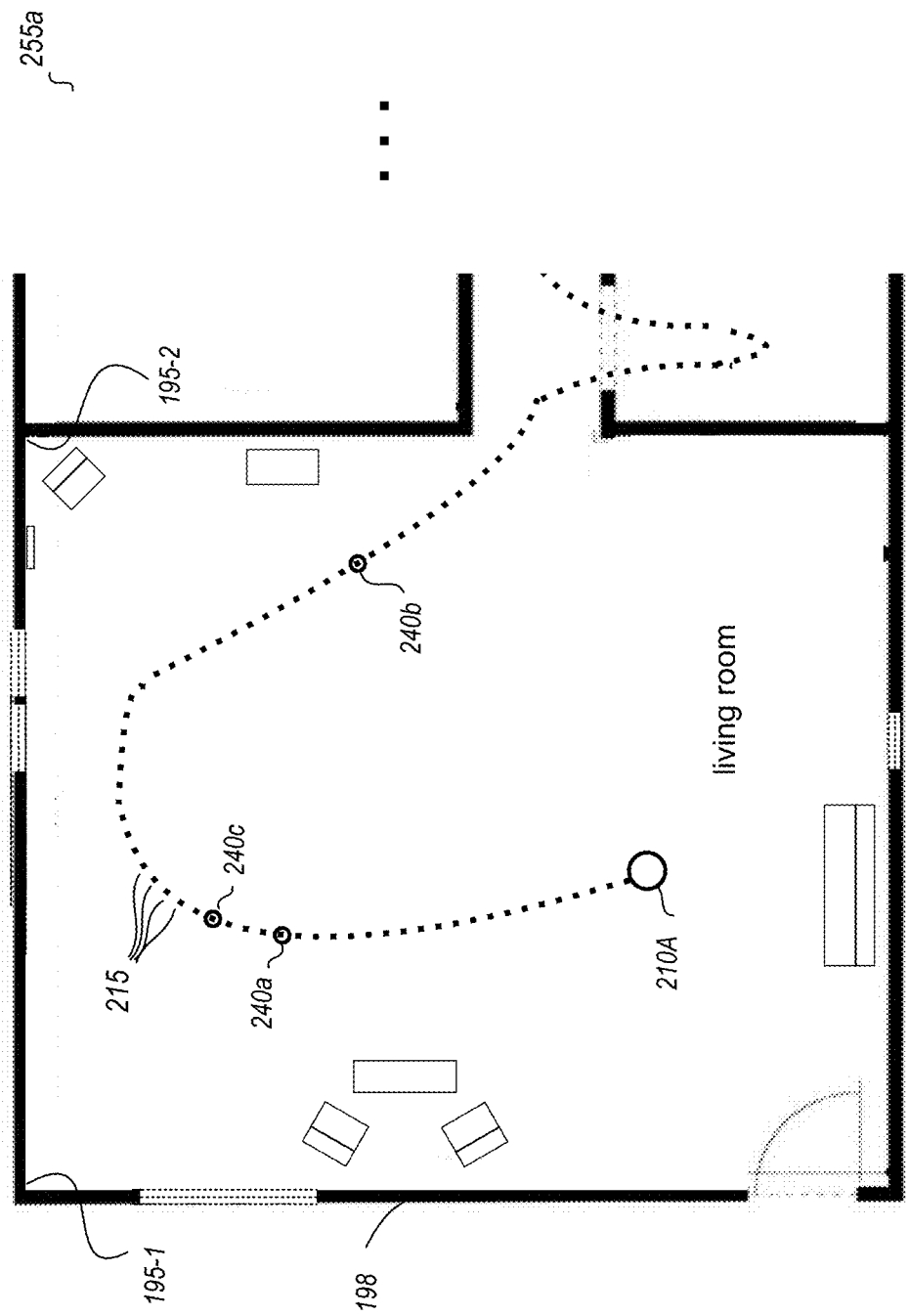
FIGS. 2A-2O illustrate examples of automated operations for analyzing video or other sequences of images from a building's interior and for generating a corresponding floor map for the building.

FIG. 1A is an example block diagram of various computing devices and systems that may participate in the described techniques in some embodiments. In particular, one or more 360° videos (or other sequences of 360° images) 165 have been generated by a Visual data Capture and Analysis ("VCA") system (e.g., a system 160 that is executing on one or more server computing systems 180, and/or a system provided by application 155 executing on one or more mobile visual data acquisition devices 185), such as with respect to one or more buildings or other structures—FIG. 1B shows one example of acquiring such a video for a particular house along a path 115 from starting location 210A and continuing along numerous intermediate locations 210B (with one such example intermediate location 210B shown) and ending at location 210C, and FIGS. 2A-2O illustrate additional details about using images from such a video to generate an associated floor map, as discussed further below. A VTFM (Visual data-To-Floor Map) system 140 is further executing on one or more server computing systems to generate and provide building floor maps 145 and/or other mapping-related information (not shown) based on use of the video/images 165 and optionally additional associated information (e.g., configuration and/or other supporting information supplied by VTFM system operator users via computing devices 105 and intervening computer network(s) 170—additional details related to the automated operation of the VTFM system are included elsewhere herein, including with respect to FIGS. 2A-2O and 5. In some embodiments, the VCA system(s) and VTFM system 140 may execute on the same server computing system(s), such as if both systems are operated by a single entity or are otherwise executed in coordination with each other (e.g., with some or all functionality of both systems integrated together into a larger system), while in other embodiments the VTFM system may instead operate without a VCA system and instead obtain video (or other images) from one or more external sources and optionally store them locally (not shown) with the VTFM system for further analysis and use.

Various components of the mobile visual data acquisition device 185 are illustrated in FIG. 1A, including a browser 162 and/or a VCA system application 155 that are executed in memory 152 of the device 185 by one or more hardware processors 132, and including one or more imaging systems 135 (e.g., a 360° lens or one or more other fisheye lenses) to acquire visual data. The illustrated embodiment of mobile device 185 further includes one or more sensor modules 148 that include a gyroscope 148a, accelerometer 148b and compass 148c in this example (e.g., as part of one or more IMU units, not shown separately, on the mobile device), optionally a GPS (or Global Positioning System) sensor or other position determination sensor (not shown in this example), a display system 142, etc. Other computing devices/systems 105, 175 and 180 may include various hardware components and stored information in a manner analogous to mobile device 185, which are not shown in this example for the sake of brevity, and as discussed in greater detail below with respect to FIG. 3.

In the example of FIG. 1A, the VCA system may perform automated operations involved in generating 360° video along a path through a building interior (e.g., in multiple rooms or other locations within a building or other structure), and optionally around some or all of the exterior of the building or other structure, such as using visual data acquired via the mobile device(s) 185, and for use in generating and providing a representation of an interior of the building or other structure. For example, in at least some such embodiments, such techniques may include using one or more mobile devices (e.g., a camera having one or more fisheye lenses sufficient to capture 360 degrees horizontally simultaneously, such as held by or mounted on a user or the user's clothing, etc.) to capture data from a building interior, but without having measured depth information to objects in an environment around the mobile device(s) (e.g., without using any depth-sensing sensors). Additional details related to embodiments of a system providing at least some such functionality of a VCA system (including an ICA system that may produce sequences of images) are included in U.S. Non-Provisional patent application Ser. No. 16/236,187, filed Dec. 28, 2018 and entitled "Automated Control Of Image Acquisition Via Use Of Acquisition Device Sensors"; in U.S. Non-Provisional patent application Ser. No. 16/190, 162, filed Nov. 14, 2018 and entitled "Automated Mapping Information Generation From Inter-Connected Images"; in U.S. Non-Provisional patent application Ser. No. 17/013, 323, filed Sep. 4, 2020 and entitled "Automated Analysis Of Image Contents To Determine The Acquisition Location Of The Image"; and in U.S. Non-Provisional patent application Ser. No. 15/649,434, filed Jul. 13, 2017 and entitled "Connecting And Using Building Interior Data Acquired From Mobile Devices" (which includes disclosure of a BICA system that an example embodiment of a VCA system generally directed to obtaining and using panorama images from within one or more buildings or other structures); each of which is incorporated herein by reference in its entirety.

One or more end users (not shown) of one or more map viewer client computing devices 175 may further interact over computer networks 170 with the VTFM system 140 (and optionally the VCA system 160), such as to obtain, display and interact with a generated floor map. In addition, while not illustrated in FIG. 1A, a 2D floor map (or portion of it) may be linked to or otherwise associated with one or more additional types of information, such as one or more associated and linked images or other associated and linked information, a corresponding separate 3D floor map model rendering of the building and/or 2.5D model rendering of the building, etc., and including for a floor map of a multi-story or otherwise multi-level building to have multiple associated sub-floor maps for different stories or levels that are interlinked (e.g., via connecting stairway passages). Accordingly, non-exclusive examples of an end user's interactions with a displayed or otherwise generated 2D floor map of a building may include one or more of the following: to change between a floor map view and a view of a particular image at a viewing location within or near the floor map; to change between a 2D floor map view and a 2.5D or 3D model view that optionally includes images texture-mapped to walls of the displayed model; to change the horizontal and/or vertical viewing direction from which a corresponding subset view of (or portal into) a panorama image is displayed, such as to determine a portion of a panorama image in a 3D spherical coordinate system to which a current user viewing direction is directed, and to render a corresponding planar image that illustrates that portion of the panorama image without the curvature or other distortions present in the original panorama image; etc. Additional details regarding example embodiments of a system to provide or otherwise support at least some functionality of a building map viewer system and routine as discussed herein, are included with respect to an example ILTM system in U.S. Non-Provisional patent application Ser. No. 15/950,881, filed Apr. 11, 2018 and entitled "Presenting Image Transition Sequences Between Viewing Locations"; with respect to an example BMLSM system in U.S. Provisional Patent Application No. 62/911,959, filed Oct. 7, 2019 and entitled "Providing Simulated Lighting Information For Three-Dimensional Building Models"; with respect to an example BMLSM system in U.S. Non-Provisional patent application Ser. No. 16/841,581, filed Apr. 6, 2020 and entitled "Providing Simulated Lighting Information For Three-Dimensional Building Models"; and with respect to an example FPSDM system in U.S. Provisional Patent Application No. 63/081,744, filed Sep. 22, 2020 and entitled "Automated Identification And Use Of Building Floor Plan Information"; each of which is incorporated herein by reference in its entirety. In addition, while not illustrated in FIG. 1A, in some embodiments the client computing devices 175 (or other devices, not shown) may receive and use generated floor maps and/or other generated mapping-related information in additional manners, such as to control or assist automated navigation activities by those devices (e.g., by autonomous vehicles or other devices), whether instead of or in addition to display of the generated information. In at least some embodiments and situations, the presentation or other display of a 3D floor map model and/or of a 2D floor map of a building may occur on a screen of a client device with which one or more end users are interacting via keyboard, touch or other input devices, while in other embodiments and situations, such presentation or other display of a 3D floor map model and/or of a 2D floor map may be performed on a head-mounted display device worn by an end user, such as to provide a virtual reality and/or augmented reality display of the building with which the end user can interact and move about (e.g., as part of entertainment activities being provided to the end user).

In the depicted computing environment of FIG. 1A, the network 170 may be one or more publicly accessible linked networks, possibly operated by various distinct parties, such as the Internet. In other implementations, the network 170 may have other forms, such as to instead be a private network (such as a corporate or university network) that is wholly or partially inaccessible to non-privileged users. In still other implementations, the network 170 may include both private and public networks, with one or more of the private networks having access to and/or from one or more of the public networks. Furthermore, the network 170 may include various types of wired and/or wireless networks and connections in various situations.

FIG. 1B depicts a block diagram of an exemplary building interior environment in which 360° video is generated, for use by the VTFM system to generate and provide a corresponding building floor map, as discussed in greater detail with respect to FIGS. 2A-20. In particular, FIG. 1B illustrates one story of a multi-story building 198 with an interior that was captured at least in part via a 360° video by a mobile visual data acquisition device 185 with video acquisition capabilities as it is moved through the building interior along travel path 115. An embodiment of the VCA system (e.g., VCA system 160 on server computing system(s) 180, a copy 155 of some or all of the VCA system executing on the mobile visual data acquisition device 185, etc.) may automatically perform or assist in the capturing of the video data representing the building interior, as well as to further analyze the captured video data to generate a floor map or other visual representation of the building interior. While such a mobile visual data acquisition device may include various hardware components, such as one or more camera lenses and corresponding image sensors, one or more other hardware sensors (e.g., a gyroscope, an accelerometer, a compass, etc., such as part of one or more IMUs, or inertial measurement units, of the mobile device; an altimeter; light detector; etc.), a GPS receiver, one or more hardware processors, memory, a display, a microphone, etc., the mobile device may not in at least some embodiments have access to or use equipment to measure the depth of objects in the building relative to a location of the mobile device, such that relationships of video capture locations to the surrounding structure of the building may be determined in part or in whole based on features in different frames/images, but without using any data from any such depth sensors. In addition, while directional indicator 109 is provided in FIG. 1B for reference of the viewer, the mobile device and/or VCA system may not use such absolute directional information in at least some embodiments, such as to instead determine relative directions and distances without regard to actual geographical positions or directions in such embodiments.

In operation, the mobile visual data acquisition device 185 arrives at a first viewing location 210A within a first room of the building interior (in this example, in a living room accessible via an external door 190-1), and initiates a video capture that begins with a portion of the building interior that is visible from that viewing location 210A (e.g., some or all of the first room, and optionally small portions of one or more other adjacent or nearby rooms, such as through doors, halls, stairs or other connecting passages from the first room). The video capture may be performed in various manners as discussed herein, and may include a number of objects or other features (e.g., structural details) that may be visible in images captured from a particular capture location—in the example of FIG. 1B, such objects or other features along the path 115 may include the doorways 190 (including 190-1 and 190-3) and 197 (e.g., with swinging and/or sliding doors), windows 196 (including 196-1, 196-2, 196-3 and 196-4), corners or edges 195 (including corner 195-1 in the northwest corner of the building 198, corner 195-2 in the northeast corner of the first room, corner 195-3 in the southwest corner of the first room, corner 195-4 at the northern edge of the inter-room passage between the first room and a hallway, etc.), furniture 191-193 (e.g., a couch 191; chairs 192-1 to 192-3; tables 193-1 and 193-2; etc.), pictures or paintings or televisions or other hanging objects 194 (such as 194-1 and 194-2) hung on walls, light fixtures, various built-in appliances or fixtures (not shown), etc. The user may also optionally provide a textual or auditory identifier to be associated with one or more capture locations at which the mobile device is located, such as "living room" for the room including capture location 210A, while in other embodiments the VTFM system may automatically generate such identifiers (e.g., by automatically analyzing video and/or other recorded information for a building to perform a corresponding automated determination, such as by using machine learning) or the VCA system may instead determine such identifiers or the identifiers may not be used. After the video is captured at the beginning viewing location 210A, the mobile device 185 may move or be moved along the path 115 throughout the building interior, recording video and optionally other data from the hardware components (e.g., from one or more IMUs, a light detector, etc.). This process may optionally continue external to the building, as illustrated for ending capture location 210C in this example.

Various details are provided with respect to FIGS. 1A-1B, but it will be appreciated that the provided details are non-exclusive examples included for illustrative purposes, and other embodiments may be performed in other manners without some or all such details.

FIGS. 2A-2O illustrate examples of generating and presenting a floor map for a building using 360° video and/or other visual information of the building interior, such as for the building 198 and using video captured along the path 115 discussed in FIG. 1B.

In particular, FIG. 2A includes information 255a illustrating a portion of the house 198 of FIG. 1B, including the living room and portions of the further rooms to the east of the living room. In this example, information is illustrated for a portion of the path 115 illustrated in FIG. 1B, and in particular illustrates a sequence of locations 215 along the path at which one or more video frame images are captured of the surrounding interior of the house—examples of such locations include capture locations 240a-c, with further information related to video frame images captured from those locations shown in FIGS. 2B-2D. In this example, the locations 215 along the path are shown as being separated by short distances (e.g., a foot, an inch, a fraction of an inch, etc.), although it will be appreciated that video capture may be substantially continuous—thus, in at least some embodiments, the selection of video frame images for an image group to be analyzed may include selecting images that are separated by such distances and/or that are separated by a short period of time between their capture (e.g., a second, a fraction of a second, multiple seconds, etc.). In other embodiments, video frame images may be selected for use in the image group based on other criteria, whether in addition to or instead of separation by distance and/or time.

Figure 2B:
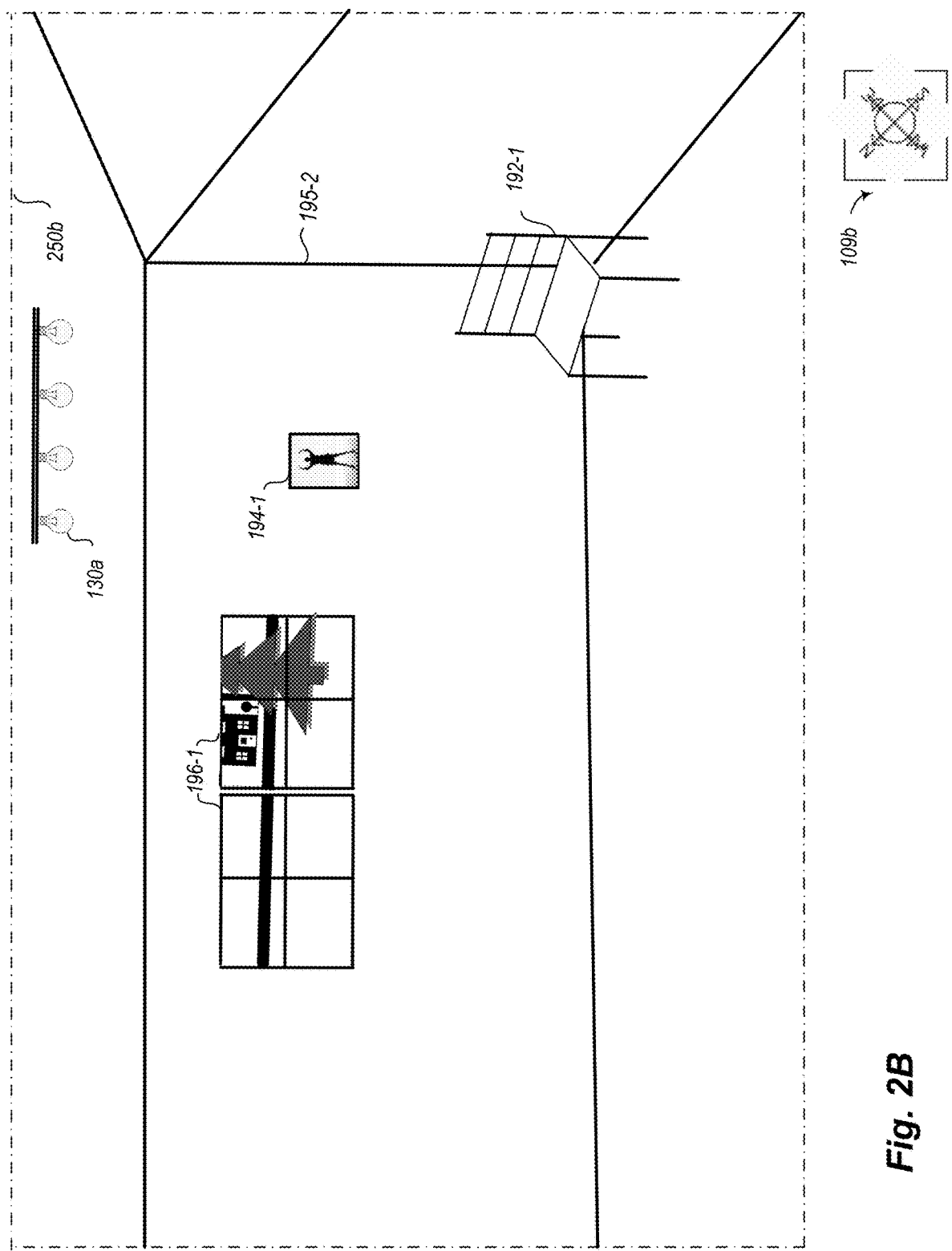

FIG. 2B continues the example of FIG. 2A, and illustrates an example image 250b captured from capture location 240b of FIG. 2A—the illustrated image is a perspective image taken in a northeasterly direction, such as a northeasterly facing subset view of a 360-degree frame taken from that viewing location during video capture along the path 115 (or may instead be captured directly as a perspective image)—the directional indicator 109b is further displayed in this example to illustrate the northeasterly direction in which the image is taken. In the illustrated example, the displayed image includes various features that may be detected during subsequent automated analysis of the image, including built-in elements (e.g., light fixture 130a), furniture (e.g., chair 192-1), two windows 196-1, a picture 194-1 hanging on the north wall of the living room, and multiple room borders (including horizontal borders between a visible portion of the north wall of the living room and the living room's ceiling and floor, horizontal borders between a visible portion of the east wall of the living room and the living room's ceiling and floor, and the vertical border 195-2 between the north and east walls. No inter-room passages into or out of the living room (e.g., doors or other wall openings) are visible in this image.

FIGS. 2C and 2D further continue the examples of FIGS. 2A-2B, and illustrate additional example perspective images 250c and 250d, respectively, that are captured at locations 240a and 240c of FIG. 2A, respectively. In the examples of FIGS. 2C and 2D, the images are taken in a northwesterly direction, including to capture the northwest corner 195-1 of the living room—in a manner similar to that of image 250b of FIG. 2B, images 250c and 250d may each be subsets of larger 360° panorama image frames (e.g., consecutive frames, or frames separated by at most a specified amount of time) from captured video along the path 115 (or may instead be captured directly as perspective images). As with image 250b, images 250c and 250d include various features that may be detected during subsequent automated analysis of the images, including light fixture 130b, window 196-2, multiple room borders (including horizontal borders between a visible portion of the north wall of the living room and the living room's ceiling and floor, horizontal borders between a visible portion of the west wall of the living room and the living room's ceiling and floor, and the vertical border 195-1 between the north and west walls, although no inter-room passages into or out of the living room (e.g., doors or other wall openings) are visible in these images.

Images 250c and 250d illustrate that, since their capture locations 240a and 240c are close to each other, the contents of their images differ only in relatively small amounts, and thus images 250c and 250d share many features that may be identified in an automated analysis of the images but provide only limited information about differences in locations of those features between the images. To illustrate some such differences, image 250d is modified in this example to illustrate visual indications 285g of differences from corner 195-1 in image 250d to the corner's location in image 250c (as shown in dotted lines 262 in FIG. 2D for the purpose of comparison, but which would not otherwise be visible in image 250d). Since these differences are small, they provide only limited information from which the automated analysis may determine the size and shapes of the features and their distance from the capture locations of the respective images. Conversely, the capture location of 240b for image 250b differs significantly from capture locations 240a and 240c, but there may be little overlap in features between images captured from such capture locations if the images are perspective images in particular directions/orientations. However, by using 360° image frames at locations 215 that each capture substantially all of the interior of the living room, various matching features may be detected and used in each sub-group of two or more such images, as illustrated further with respect to FIGS. 2E-2J.

FIGS. 2E-2J continue the examples of FIGS. 2A-2D, and illustrate additional information about the living room and about analyzing 360° image frames from the video captured along the path 155 in order to determine the likely shape of the room. In particular, FIG. 2E includes information 255*e* illustrating that a 360° image frame taken from location 240*b* will share information about a variety of features with that of a 360° image frame taken from location 240*a*, although such features are only illustrated in FIG. 2E for a portion of the living room for the sake of simplicity. In FIG. 2E, example lines of sight 228 from location 240*b* to various example features in the room are shown, and similar example lines of sight 227 from location 240*a* to corresponding features are shown, which illustrate degrees of difference between the views at significantly spaced capture locations. Accordingly, analysis of the sequence of images in the image group corresponding to locations 215 of FIG. 2A using SLAM and/or MVS and/or SfM techniques may provide a variety of information about the features of the living room, including information about associated planes of the features and normal orthogonal directions from the planes, as illustrated further with respect to FIGS. 2F-2I.

In particular, FIG. 2F illustrates information 255*f* about the northeast portion of the living room that is visible in subsets of 360° image frames taken from locations 240*a* and 240*b*, and FIG. 2G illustrates information 255*g* about the northwest portion of the living room that is visible in other subsets of 360° image frames taken from locations 240*a* and 240*b*, with various features in those portions of the living room being visible in both 360° image frames (e.g., corners 195-1 and 195-2, windows 196-1 and 1962, etc. As part of the automated analysis of the 360° image frames using the SLAM and/or MVS and/or SfM techniques, information about planes 286*e* and 286*f* corresponding to portions of the northern wall of the living room may be determined from the features that are detected, and information 287*e* and 285*f* about portions of the east and west walls of the living room may be similarly determined from corresponding features identified in the images. In addition to identifying such plane information for detected features (e.g., for each point in a determined sparse 3D point cloud from the image analysis), the SLAM and/or MVS and/or SfM techniques may further determine information about likely positions and orientations/directions 220 for the image(s) from capture location 240*a*, and likely positions and orientations/directions 222 for the image(s) from capture location 240*b* (e.g., positions 220*g* and 222*g* in FIG. 2F of the capture locations 240*a* and 240*b*, respectively, and optionally directions 220*e* and 222*e* for the image subsets shown in FIG. 2F; and corresponding positions 220*g* and 222*g* in FIG. 2G of the capture locations 240*a* and 240*b*, respectively, and optionally directions 220*f* and 222*f* for the image subsets shown in FIG. 2G). While only features for part of the living room are illustrated in FIGS. 2F and 2G, it will be appreciated that the other portions of the 360° image frames corresponding to other portions of the living room may be analyzed in a similar manner, in order to determine possible information about possible planes for the various walls of the room, as well as for other features (not shown) in the living room. In addition, similar analyses may be performed between some or all other images at locations 215 in the living room that are selected for use in the image group, resulting in a variety of determined feature planes from the various image analyses that may correspond to walls of the room.

FIG. 2H continues the examples of FIGS. 2A-2G, and illustrates information 255*h* about a variety of determined feature planes that may correspond to the west and north walls of the living room, from analyses of the 360° image frames captured at locations 240*a* and 240*b*. The illustrated plane information includes determined planes 286G near or at the northern wall (and thus corresponding possible locations of the northern wall), and determined planes 285G near or at the western wall (and thus corresponding possible locations of the western wall). As would be expected, there are a number of variations in different determined planes for the northern and western walls from different features detected in the analysis of the two 360° image frames, such as differences in position, angle and/or length, causing uncertainty as to the actual exact position and angle of each of the walls. While not illustrated in FIG. 2H, it will be appreciated that similar determined feature planes for the other walls of the living room would similarly be detected, along with determined feature planes corresponding to features that are not along the walls (e.g., furniture).

FIG. 2I continues the examples of FIGS. 2A-2H, and illustrates information 255*i* about additional determined feature planes that may correspond to the west and north walls of the living room, from analyses of various additional 360° image frames selected for the image group corresponding to example locations 240 along the path 115 in the living room—as would be expected, the analyses of the further images provides even greater variations in different determined planes for the northern and western walls. FIG. 2I further illustrates additional determined information that is used to aggregate information about the various determined feature planes in order to identify likely locations 295*a* and 295*b* of the west and north walls, as illustrated in information 255*j* of FIG. 2J. In particular, FIG. 2I illustrates information 291*a* about normal orthogonal directions for some of the determined feature planes corresponding to the west wall, along with additional information 290*a* about those determined feature planes. In the example embodiment, the determined feature planes are clustered to represent hypothesized wall locations of the west wall, and the information about the hypothesized wall locations is combined to determine the likely wall location 295*a*, such as by weighting information from the various clusters and/or the underlying determined feature planes. In at least some embodiments, the hypothesized wall locations and/or normal information is analyzed via use of machine learning techniques to determine the resulting likely wall location, optionally by further applying assumptions or other constraints (such as a 90° corner, as illustrated in information 282 of FIG. 2H, and/or having flat walls) as part of the machine learning analysis or to results of the analysis. Similar analysis may be performed for the north wall using information 290*b* about corresponding determined feature planes and additional information 291*b* about resulting normal orthogonal directions for at least some of those determined feature planes. FIG. 2J illustrates the resulting likely wall locations 295*a* and 295*b* for the west and north walls of the living room, respectively.

While not illustrated in FIG. 2I, it will be appreciated that similar determined feature planes and corresponding normal directions for the other walls of the living room will similarly be detected and analyzed to determine their likely locations, resulting in an estimated overall room shape for the living room. In addition, similar analyses are performed for each of the rooms of the building, providing estimated room shapes of each of the rooms.

Figure 2K:
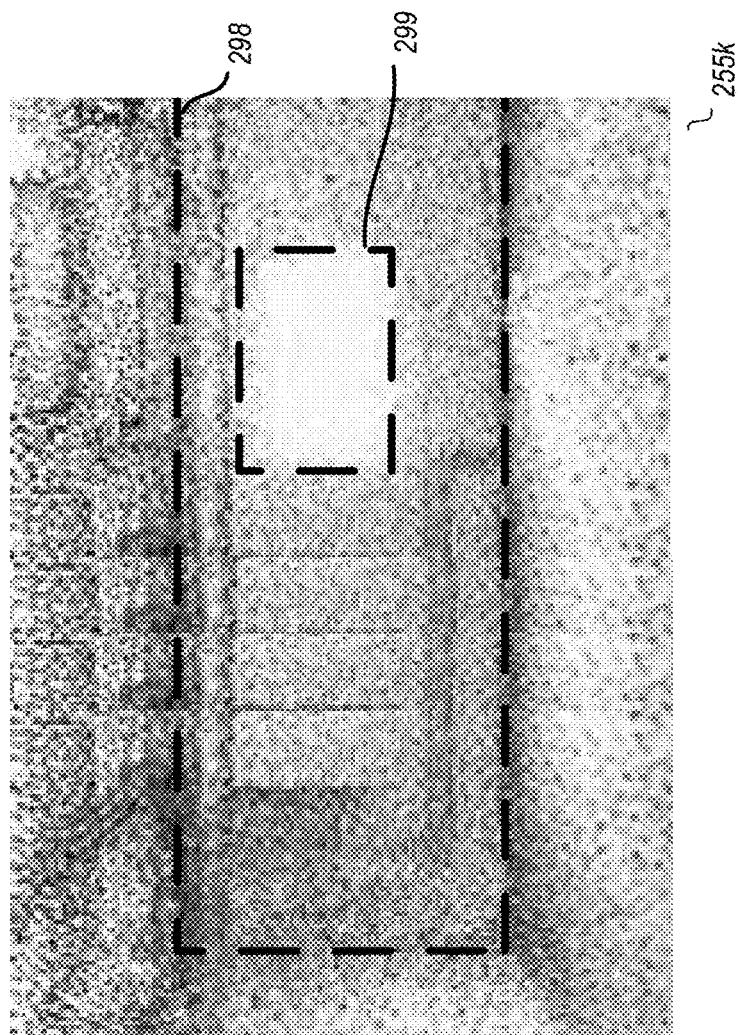

FIG. 2K continues the examples of FIGS. 2A-2J, and illustrates information 255*k* about additional information that may be generated from images in an image group and used in one or more manners in at least some embodiments. In particular, video frames captured in the living room of the house 198 may be analyzed in order to determine a 3D shape of the living room, such as from a 3D point cloud of features detected in the video frames (e.g., using SLAM and/or SfM and/or MVS techniques). In this example, information 255*k* reflects an example portion of such a point cloud for the living room, such as in this example to correspond to a northwesterly portion of the living room (e.g., to include northwest corner 195-1 of the living room, as well as windows 196-1) in a manner similar to image 250*c* of FIG. 2C. Such a point cloud may be further analyzed to determine planar areas, such as to correspond to walls, the ceiling, floor, etc., as well as in some cases to detect features such as windows, doorways and other inter-room openings, etc.—in this example, a first planar area 298 corresponding to the north wall of the living room is identified, with a second planar area 299 corresponding to windows 196-1 being further identified. It will be appreciated that various other walls and other features may be similarity identified in the living room and in the other rooms of the house 198.

Figure 2L:
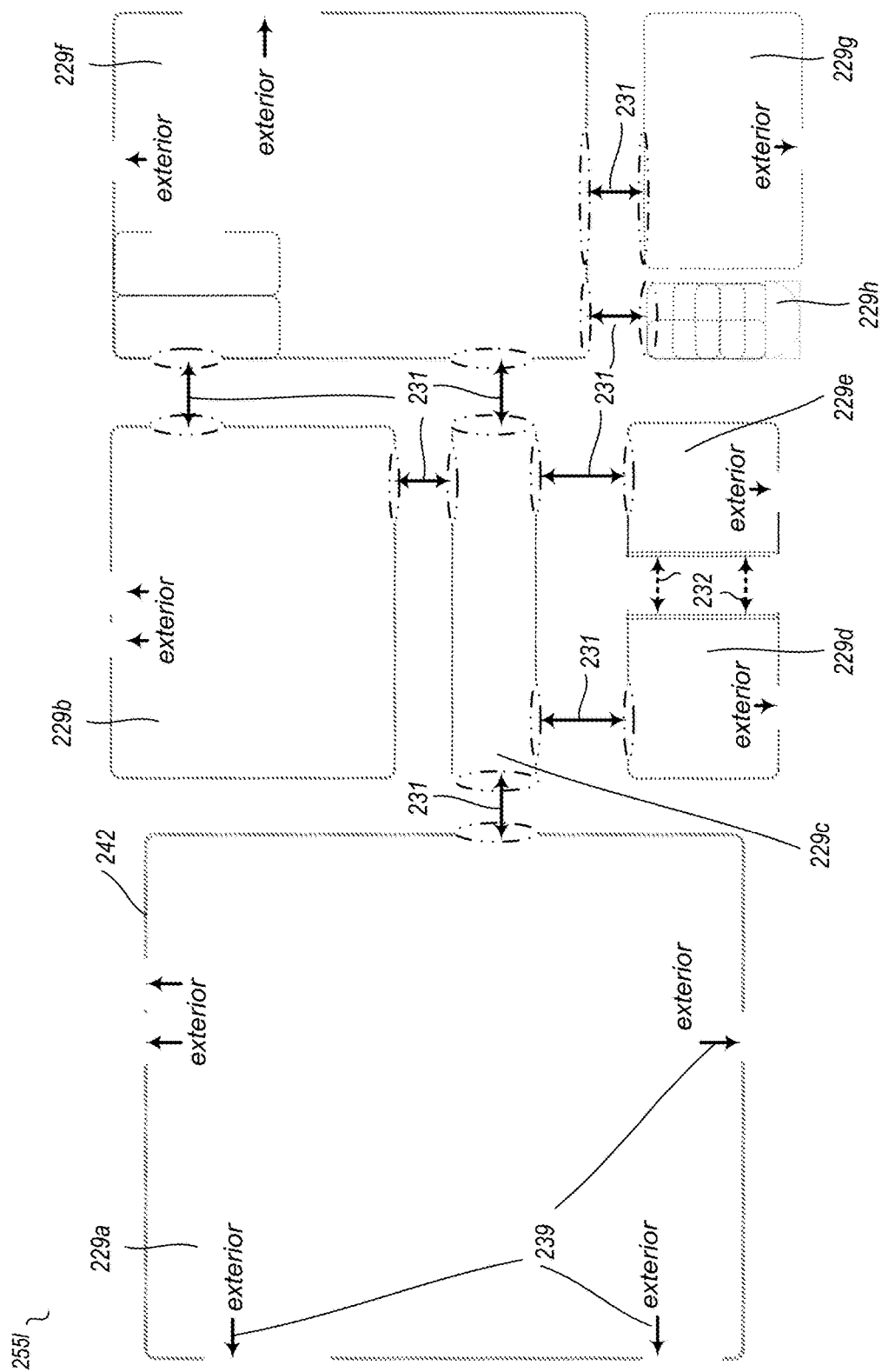

FIG. 2L illustrates additional information 255l corresponding to, after estimated room shapes are determined for the rooms of the illustrated floor of the house 198, positioning the rooms' estimated room shapes relative to each other, based at least in part on connecting inter-room passages between rooms and matching room shape information between adjoining rooms—in at least some embodiments, such information may be treated as constraints on the positioning of the rooms, and an optimal or otherwise preferred solution is determined for those constraints. Examples of such constraints in FIG. 2L include matching 231 connecting passage information (e.g., passages detected in the automated image analyses discussed with respect to FIGS. 2E-2J) for adjacent rooms so that the locations of those passages are co-located, and matching 232 shapes of adjacent rooms in order to connect those shapes (e.g., as shown for rooms 229*d* and 229*e*). Various other types of information may be used in other embodiments for room shape positions, whether in addition to or instead of pass-based constraints and/or room shape-based constraints, such as exact or approximate dimensions for overall size of the house (e.g., based on additional metadata available regarding the building, analysis of images from one or more capture locations external to the building, etc.). House exterior information 239 may further be identified and used as constraints (e.g., based at least in part of automated identification of passages and other features corresponding to the building exterior, such as windows), such as to prevent another room from being placed at a location that has been identified as the building's exterior.

Figure 2M:
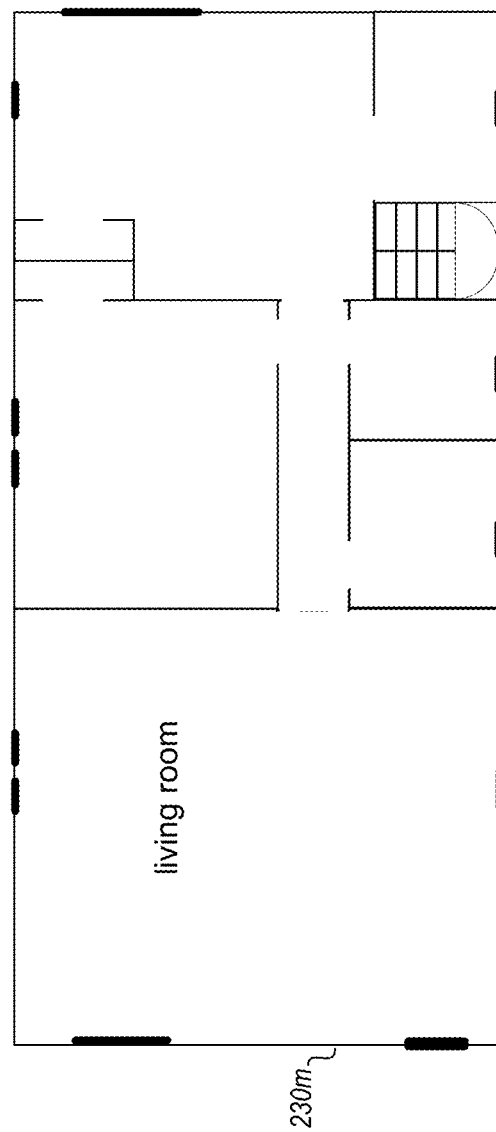
Figure 2N:
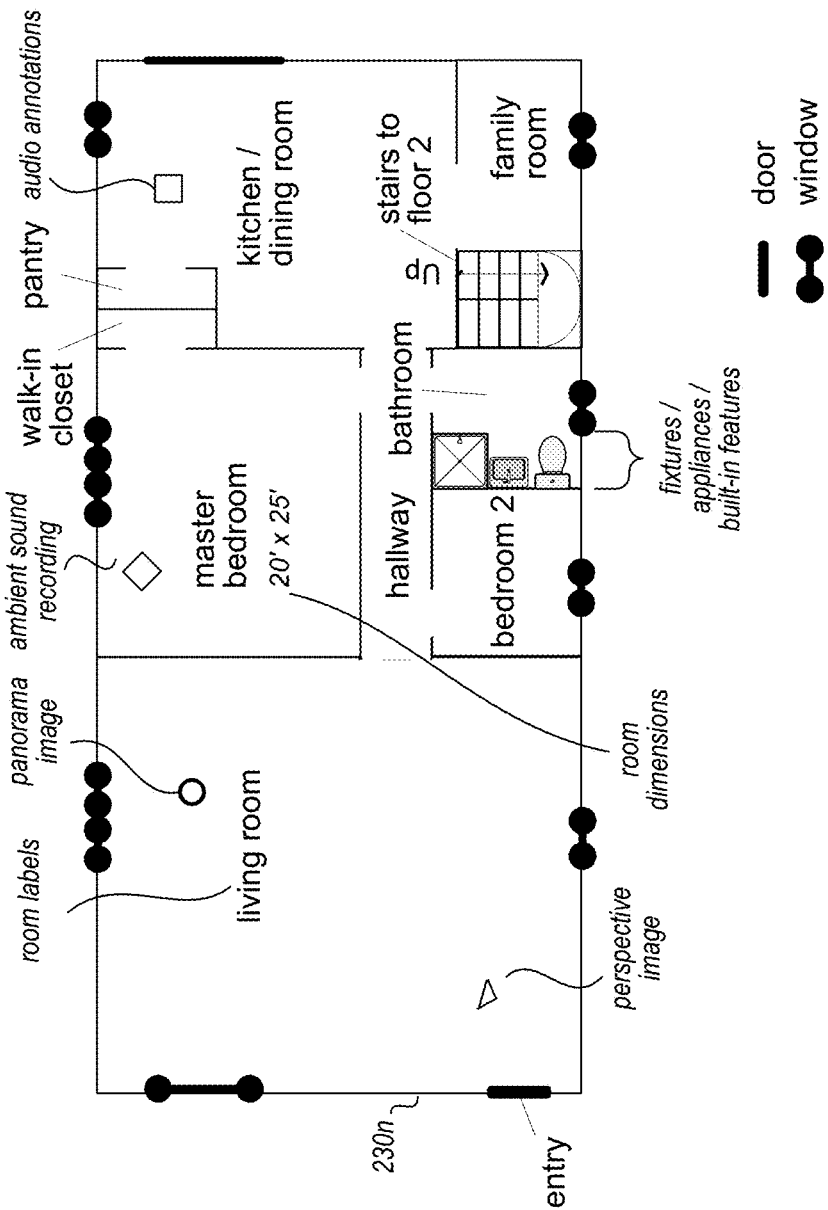
Figure 2O:
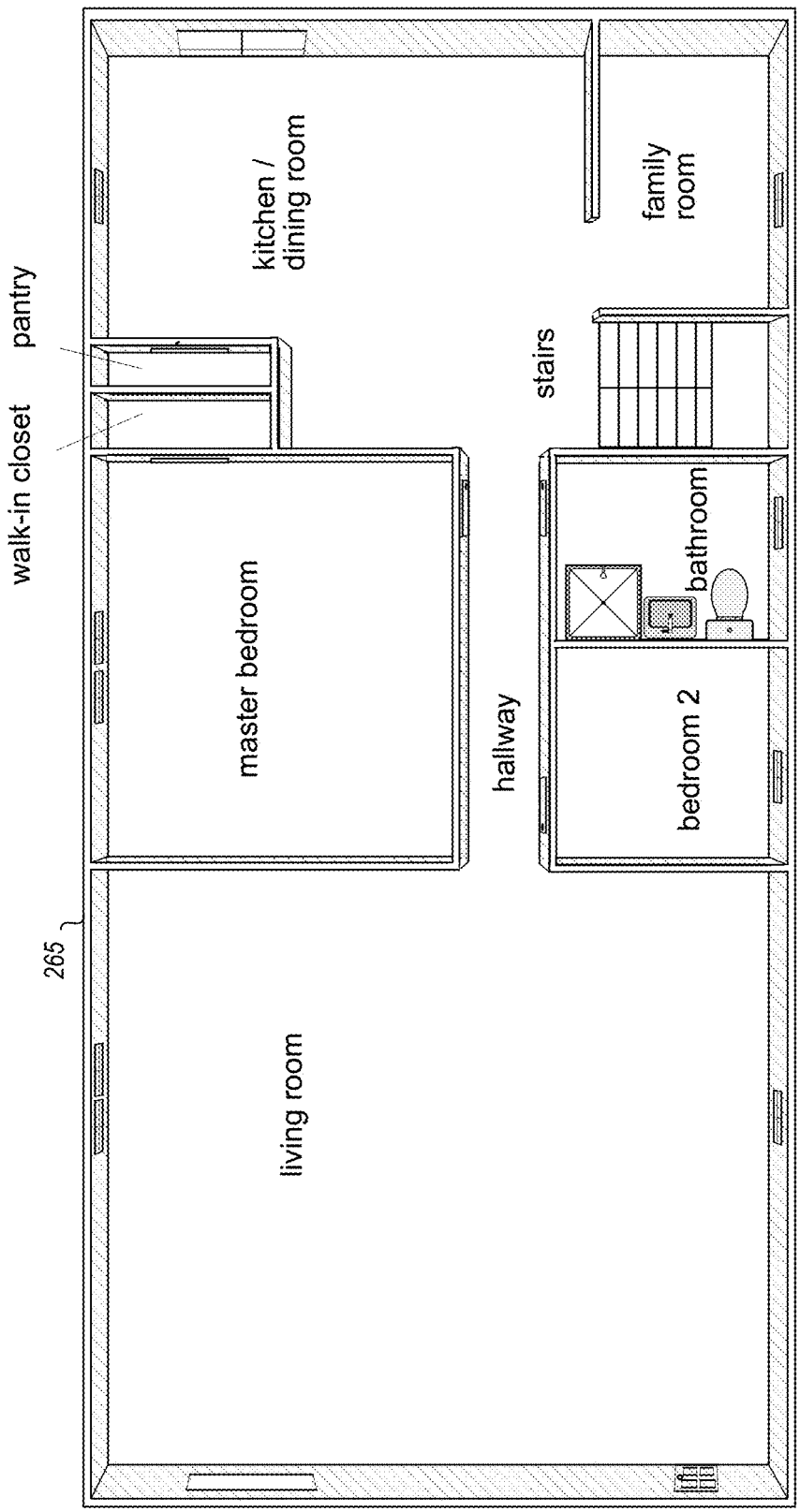

FIGS. 2M-2O continue the examples of FIG. 2A-2L, and illustrate mapping information that may be generated from the types of analyses discussed in FIGS. 2A-2L. In particular, FIG. 2M illustrates an example floor map 230*m* that may be constructed based on the positioning of the estimated room shapes, which in this example includes walls and indications of doors and windows. In some embodiments, such a floor map may have further information shown, such as about other features that are automatically detected by the image analysis and/or that are subsequently added by one or more users. For example, FIG. 2N illustrates a modified floor map 230*n* that includes additional information of various types, such as may be automatically identified from image analysis and added to the floor map 230*m*, including one or more of the following types of information: room labels (e.g., "living room" for the living room), room dimensions, visual indications of fixtures or appliances or other built-in features, visual indications of positions of additional types of associated and linked information (e.g., of panorama images and/or perspective images that an end user may select for further display, of audio annotations and/or sound recordings that an end user may select for further presentation, etc.), visual indications of doors and windows, etc.—in other embodiments and situations, some or all such types of information may instead be provided by one or more VTFM system operator users and/or VCA system operator users. In addition, when the floor maps 230*m* and/or 230*n* are displayed to an end user, one or more user-selectable controls may be added to indicate a current floor that is displayed and/or to allow the end user to select a different floor to be displayed—in some embodiments, a change in floors or other levels may also be made directly from the displayed floor map, such as via selection of a corresponding connecting passage (e.g., stairs to a different floor). It will be appreciated that a variety of other types of information may be added in some embodiments, that some of the illustrated types of information may not be provided in some embodiments, and that visual indications of and user selections of linked and associated information may be displayed and selected in other manners in other embodiments.

FIG. 2O continues the examples of FIGS. 2A-2N, and Illustrates additional information 265 that may be generated from the automated analysis techniques disclosed herein, which in this example is a 2.5D or 3D model of the floor of the house. Such a model 265 may be additional mapping-related information that is generated based on the floor map 230*m* or 230*n*, but with additional information about height shown in order to illustrate visual locations in walls of features such as windows and doors. While not illustrated in FIG. 2O, additional information may be added to the displayed walls in some embodiments, such as from images taken during the video capture (e.g., to illustrate actual paint, wallpaper or other surfaces from the house on the rendered model 265).

Various details have been provided with respect to FIGS. 2A-2O, but it will be appreciated that the provided details are non-exclusive examples included for illustrative purposes, and other embodiments may be performed in other manners without some or all such details.

Figure 3:
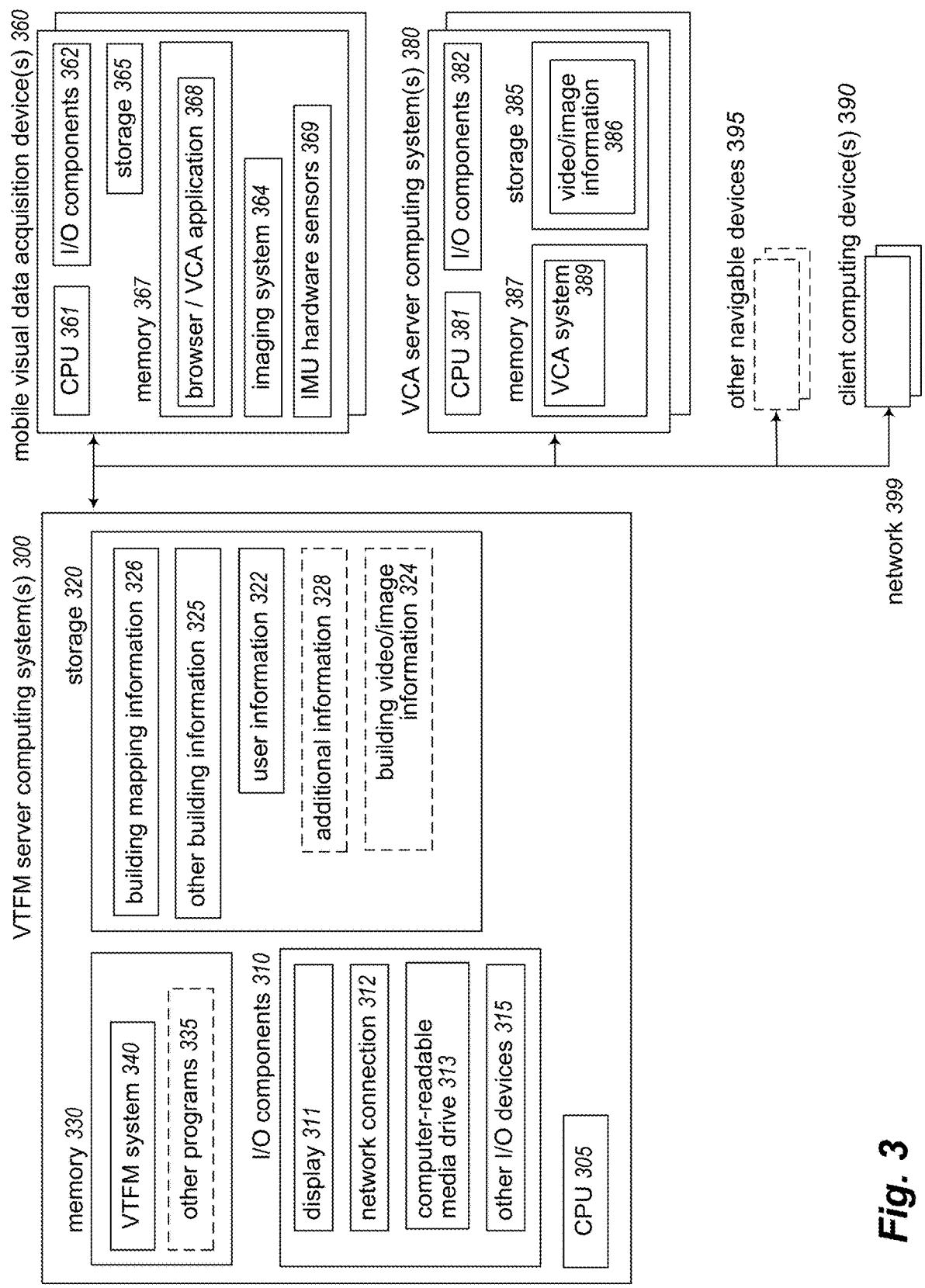
FIG. 3 is a block diagram illustrating computing systems suitable for executing embodiments of one or more systems that perform at least some of the techniques described in the present disclosure.

FIG. 3 is a block diagram illustrating an embodiment of one or more server computing systems 300 executing an implementation of a VTFM system 340, and one or more server computing systems 380 executing an implementation of a VCA system 389—the server computing system(s) and VTFM and/or VCA systems may be implemented using a plurality of hardware components that form electronic circuits suitable for and configured to, when in combined operation, perform at least some of the techniques described herein. In the illustrated embodiment, each server computing system 300 includes one or more hardware central processing units ("CPUs") or other hardware processors 305, various input/output ("I/O") components 310, storage 320, and memory 330, with the illustrated I/O components including a display 311, a network connection 312, a computer-readable media drive 313, and other I/O devices 315 (e.g., keyboards, mice or other pointing devices, microphones, speakers, GPS receivers, etc.). Each server computing system 380 may have similar components, although only one or more hardware processors 381, memory 387, storage 385 and I/O components 382 are illustrated in this example for the sake of brevity.

The server computing system(s) 300 and executing VTFM system 340, and server computing system(s) 380 and executing VCA system 389, may communicate with each other and with other computing systems and devices in this illustrated embodiment via one or more networks 399 (e.g., the Internet, one or more cellular telephone networks, etc.), such as to interact with user client computing devices 390 (e.g., used to view floor maps, and optionally associated images and/or other related information), and/or mobile visual data acquisition devices 360 (e.g., used to acquire video and optionally additional images and/or other information for buildings or other environments to be modeled), and/or optionally other navigable devices 395 that receive and use floor maps and optionally other generated information for navigation purposes (e.g., for use by semi-autonomous or fully autonomous vehicles or other devices). In other embodiments, some of the described functionality may be combined in less computing systems, such as to combine the VTFM system 340 and the visual data acquisition functionality of device(s) 360 in a single system or device, to combine the VCA system 389 and the visual data acquisition functionality of device(s) 360 in a single system or device, to combine the VTFM system 340 and the VCA system 389 in a single system or device, to combine the VTFM system 340 and the VCA system 389 and the visual data acquisition functionality of device(s) 360 in a single system or device, etc.

In the illustrated embodiment, an embodiment of the VTFM system 340 executes in memory 330 of the server computing system(s) 300 in order to perform at least some of the described techniques, such as by using the processor(s) 305 to execute software instructions of the system 340 in a manner that configures the processor(s) 305 and computing system 300 to perform automated operations that implement those described techniques. The illustrated embodiment of the VTFM system may include one or more components, not shown, to each perform portions of the functionality of the VTFM system, and the memory may further optionally execute one or more other programs 335—as one specific example, a copy of the VCA system may execute as one of the other programs 335 in at least some embodiments, such as instead of or in addition to the VCA system 389 on the server computing system(s) 380. The VTFM system 340 may further, during its operation, store and/or retrieve various types of data on storage 320 (e.g., in one or more databases or other data structures), such as various types of user information 322, acquired video and/or image information 324 (e.g., 360° video or images received from VCA system 389, such as for analysis to generate floor maps, to provide to users of client computing devices 390 for display, etc.), optionally generated floor maps and other associated information 326 (e.g., generated and saved 2.5D and/or 3D models, building and room dimensions for use with associated floor maps, additional images and/or annotation information, etc.) and/or various types of optional additional information 328 (e.g., various analytical information related to presentation or other use of one or more building interiors or other environments).

In addition, an embodiment of the VCA system 389 executes in memory 387 of the server computing system(s) 380 in the illustrated embodiment in order to perform at least some of the described techniques, such as by using the processor(s) 381 to execute software instructions of the system 389 in a manner that configures the processor(s) 381 and computing system 380 to perform automated operations that implement those described techniques. The illustrated embodiment of the VCA system may include one or more components, not shown, to each perform portions of the functionality of the VCA system, and the memory may further optionally execute one or more other programs (not shown). The VCA system 389 may further, during its operation, store and/or retrieve various types of data on storage 385 (e.g., in one or more databases or other data structures), such as video and/or image information 386 acquired for one or more buildings, building and room dimensions for use with associated floor maps, additional images and/or annotation information, various analytical information related to presentation or other use of one or more building interiors or other environments, etc.—while not illustrated in FIG. 3, the VCA system may further store and use additional types of information, such as about other types of building information to be analyzed and/or provided to the VTFM system (e.g., building and room dimensions for use with associated floor maps, additional images and/or annotation information, various analytical information related to presentation or other use of one or more building interiors or other environments, etc.), about VCA system operator users, etc.

Some or all of the user client computing devices 390 (e.g., mobile devices), mobile visual data acquisition devices 360, optional other navigable devices 395 and other computing systems (not shown) may similarly include some or all of the same types of components illustrated for server computing system 300. As one non-limiting example, the mobile visual data acquisition devices 360 are each shown to include one or more hardware CPU(s) 361, I/O components 362, storage 365, and memory 367, with one or both of a browser and one or more client applications 368 (e.g., an application specific to the VTFM system and/or VCA system) executing within memory 367, such as to participate in communication with the VTFM system 340, VCA system 389 and/or other computing systems—the devices 360 each further include one or more imaging systems 364 and IMU hardware sensors 369, such as for use in acquisition of video and/or images, associated device movement data, etc. While particular components are not illustrated for the other navigable devices 395 or other computing systems 390, it will be appreciated that they may include similar and/or additional components.

It will also be appreciated that computing systems 300 and 380 and the other systems and devices included within FIG. 3 are merely illustrative and are not intended to limit the scope of the present invention. The systems and/or devices may instead each include multiple interacting computing systems or devices, and may be connected to other devices that are not specifically illustrated, including via Bluetooth communication or other direct communication, through one or more networks such as the Internet, via the Web, or via one or more private networks (e.g., mobile communication networks, etc.). More generally, a device or other computing system may comprise any combination of hardware that may interact and perform the described types of functionality, optionally when programmed or otherwise configured with particular software instructions and/or data structures, including without limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, and various other consumer products that include appropriate communication capabilities. In addition, the functionality provided by the illustrated VTFM system 340 and/or VCA system 389 may in some embodiments be distributed in various components, some of the described functionality of the VTFM system 340 and/or VCA system 389 may not be provided, and/or other additional functionality may be provided.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the VTFM system 340 executing on server computing systems 300 and/or on devices 360, by the VCA software 389 executing on server computing systems 380, etc.) and/or data structures, such as by execution of software instructions of the one or more software programs and/or by storage of such software instructions and/or data structures, and such as to perform algorithms as described in the flow charts and other disclosure herein. Furthermore, in some embodiments, some or all of the systems and/or components may be implemented or provided in other manners, such as by consisting of one or more means that are implemented partially or fully in firmware and/or hardware (e.g., rather than as a means implemented in whole or in part by software instructions that configure a particular CPU or other processor), including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, components and data structures may also in some embodiments be transmitted via generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of the present disclosure may be practiced with other computer system configurations.

Figure 4:
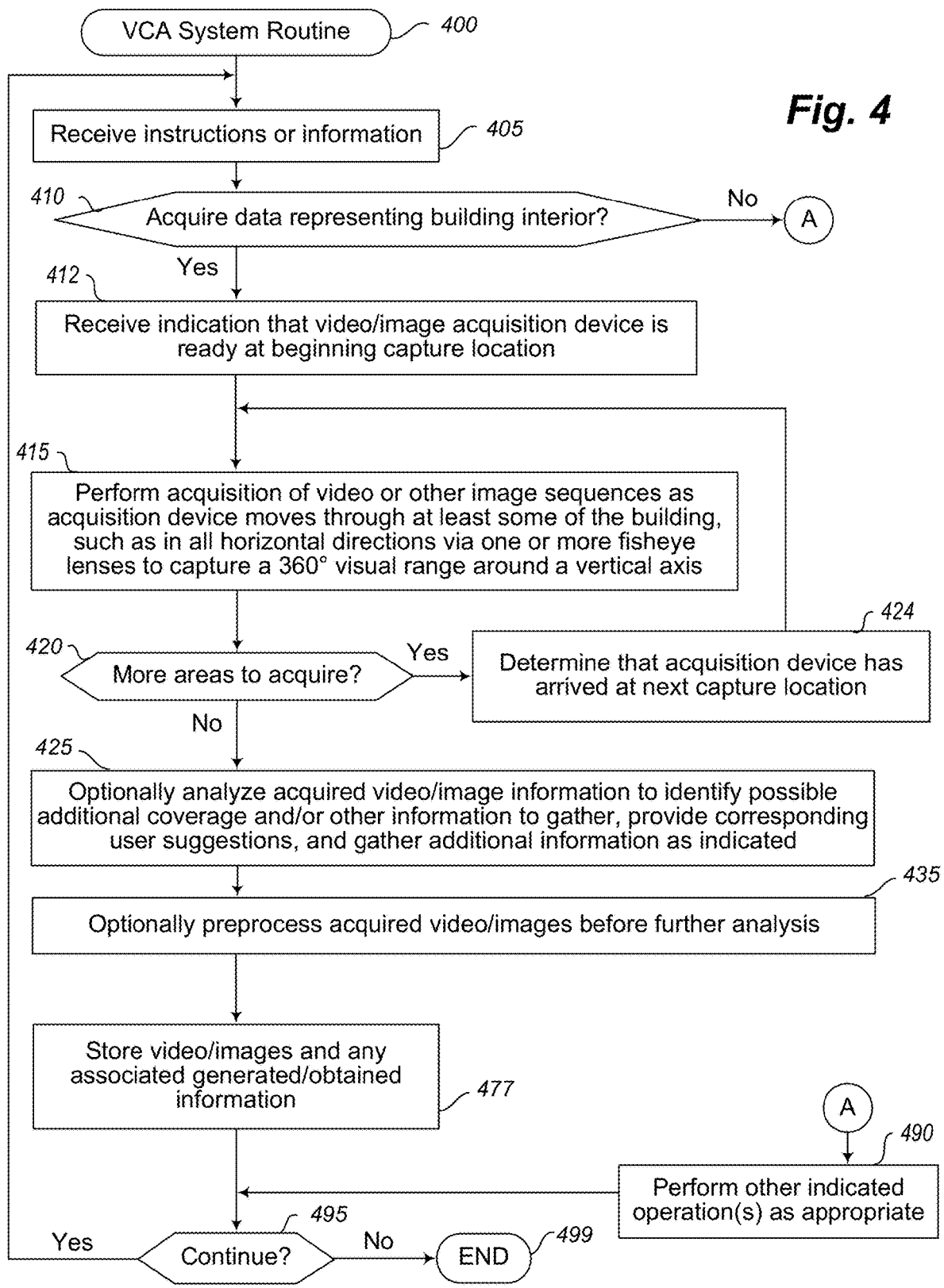
FIG. 4 illustrates an example embodiment of a flow diagram for a Visual data Capture and Analysis (VCA) system routine in accordance with an embodiment of the present disclosure.

FIG. 4 illustrates an example flow diagram of an embodiment of a VCA System routine 400. The routine may be performed by, for example, the VCA system 160 of FIG. 1A, the VCA system 389 of FIG. 3, and/or the VCA system described with respect to FIGS. 1A-2O and as otherwise described herein, such as to acquire video (e.g., continuous 360° video) and optionally other images at locations within buildings or other structures, such as for use in subsequent generation of related floor maps and/or other mapping information. While portions of the example routine 400 are discussed with respect to acquiring particular types of video at particular locations, it will be appreciated that this or a similar routine may be used to acquire images and/or other data (e.g., audio), whether instead of or in addition to such video. In addition, while the illustrated embodiment acquires and uses information from the interior of a target building, it will be appreciated that other embodiments may perform similar techniques for other types of data, including for non-building structures and/or for information external to one or more target buildings of interest. Furthermore, some or all of the routine may be executed on a mobile device used by a user to acquire video and/or image information, and/or by a system remote from such a mobile device.

The illustrated embodiment of the routine begins at block 405, where instructions or information are received. At block 410, the routine determines whether the received instructions or information indicate to acquire data representing a building interior, and if not continues to block 490. Otherwise, the routine proceeds to block 412 to receive an indication from a user of a mobile visual data acquisition device to begin the visual data acquisition process at a beginning capture location. After block 412, the routine proceeds to block 415 in order to perform visual data acquisition activities starting at the beginning capture location and continuing along a path through at least some of the building, in order to acquire video (e.g., continuous 360° video, with horizontal coverage of at least 360° around a vertical axis for each video frame/image) of the interior of the target building of interest, such as via one or more fisheye lenses on the mobile device. As one non-exclusive example, the mobile visual data acquisition device may include one or more lens that together provide simultaneous 360° horizontal coverage, while as another non-exclusive example, the mobile visual data acquisition device may be a rotating (scanning) panorama camera equipped with a fisheye lens, such as a 180° fisheye giving a full sphere at 360° rotation. The routine may also optionally obtain annotation and/or other information from the user regarding particular locations and/or the surrounding environment more generally (e.g., a current room), such as for later use in presentation of information regarding that location and/or surrounding environment.

After block 415 is completed, the routine continues to block 420 to determine if there are more area at which to acquire images, such as based on corresponding information provided by the user of the mobile device. If so, and when the user is ready to continue the process, the routine continues to block 422 to determine that the acquisition device is ready at the next beginning capture location for further visual data acquisition (e.g., based on an indication from the user), and then continues to block 415 to perform a corresponding acquisition of further video (or of other image sequences). In addition to capturing video, the mobile device may further capture additional information during some or all of the travel along the path through the building, such as additional sensor data (e.g., from one or more IMU, or inertial measurement units, on the mobile device or otherwise carried by the user), additional image information, recorded ambient sounds, recorded user verbal and/or textual annotations or other descriptions, ambient light levels, etc. for later use in presentation of information regarding that travel path or a resulting generated floor map and/or other mapping related information. In addition, the routine may further optionally provide one or more guidance cues to the user regarding the motion of the mobile device, quality of the sensor data and/or video information being captured, associated lighting/environmental conditions, and any other suitable aspects of capturing the building interior information.

Figure 5A:
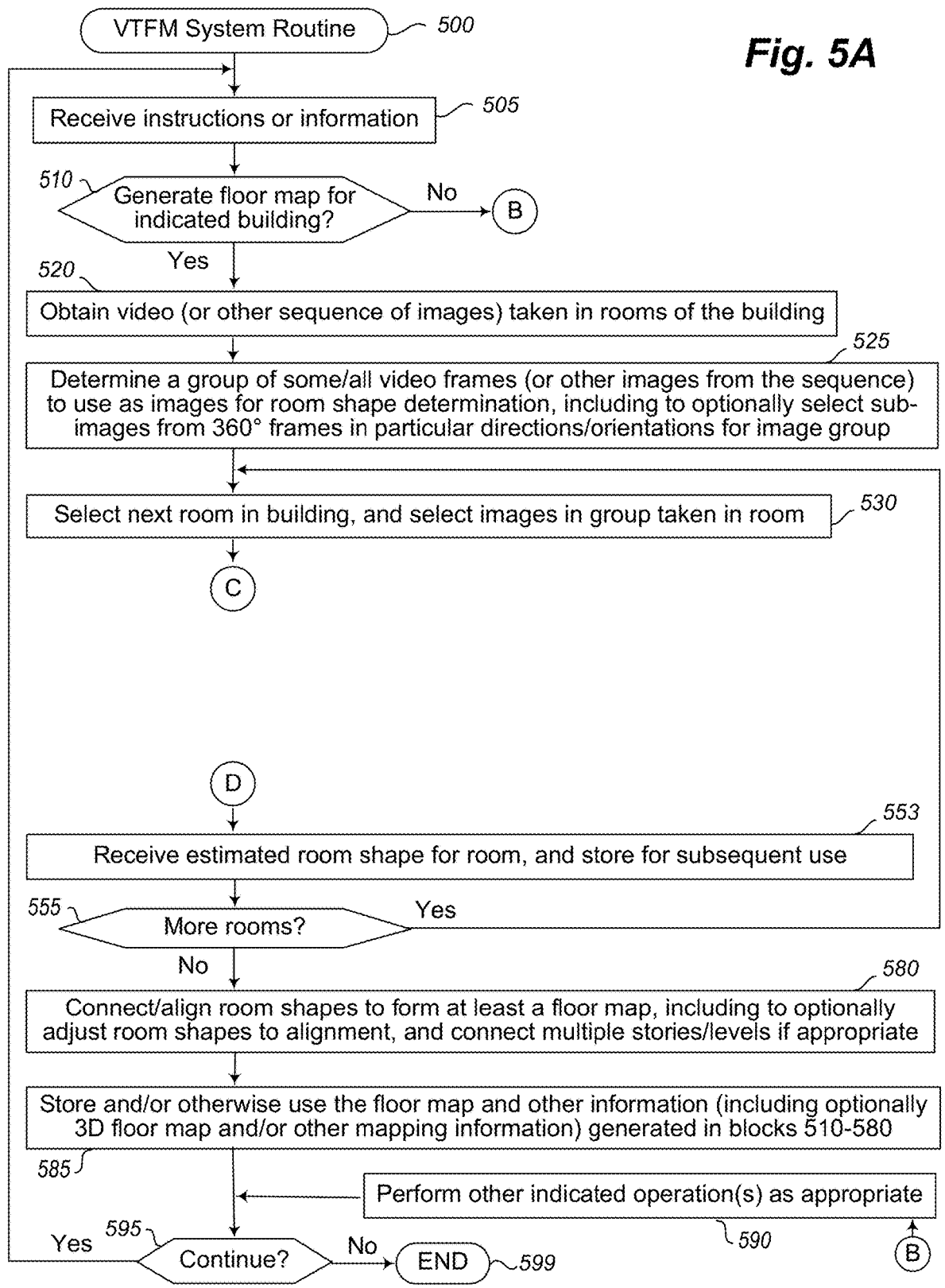

If it is instead determined in block 420 that there are not any more locations at which to acquire video information for the current building or other structure, the routine proceeds to block 425 to optionally analyze the acquired information for the building or other structure, such as to identify possible additional coverage (and/or other information) to acquire within the building interior. For example, the VCA system may provide one or more notifications to the user regarding the information acquired during capture, such as if it determines that one or more segments of the recorded information are of insufficient or undesirable quality, or do not appear to provide complete coverage of the building. After block 425, the routine continues to block 435 to optionally preprocess the acquired video information (and optionally other associated information) before its subsequent use for generating related mapping information. In block 477, the video and any associated generated or obtained information is stored for later use. FIGS. 5A-5B illustrate one example of a routine for generating a floor map representation of a building interior from the acquired video information.

If it is instead determined in block 410 that the instructions or other information recited in block 405 are not to acquire video and other data representing a building interior, the routine continues instead to block 490 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the VCA system, etc.), to obtain and store other information about users of the system, to respond to requests for generated and stored information, etc.

Following blocks 477 or 490, the routine proceeds to block 495 to determine whether to continue, such as until an explicit indication to terminate is received, or instead only if an explicit indication to continue is received. If it is determined to continue, the routine returns to block 405 to await additional instructions or information, and if not proceeds to step 499 and ends.

FIGS. 5A-5B illustrate an example embodiment of a flow diagram for a Visual data-To-Floor Map (VTFM) System routine 500. The routine may be performed by, for example, execution of the VTFM system 140 of FIG. 1A, the VTFM system 340 of FIG. 3, and/or an VTFM system as described with respect to FIGS. 1A-2O and elsewhere herein, such as to generate mapping information for a defined area based at least in part on analysis of video (e.g., 360° video with frames that are each 360° spherical panorama images) of the area. In the example of FIGS. 5A-5B, the generated mapping information includes a floor map of a building (e.g., a house), but in other embodiments, other types of mapping information may be generated for other types of buildings and used in other manners, as discussed elsewhere herein. In addition, while the example of FIGS. 5A-5B analyzes frames from continuous video on a path through the building, other types of sequences of images may be used in other embodiments, as discussed elsewhere herein.

The routine 500 begins at step 505, where information or instructions are received, and continues to block 510 to determine whether the instructions received in block 505 are to generate a floor map for an indicated building. If not, the routine proceeds to block 590, and otherwise continues to perform blocks 520-585 as part of the floor map generation process. In particular, in block 520, the routine obtains one or more videos (or other sequences of images) taken in rooms of the building (e.g., along a path taken through the building), such as by receiving the video(s) in block 505 or retrieving previously stored videos for the indicated building. After block 520, the routine continues to block 525 to determine an image group that include some or all of the video frames (or other images from the sequence) to use as images for the subsequent room shape determination analysis, including in some cases to use portions of 360° image frames in particular directions/orientations (or other images that have less than 360° of horizontal coverage) as images in the image group, while in other cases entire 360° image frames are used as images in the image group.

After block 525, the routine performs a loop of blocks 530-553 for each room in the building to analyze the images in that room and to determine a corresponding estimated room shape for the room. In particular, the routine in block 530 selects a next room from the building, beginning with the first, and select images from the image group that were taken in the room. In block 535, the routine then performs an image analysis of the selected images to detect structural features in the room, and analyzes information about the detected features to determine normal (orthogonal) directions for the detected features and to identify corresponding planar surfaces on which the detected features are located. In block 534, the routine then, for each of the selected images, combines the determined normal direction information for that image to determine corresponding wall location hypotheses based on that image, such as by generating aggregate normal and planar surface information from the individual feature normal directions and planar surface information by using a weighted combination or in another manner, and optionally determines other structural features in the room that are visible from the image. In block 536, the routine then proceeds to cluster and optimize the wall location hypotheses from the multiple images that were analyzed in order to determine likely wall locations for the room, and then combines the determined estimated wall locations to generate an estimated room shape for the room. As discussed in greater detail elsewhere herein, the combining of estimated wall locations to generate a room shape may use various constraints (e.g., 90° corners, flat walls, etc.).

After block 536, the routine continues to block 538 to determine whether to perform a consistency analysis for the room shape information estimated from the clustered and aggregated normal direction information and planar surface information, such as by estimating room shape information in a different manner and comparing the information from the different techniques. If not, the routine continues to block 540 to select the estimated room shape from block 536 as the likely room shape for the room, and otherwise proceeds to perform blocks 542-552 as part of the multi-view consistency analysis. In particular, the routine in block 542 generates a 3D point cloud for the room from the various selected images for the room, such as by using one or more of a SLAM analysis, SfM analysis or MVS analysis, including to localize each selected image in space and to determine the orientation/direction of the image/camera if other than a 360° image. In block 544, the routine then analyzes the 3D point cloud information to determine a second set of likely wall locations in the 3D point cloud, such as by grouping points that have a similar distance from the camera location and/or are within a threshold amount of a common planar surface, and then uses the determined second set of likely wall locations to generate a second estimated room shape for the room. As discussed in greater detail elsewhere herein, the combining of estimated wall locations to generate a room shape may use various constraints (e.g., 90° corners, flat walls, etc.). In block 546, the routine then compares the information and about the two sets of likely wall locations for the room to determine differences, including in some embodiments to optionally perform a multi-view consistency analysis by projecting expected pixel locations for one or more first selected images from one of the sets of likely wall locations to the likely wall locations of the other set for one or more second selected images, and by measuring an amount of reprojection error. The routine then determines in block 548 if the differences exceed a defined threshold, and if so proceeds to block 550 to optionally reduce those differences via further automated analyses, although in other embodiments such further automated analyses may not be performed and the room may instead proceed directly to block 552 after block 546. In block 550, the routine may, for example, initiate further image capture and/or analysis (e.g., by selecting and analyzing further images that were previously or currently captured) to improve one or both types of estimated room shapes, and/or may provide a notification of the differences and optionally receive and use further information from one or more system operator users of the VTFM system. While not illustrated in this example embodiment, in other embodiments one or both sets of likely wall locations and/or one or both estimated room shapes may be excluded from further uses if the differences exceed the threshold and are not reduced within it.

After block 550, or if it is instead determined in block 548 that the differences do not exceed the threshold, the routine continues to block 552 to determine a likely room shape to use for the room from the two estimated room shapes, such as by combining the information for the two room shapes, or by selecting one of the two room shapes to use (e.g., dynamically based on error or uncertainty information for the two room shapes and/or two sets of likely wall locations, using a predetermined priority for one of the types of techniques for estimating room shape, etc.). After blocks 540 or 552, the routine continues to block 553 to receive and store the room's estimated room shape for subsequent use, and then to block 555 to determine whether there are more rooms in the building having images to analyze, in which case the routine returns to block 530 to analyze the images for the next room in the building.

If it is instead determined in block 555 that there are not more rooms whose images are to be analyzed, the routine continues instead to block 580 to connect and align the room shapes for the various rooms to form a floor map of the building, such as by connecting inter-room passages and applying other constraints regarding room shape placement. As part of the connecting, one or more of the estimated room shapes may be further adjusted, such as to reflect an overall fit between rooms and/or for the entire house, and additional processing to connect multiple floors of the building may be further performed if appropriate. While not illustrated in this example, other types of mapping-related information may be similarly generated, such as to add height location to the generated 2D floor map in order to generate a 3D or 2.5D floor map for the building. After block 580, the routine continues to block 585 to store and/or otherwise use the generated floor map and any other generated mapping-related information, including to optionally provide some or all of the generated mapping-related information to one or more recipients (e.g., in response to previous requests).

If it was instead determined in block 510 that the instructions or information received in block 505 are not to generate a floor map for an indicated building, the routine continues instead to block 590 to perform one or more other indicated operations as appropriate. Such other indicated operations may include, for example, receiving additional information about a building to use in a later generation of a floor map for it, to receive and store additional information to associate with an already generated floor map (e.g., additional pictures, dimensions information, etc.), to provide requested information that was previously generated, to obtain and store other information about users of the system, to obtain and store information about requests from potential recipients of generated mapping related information to provide that information when it becomes available, etc.

After blocks 585 or 590, the routine continues to block 595 to determine whether to continue, such as until an explicit indication to terminate is received. If it is determined to continue, the routine returns to block 505, and otherwise continues to block 599 and ends.

Figure 6:
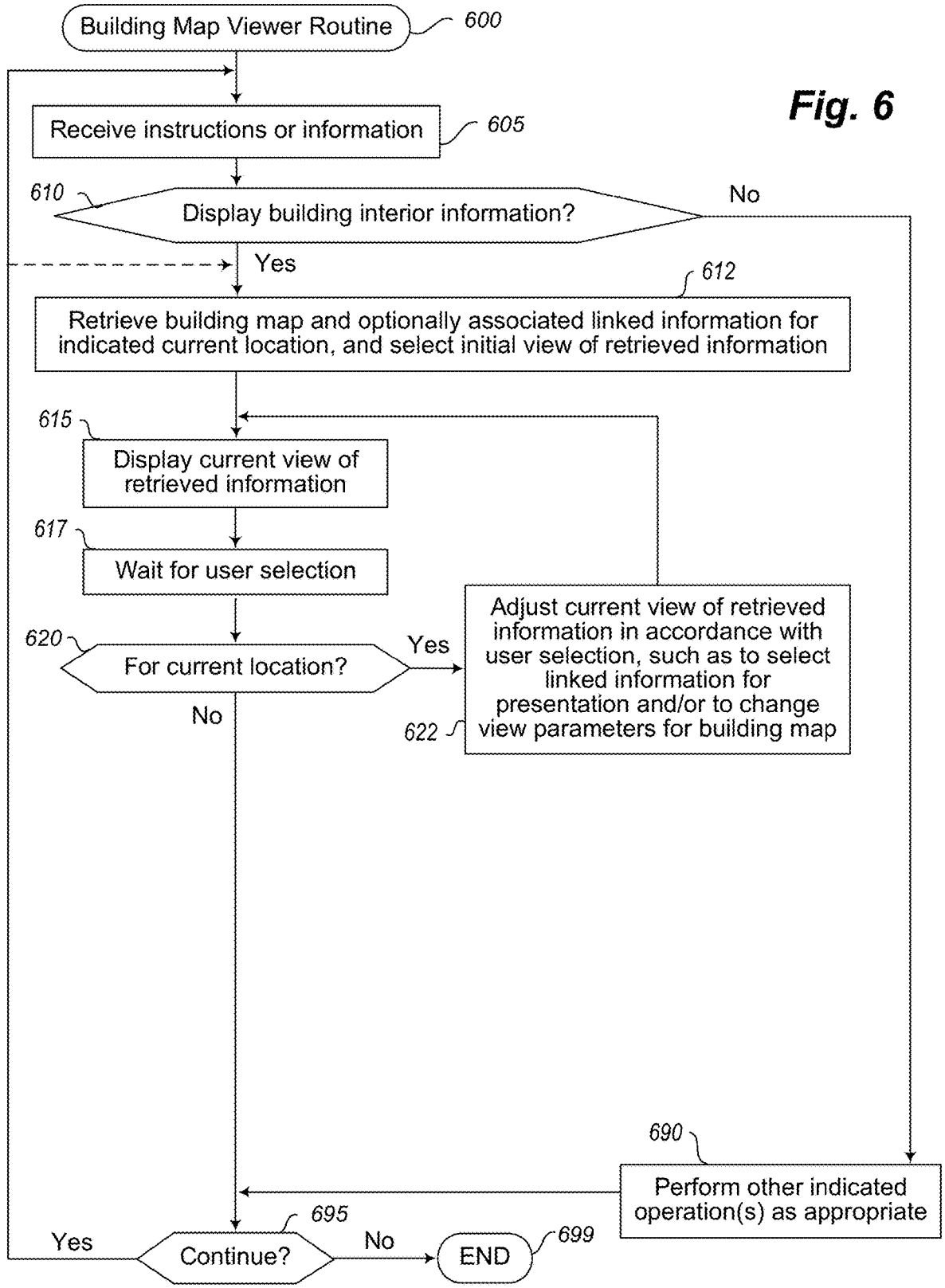
FIG. 6 illustrates an example embodiment of a flow diagram for a Building Map Viewer system routine in accordance with an embodiment of the present disclosure.

FIG. 6 illustrates an example embodiment of a flow diagram for a Building Map Viewer system routine 600. The routine may be performed by, for example, execution of a map viewer client computing device 175 and its software system(s) (not shown) of FIG. 1A, a client computing device 390 of FIG. 3, and/or a mapping information viewer or presentation system as described elsewhere herein, such as to receive and display mapping information (e.g., a floor map, whether 2D, 3D, 2.5D or other format) for a defined area, including in some situations to display additional information (e.g., images, such as 360° spherical panorama images) associated with particular locations in the mapping information. In the example of FIG. 6, the presented mapping information is based on a floor map of a building (such as a house) that may optionally have additional associated linked information (e.g., images taken within the building, sounds recorded within the building, annotations or other descriptive information associated with particular locations within the building, etc.), but in other embodiments, other types of mapping information may be presented for other types of buildings or environments and used in other manners, as discussed elsewhere herein.

The illustrated embodiment of the routine begins at block 605, where instructions or information are received. At block 610, the routine determines whether the received instructions or information indicate to display or otherwise present information representing a building interior, and if not continues to block 690. Otherwise, the routine proceeds to block 612 to retrieve a floor map for the building and optionally indications of associated linked information for the floor map and/or a surrounding location, and selects an initial view of the retrieved information (e.g., a view of the floor map). In block 615, the routine then displays or otherwise presents the current view of the retrieved information, and waits in block 617 for a user selection or other event (e.g., receiving updated information corresponding to the current view, an expiration of a timer, etc.). After a user selection or other event in block 617, if it is determined in block 620 that the user selection or other event corresponds to the current location (e.g., to change the current view), the routine continues to block 622 to update the current view in accordance with the user selection, and then returns to block 615 to update the displayed or otherwise presented information accordingly. The user selection and corresponding updating of the current view may include, for example, displaying or otherwise presenting a piece of associated linked information that the user selects (e.g., a particular image), changing how the current view is displayed (e.g., zooming in or out, rotating information if appropriate, selecting a new portion of the current view to be displayed or otherwise presented that was not previously visible, etc.).

If it is instead determined in block 610 that the instructions or other information recited in block 605 are not to present information representing a building interior, the routine continues instead to block 690 to perform any other indicated operations as appropriate, such as any housekeeping tasks, to configure parameters to be used in various operations of the system (e.g., based at least in part on information specified by a user of the system, such as a user of a mobile device who captures one or more building interiors, an operator user of the VTFM system, etc.), to obtain and store other information about users of the system, to respond to requests for generated and stored information, etc.

Following block 690, or if it is determined in block 620 that the user selection or other event does not correspond to the current location, the routine proceeds to block 695 to determine whether to continue, such as until an explicit indication to terminate is received, or instead only if an explicit indication to terminate is received. If it is determined to continue (e.g., if the user made a selection in block 617 related to a new location to present), the routine returns to block 605 to await additional instructions or information (or to continue on to block 612 if the user made a selection in block 617 related to a new location to present), and if not proceeds to step 699 and ends.

With respect to functionality of an MIGM system, it may perform automated operations in at least some embodiments to analyze multiple 360° panorama images (and optionally other images) that have been acquired for a building interior (and optionally an exterior of the building), and determine room shapes and locations of passages connecting rooms for some or all of those panorama images, as well as to determine wall elements and other elements of some or all rooms of the building in at least some embodiments and situations. The types of connecting passages between two or more rooms may include one or more of doorway openings and other inter-room non-doorway wall openings, windows, stairways, non-room hallways, etc., and the automated analysis of the images may identify such elements based at least in part on identifying the outlines of the passages, identifying different content within the passages than outside them (e.g., different colors or shading), etc. The automated operations may further include using the determined information to generate a floor plan for the building and to optionally generate other mapping information for the building, such as by using the inter-room passage information and other information to determine relative positions of the associated room shapes to each other, and to optionally add distance scaling information and/or various other types of information to the generated floor plan. In addition, the MIGM system may in at least some embodiments perform further automated operations to determine and associate additional information with a building floor plan and/or specific rooms or locations within the floor plan, such as to analyze images and/or other environmental information (e.g., audio) captured within the building interior to determine particular attributes (e.g., a color and/or material type and/or other characteristics of particular elements, such as a floor, wall, ceiling, countertop, furniture, fixtures, appliances, etc.; the presence and/or absence of particular elements, such as an island in the kitchen; etc.), or to otherwise determine relevant attributes (e.g., directions that building elements face, such as windows; views from particular windows or other locations; etc.). Additional details are included below regarding operations of computing device(s) implementing an MIGM system, such as to perform such automated operations and in some cases to further interact with one or more MIGM system operator user(s) in one or more manners to provide further functionality.

Figure 7A:
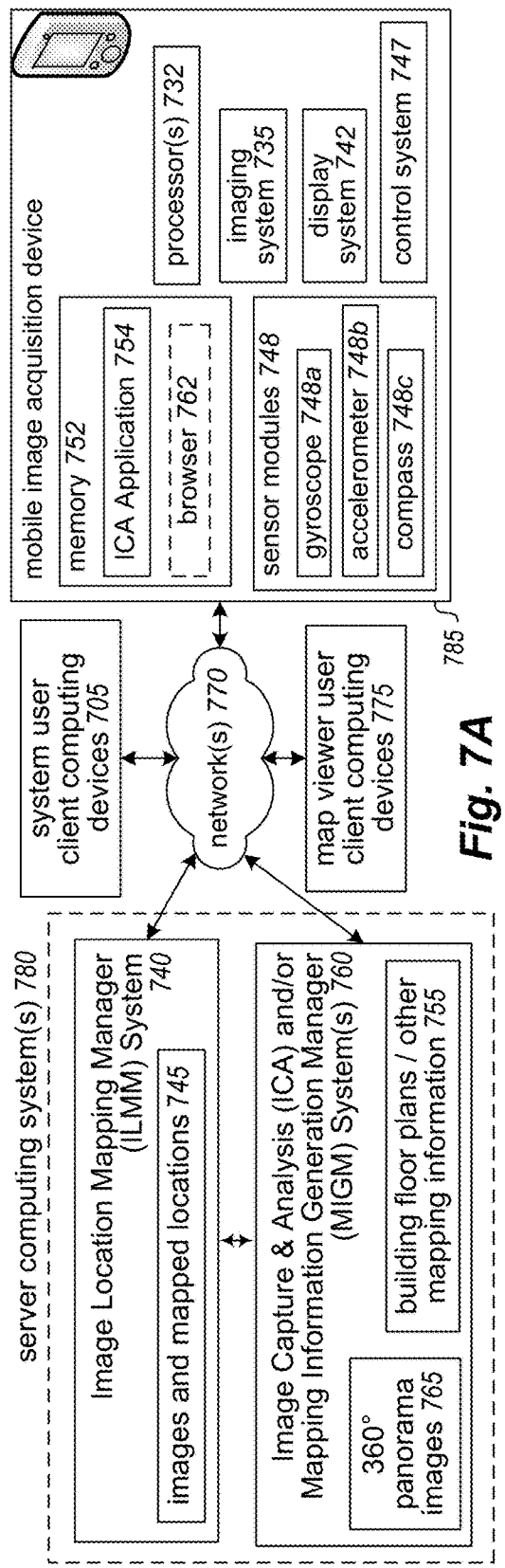
FIGS. 7A-7B are diagrams depicting an exemplary building interior environment and computing system(s) for use in embodiments of the present disclosure, including to generate and present information representing an interior of the building.
Figure 7B:
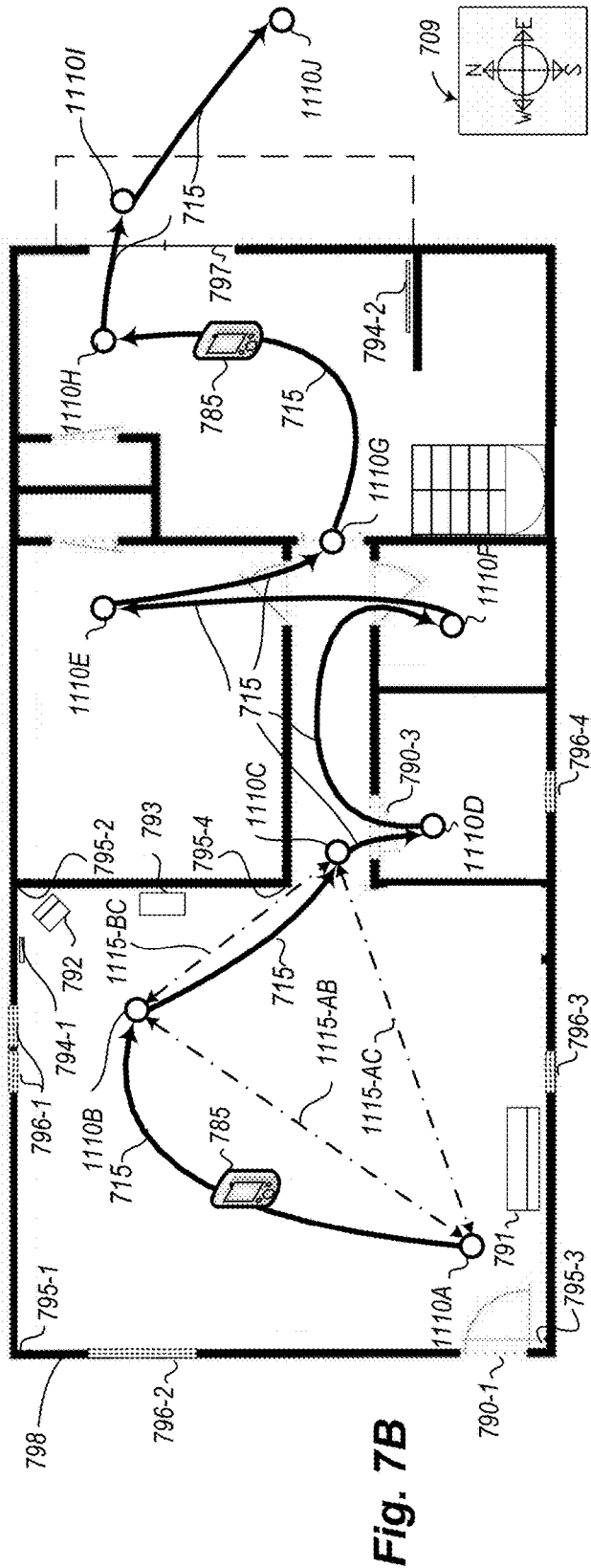

FIG. 7A is an example block diagram of various computing devices and systems that may participate in the described techniques in some embodiments. In particular, one or more linked panorama images 765 are illustrated in FIG. 7A that have been generated by an Interior Capture and Analysis ("ICA") system 760 executing in this example on one or more server computing systems 780, such as with respect to one or more buildings or other structures —FIG. 7B shows one example of such linked panorama images for a particular house 798, as discussed further below, and additional details related to the automated operation of the ICA system are included elsewhere herein. An MIGM (Mapping Information Generation Manager) system 760 is further executing on one or more server computing systems 780 in FIG. 7A to generate and provide building floor plans 755 and/or other mapping-related information based on use of the linked panorama images 765 and optionally associated metadata about their acquisition and linking and additional details related to the automated operation of the MIGM system are included elsewhere herein, including with respect to FIGS. 8A-8B. FIG. 7A further illustrates an ILMM (Image Location Mapping Manager) system 740 that is executing on one or more server computing systems 780 to determine acquisition locations of additional images 745 (e.g., panorama images) acquired in one or more building rooms, such as with respect to corresponding building floor plans 155. In at least some embodiments and situations, one or more users of client computing devices 705 may further interact over the network(s) 770 with the ILMM system 740, such as to assist with some of the automated operations of the ILMM system for determining the acquisition location of an image based at least in part on an analysis of the image's contents, and/or for subsequently using the determined image acquisition location information in one or more further automated manners. One or more users (not shown) of one or more client computing devices 775 may further interact over one or more computer networks 770 with the ILMM system 740 and optionally with the ICA system 760 and/or MIGM system 760. In the depicted computing environment of FIG. 7A, the network 770 may be one or more publicly accessible linked networks, possibly operated by various distinct parties, such as the Internet. In other implementations, the network 770 may have other forms. For example, the network 770 may instead be a private network, such as a corporate or university network that is wholly or partially inaccessible to non-privileged users. In still other implementations, the network 770 may include both private and public networks, with one or more of the private networks having access to and/or from one or more of the public networks. Furthermore, the network 770 may include various types of wired and/or wireless networks in various situations. In addition, the client computing devices 775 and server computing systems 780 may include various hardware components and stored information. In the example of FIG. 7A, ICA system 760 may perform automated operations involved in generating multiple panorama images (e.g., each a 360 degree panorama around a vertical axis) at multiple associated acquisition locations (e.g., in multiple rooms or other locations within a building or other structure and optionally around some or all of the exterior of the building or other structure), such as for use in generating and providing a representation of an interior of the building or other structure. The techniques may further include analyzing information to determine relative positions/directions between each of two or more acquisition locations, creating inter-panorama positional/directional links in the panoramas to each of one or more other panoramas based on such determined positions/directions, and then providing information to display or otherwise present multiple linked panorama images for the various acquisition locations within the house.

FIG. 7B depicts a block diagram of an exemplary building interior environment in which linked panorama images have been generated and are ready for use to generate and provide a corresponding building floor plan, as well as for use in presenting the linked panorama images to users. In particular, FIG. 7B includes a building 798 with an interior that was captured at least in part via multiple panorama images, such as by a user (not shown) carrying a mobile device 785 with image acquisition capabilities through the building interior to a sequence of multiple acquisition locations 1110. An embodiment of the ICA system (e.g., ICA system 760 on server computing system(s) 780; a copy of some or all of the ICA system executing on the user's mobile device, such as ICA application system 754 executing in memory 752 on device 785; etc.) may automatically perform or assist in the capturing of the data representing the building interior, as well as further analyze the captured data to generate linked panorama images providing a visual representation of the building interior. While the mobile device of the user may include various hardware components, such as a camera or other imaging system 735, one or more sensors 748 (e.g., a gyroscope 748a, an accelerometer 748b, a compass 748c, etc., such as part of one or more IMUs, or inertial measurement units, of the mobile device; an altimeter; light detector; etc.), a GPS receiver, one or more hardware processors 732, memory 752, a display 742, a microphone, etc., the mobile device may not in at least some embodiments have access to or use equipment to measure the depth of objects in the building relative to a location of the mobile device, such that relationships between different panorama images and their acquisition locations may be determined in part or in whole based on matching elements in different images and/or by using information from other of the listed hardware components, but without using any data from any such depth sensors. In addition, while directional indicator 709 is provided for reference of the viewer, the mobile device and/or ICA system may not use such absolute directional information in at least some embodiments, such as to instead determine relative directions and distances between panorama images 1110 without regard to actual geographical positions or directions.

In operation, a user associated with the mobile device arrives at a first acquisition location 1110A within a first room of the building interior (in this example, an entryway from an external door 790-1 to the living room), and captures a view of a portion of the building interior that is visible from that acquisition location 1110A (e.g., some or all of the first room, and optionally small portions of one or more other adjacent or nearby rooms, such as through doors, halls, stairs or other connecting passages from the first room) as the mobile device is rotated around a vertical axis at the first acquisition location (e.g., with the user turning his or her body in a circle while holding the mobile device stationary relative to the user's body). The actions of the user and/or the mobile device may be controlled or facilitated via use of one or more programs executing on the mobile device, such as ICA application system 755, optional browser 762, control system 747, etc., and the view capture may be performed by recording a video and/or taking a succession of one or more images, including to capture visual information depicting a number of objects or other elements (e.g., structural details) that may be visible in images (e.g., video frames) captured from the acquisition location. In the example of FIG. 7B, such objects or other elements include various elements that are structurally part of the walls (or "wall elements"), such as the doorways 790 and 797 and their doors (e.g., with swinging and/or sliding doors), windows 796, inter-wall borders (e.g., corners or edges) 795 (including corner 795-1 in the northwest corner of the building 798, and corner 795-2 in the northeast corner of the first room)—in addition, such objects or other elements in the example of FIG. 7B may further include other elements within the rooms, such as furniture 791-793 (e.g., a couch 791; chairs 792; tables 793; etc.), pictures or paintings or televisions or other objects 794 (such as 794-1 and 794-2) hung on walls, light fixtures, etc. The user may also optionally provide a textual or auditory identifier to be associated with an acquisition location, such as "entry" for acquisition location 1110A or "living room" for acquisition location 1110B, while in other embodiments the ICA system may automatically generate such identifiers (e.g., by automatically analyzing video and/or other recorded information for a building to perform a corresponding automated determination, such as by using machine learning) or the identifiers may not be used.

After the first acquisition location 1110A has been adequately captured (e.g., by a full rotation of the mobile device), the user may proceed to a next acquisition location (such as acquisition location 1110B), optionally recording movement data during movement between the acquisition locations, such as video and/or other data from the hardware components (e.g., from one or more IMUs, from the camera, etc.). At the next acquisition location, the user may similarly use the mobile device to capture one or more images from that acquisition location. This process may repeat from some or all rooms of the building and optionally external to the building, as illustrated for acquisition locations 1110C-1110J. The acquired video and/or other images for each acquisition location are further analyzed to generate a panorama image for each of acquisition locations 1110A-1110J, including in some embodiments to match objects and other elements in different images. In addition to generating such panorama images, further analysis may be performed in order to 'link' at least some of the panoramas together (with some corresponding lines 1115 between them being shown for the sake of illustration), such as to determine relative positional information between pairs of acquisition locations that are visible to each other, to store corresponding inter-panorama links (e.g., links 1115-AB, 1115-BC and 1115-AC between acquisition locations A and B, B and C, and A and C, respectively), and in some embodiments and situations to further link at least some acquisition locations that are not visible to each other (e.g., a link 1115-BE, not shown, between acquisition locations 1110B and 1110E).

Various details are provided with respect to FIGS. 7A-7B, but it will be appreciated that the provided details are non-exclusive examples included for illustrative purposes, and other embodiments may be performed in other manners without some or all such details.

Figure 8A:
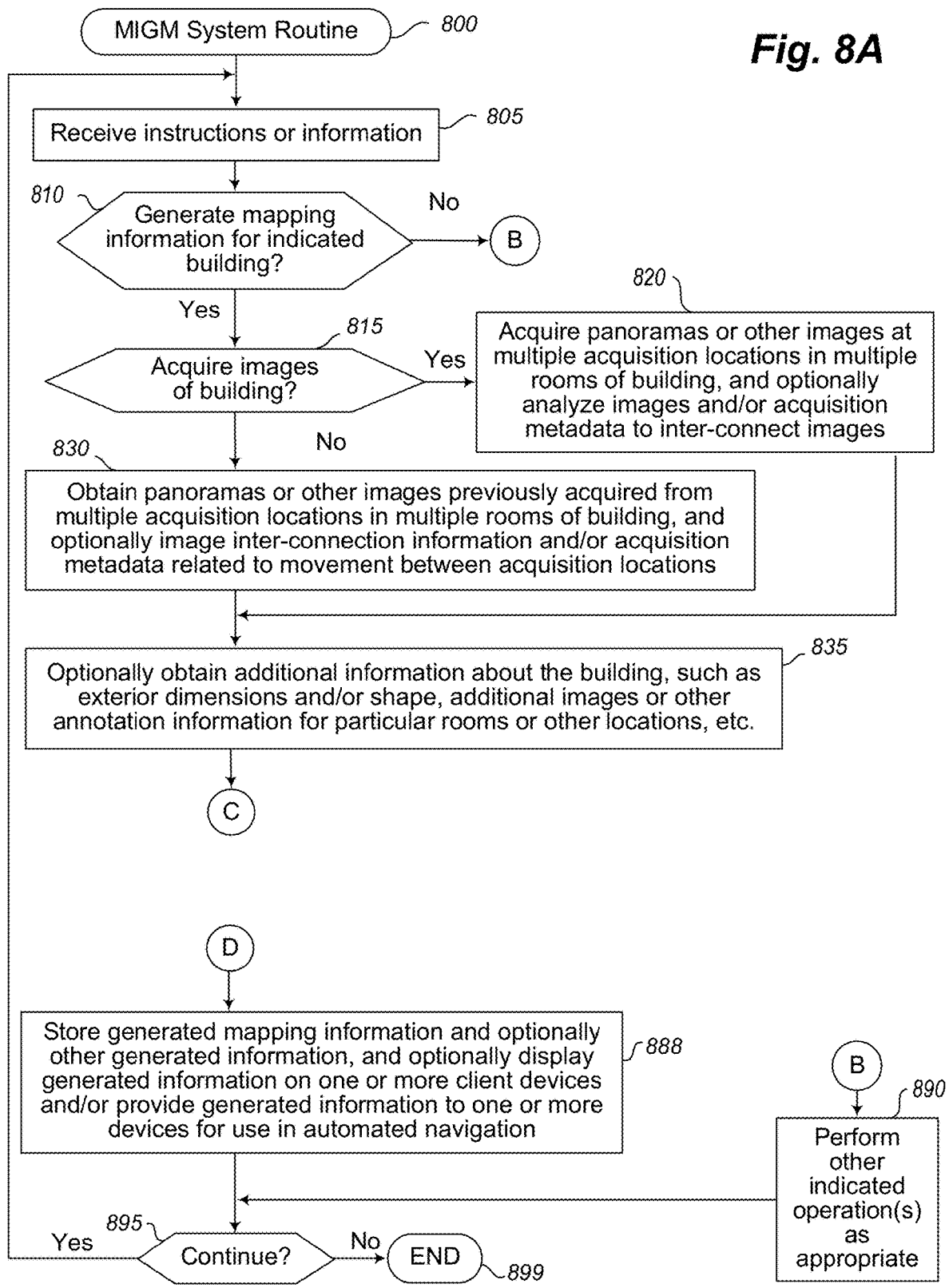

FIGS. 8A-8B illustrate an example embodiment of a flow diagram for a Mapping Information Generation Manager (MIGM) System routine 800. The routine may be performed by, for example, execution of the MIGM system 160 of FIG. 7A, and/or an MIGM system as described elsewhere herein, such as to generate a floor plan and optionally other mapping information for a defined area (e.g., a 3D computer model) based at least in part on images of the area. In the example of FIGS. 8A-8B, the generated mapping information includes a 2D floor plan and 3D computer model of a building, such as a house, but in other embodiments, other types of mapping information may be determined and generated for other types of buildings and used in other manners, as discussed elsewhere herein.

The illustrated embodiment of the routine begins at block 805, where information or instructions are received. The routine continues to block 810 to determine whether the instructions received in block 805 indicate to generate mapping information for an indicated building, and if so the routine continues to perform blocks 815-888 to do so, and otherwise continues to block 890.

In block 815, the routine determines whether image information is already available for the building, or if such information instead needs to be acquired. If it is determined in block 815 that the information needs to be acquired, the routine continues to block 820 to acquire such information, optionally waiting for one or more users or devices to move throughout the building and acquire panoramas or other images at multiple acquisition locations in multiple rooms of the building, and to optionally further analyze the images and/or metadata information about their acquisition to interconnect the images, as discussed in greater detail elsewhere herein. If it is instead determined in block 815 that it is not necessary to acquire the images, the routine continues instead to block 830 to obtain existing panoramas or other images from multiple acquisition locations in multiple rooms of the building, optionally along with interconnection information for the images and acquisition of metadata information related to movement between the acquisition locations, such as may in some situations have been supplied in block 805 along with the corresponding instructions.

After blocks 820 or 830, the routine continues to block 835 to optionally obtain additional information about the building, such as from activities performed during acquisition and optionally analysis of the images, and/or from one or more external sources (e.g., online databases, information provided by one or more end users, etc.) — such additional information may include, for example, exterior dimensions and/or shape of the building, additional images and/or annotation information acquired corresponding to particular locations within the building (optionally for locations different from acquisition locations of the acquired panorama or other images), etc.

After block 835, the routine continues to block 850 to determine, for each room inside the building with one or more acquisition locations and associated acquired images, a room shape of the room for data in the image(s) taken inside the room, and optionally a position within the room of its acquisition location(s), such as in an automated manner. In block 855, the routine further uses visual data in the images and/or the acquisition metadata for them to determine, for each room in the building, any connecting passages in or out of the room (e.g., in an automated manner). In block 860, the routine further uses visual data in the images and/or the acquisition metadata for them to determine, for each room in the building, any wall elements in the room and their positions (e.g., in an automated manner), such as for windows, inter-wall borders, etc. It will be appreciated that, while blocks 850-860 are illustrated as separate operations in this example, in some embodiments a single analysis of the images may be performed to acquire or determine multiple types of information, such as those discussed with respect to blocks 850-860.

In block 865, the routine then determines estimated positions of the room shapes to create an initial 2D floor plan, such as by connecting inter-room passages in their respective rooms, by optionally positioning room shapes around determined acquisition location positions (e.g., if the acquisition location positions are inter-connected), and by optionally applying one or more constraints or optimizations. Such a floor plan may include, for example, relative position and shape information for the various rooms without providing any actual dimension information for the individual rooms or building as a whole, and may further include multiple linked or associated sub-maps (e.g., to reflect different stories, levels, sections, etc.) of the building. The routine further associates positions of the doors, wall openings and other identified wall elements on the floor plan.

After block 865, the routine optionally performs one or more steps 875-880 to determine and associate additional information with the floor plan. In block 875, the routine optionally estimates the dimensions of some or all of the rooms, such as from analysis of images and/or their acquisition metadata or from overall dimension information obtained for the exterior of the building, and associates the estimated dimensions with the floor plan —it will be appreciated that if sufficiently detailed dimension information were available, architectural drawings, blueprints, etc. may be generated from the floor plan. After block 875, the routine continues to block 880 to optionally associate further information with the floor plan (e.g., with particular rooms or other locations within the building), such as additional images and/or annotation information. In block 885, the routine further estimates heights of walls in some or all rooms, such as from analysis of images and optionally sizes of known objects in the images, as well as height information about a camera when the images were acquired, and further uses such information to generate a 3D computer model of the building, with the 3D model and the floor plan being associated with each other.

After block 885, the routine continues to block 888 to store the generated mapping information and optionally other generated information, and to optionally further use the generated mapping information, such as to provide the generated 2D floor plan and/or 3D computer model for display on one or more client devices, provide that generated information to one or more other devices for use in automating navigation of those devices and/or associated vehicles or other entities, etc.

If it is instead determined in block 810 that the information or instructions received in block 805 are not to generate mapping information for an indicated building, the routine continues instead to block 890 to perform one or more other indicated operations as appropriate. Such other operations may include, for example, receiving and responding to requests for previously generated computer models and/or floor plans and/or other generated information (e.g., requests for such information for use by an ILMM system, requests for such information for display on one or more client devices, requests for such information to provide it to one or more other devices for use in automated navigation, etc.), obtaining and storing information about buildings for use in later operations (e.g., information about dimensions, numbers or types of rooms, total square footage, adjacent or nearby other buildings, adjacent or nearby vegetation, exterior images, etc.), etc.

After blocks 888 or 890, the routine continues to block 895 to determine whether to continue, such as until an explicit indication to terminate is received, or instead only if an explicit indication to continue is received. If it is determined to continue, the routine returns to block 805 to wait for and receive additional instructions or information, and otherwise continues to block 899 and ends.

Figure 9A:
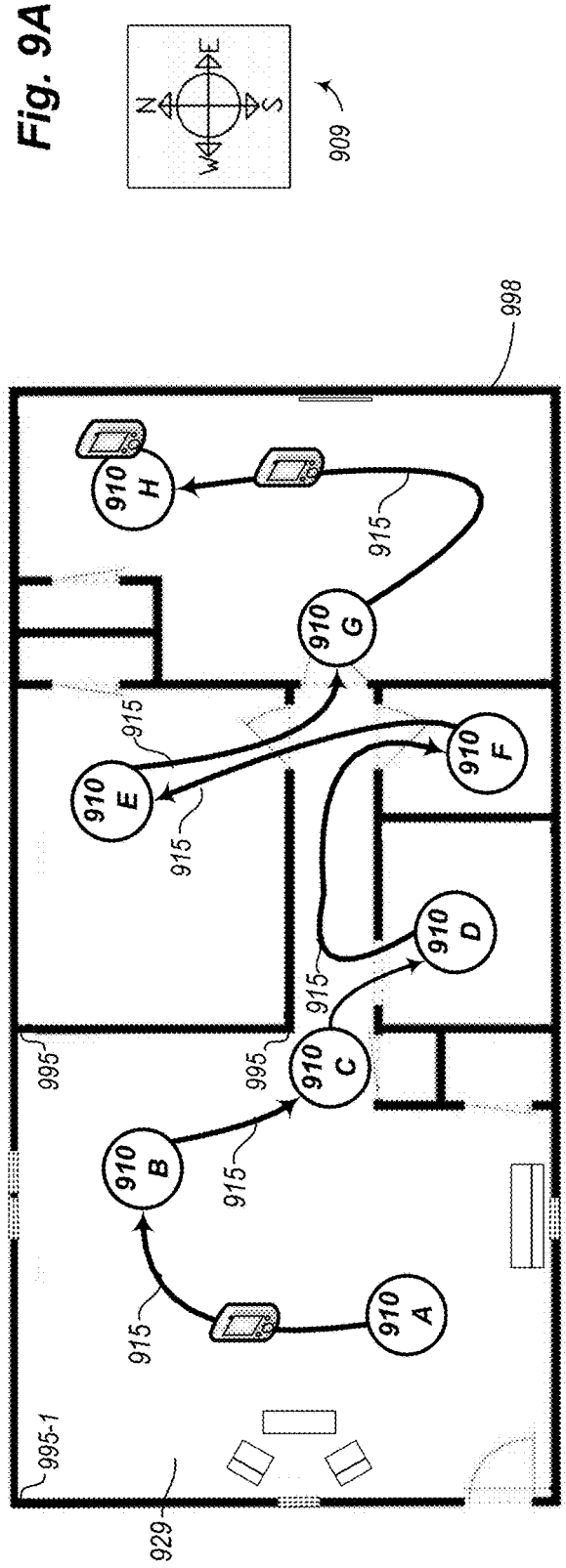
Figure 9A:
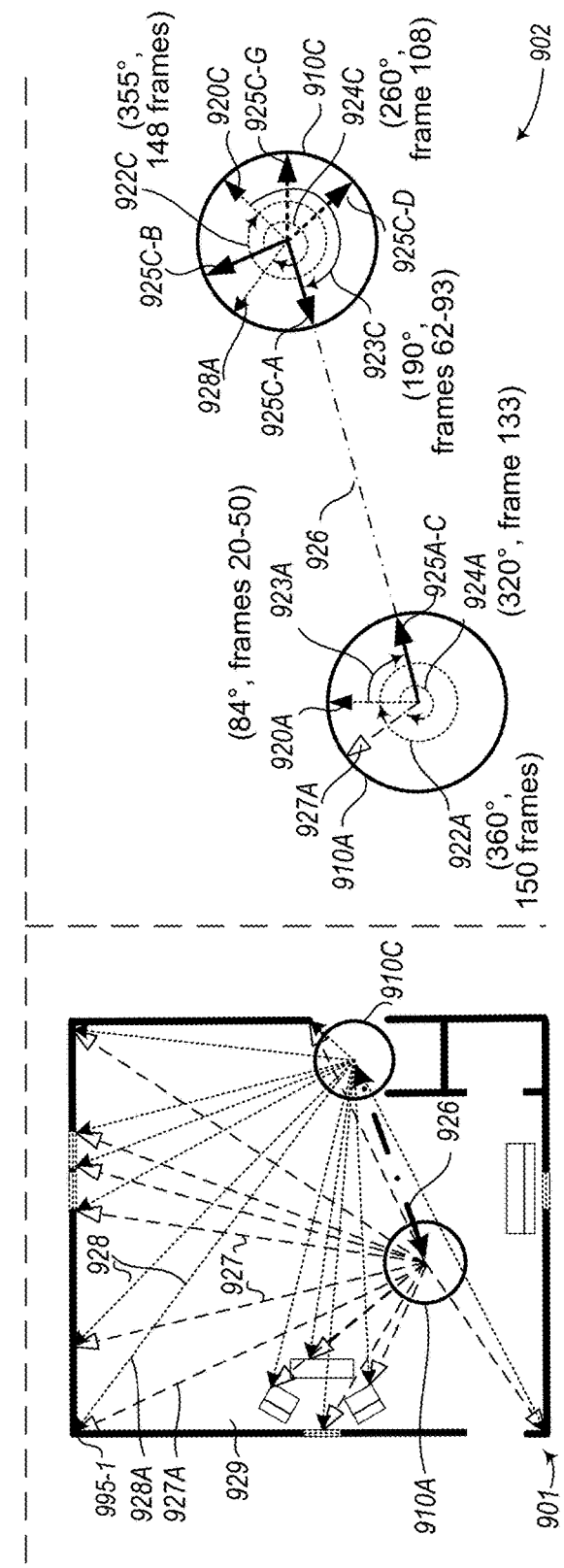

FIGS. 9A-9B illustrate examples of analyzing and using information acquired from an interior of a building in order to generate and provide a representation of that interior, including to determine relative positional information between the viewing locations for use in inter-connecting panorama images or other visual information corresponding to those viewing locations.

In particular, FIG. 9A illustrates building 998 with information shown in room 929 of the building that may be of use in determining connections between panorama images for different viewing locations. In the example of FIG. 9A, the room 929 includes various structural details that may be visible in images (e.g., video frames) captured from viewing locations (e.g., viewing locations within the room 929, such as 910A, 910B, and/or 910C), such as multiple doorways (e.g., with swinging doors), multiple windows, multiple corners or edges 995 (including corner 995-1 in the northwest corner of the building 998, as shown with respect to directional indicator 909), etc. In addition to the structural information in the room 929, the illustrated example further includes additional furniture and other contents in the room 929 that may similarly be used in matching at least some images from different viewing locations, such as a couch, chairs, a table, etc. Furthermore, the building 998 in this example also includes an object on the eastern wall of the building 998, such as may be visible from viewing location 910C (e.g., corresponding to a painting, picture, television, etc.). It will be appreciated that other structural and/or non-structural features may be present and used in image matching in other buildings in other embodiments.

In addition to building 998, FIG. 9A further includes information 901 and 902 to demonstrate examples of using information about overlapping features in frames from two panorama images at two viewing locations in order to determine inter-connection information for the panorama images. In particular, information 901 further illustrates room 929 and how features in the room may be used for image matching for viewing locations 910A and 910C, such as based on structural and/or contents (e.g., furniture) features of the room. As non-exclusive illustrative examples, Information 901 illustrates viewing directions 927 from viewing location 910A that each has an associated frame in the panorama image for that viewing location, with the illustrated viewing directions 927 corresponding to various features in the room 929. Similarly, information 901 also illustrates viewing directions 928 from viewing location 910C that each has an associated frame in the panorama image for that viewing location, with the illustrated viewing directions 928 corresponding to the same features in the room 929 as the viewing directions 927. Using feature 995-1 in the northwest corner of the room 929 as an example, a corresponding viewing direction 927A and associated frame in the direction of that feature from viewing location 910A is shown, and a corresponding viewing direction 928A and associated frame from viewing location 910C to that feature is also shown—given such matching frames/images to the same feature in the room from the two viewing locations, information in those two frames/images may be compared in order to determine a relative rotation and translation between viewing locations 910A and 910C (assuming that sufficient overlap in the two images is available). It will be appreciated that multiple frames from both viewing locations may include at least some of the same feature (e.g., corner 995-1), and that a given such feature may include additional information to that feature (e.g., portions of the west and north walls, the ceiling and/or floor, possible contents of the room, etc.) — for the purpose of this example, the pair of frames/images being compared from the two viewing locations corresponding to feature 995-1 may include the image/frame from each viewing location with the largest amount of overlap, although in actuality each image/frame from viewing location 910A in the approximate direction of 927A that includes any of corner 995-1 may be compared to each image/frame from viewing location 910C in the approximate direction of 928A that includes any of corner 995-1 (and similarly for any other discernible features in the room).

Information 902 of FIG. 9A provides further illustration of how the frames/images in directions 927A and 928A may be used, along with the other matching frames/images between the two viewing locations, in order to determine inter-panorama directions and links to connect the panorama images for the two viewing locations. In particular, information 902 includes representations of viewing locations 910A and 910C, illustrating the directions 927A and 928A from those viewing locations to the structural feature 995-1 of the room 929. The viewing location 910A representation further illustrates that the video capture of information for the panorama image from viewing location 910A begins in direction 920A and, as shown in the information 922A, proceeds in a clockwise manner corresponding to a 360° full rotational turn around a vertical axis, resulting in 150 frames/images being acquired from the viewing location 910A (e.g., 6 frames per second, if the full 360° rotation takes 25 seconds, although other amounts of rotation time and/or frames per second may be used in other situations, such as faster or slower rotation times and/or more or less frames per second). After determining the image/frame of the panorama image for viewing location 910A that includes the feature 995-1 for the purpose of the image/frame matching in this example, information 924A further illustrates that the image/frame is frame 133 of the 150 frames, and it is 320° from the beginning direction 920A. In a similar manner, the visual information captured from viewing location 910C begins in direction 920C, and, as shown in information 922C, proceeds in an almost full rotation around a vertical axis at that viewing location, corresponding to 355° of rotation and 148 frames/images captured. After determining the image/frame of the panorama image for viewing location 910C that includes the feature 995-1 for the purpose of the image/frame matching in this example, information 924C further illustrates that the image/frame is frame 108 of the 148 frames, and it is 260° from the beginning direction 920C.

Based on the analysis of the matching pair of frames/images, the relative rotation between the directions 927A and 928A may be used to determine that the viewing locations 910A and 910C are located in direction 926 from each other (shown in this example as a single 2-way direction, such as to include a direction 926a, not shown, from viewing location 910A to viewing location 910C, and an opposite direction 926B, also not shown, from viewing location 910C to viewing location 910A), as well as a distance (not shown) for the translation between the viewing locations. Using the determined direction 926, a corresponding inter-panorama link 925A-C is created (in direction 926a) for the panorama image from viewing location 910A to represent viewing location 910C and its panorama image, with information 923A indicating that the resulting rotation from starting direction 920A is 84° and is centered at frame 35 of the 150 frames (with 15 frames in each direction also including viewing location 910C, resulting in frames 20-50 of viewing location 910A's panorama image including a displayed inter-panorama link in direction 926a to the associated panorama image for viewing location 910C). Similarly, using the determined direction 926, a corresponding inter-panorama link 925C-A is created (in direction 926b)

for the panorama image from viewing location 910C to represent viewing location 910A and its panorama image, with information 923C indicating that the resulting rotation from starting direction 920C is 190° and is centered at frames 77 and 78 of the 148 frames (with 15 frames in each direction also including viewing location 910A, resulting in frames 63-93 of viewing location 910C's panorama image including a displayed inter-panorama link in direction 926*b* to the associated panorama image for viewing location 910A).

While the direction 926 is discussed in information 902 with respect to a single pair of frames 133 and 108 (from viewing locations 910A and 910C, respectively), it will be appreciated that viewing locations such as 910A and 910C in a single room (or otherwise with direct viewing information to each other) will typically have numerous pairs of matching frames/images that each include overlapping information, and may each be used to similarly determine respective values for the relative positional rotation and translation between the two viewing locations (such as based on the directions 927 and 928 in information 901 as a small example subset of matching frames/images). As discussed in greater detail below, the information from multiple such matching frames/image pairs may be combined in order to determine an overall relative rotation and translation between the two viewing locations, with the confidence in the resulting overall values typically growing as the number of matching frames/images to be analyzed increases. In other embodiments, image mapping may be performed using only structural features, only furniture or other objects within a room, and/or one or both of those types of information in combination with other additional types of feature information that are discernible in images from different locations.

The example information 902 further illustrates additional inter-panorama connections to other viewing locations from viewing location 910C that may be determined based on overlapping corresponding matching frames/images from viewing location 910C and those other viewing locations, with resulting generated inter-panorama links being shown. In particular, the additional inter-panorama links include an inter-panorama link 925C-B in a determined direction to viewing location 910B, an inter-panorama link 925C-D in a determined direction to viewing location 910D (e.g., if sufficient image overlap is available for images from both viewing locations along the north wall of the hallway moving east-west through the building 998), and an inter-panorama link 925C-G in a direction to viewing location 910G (e.g., if sufficient information overlaps in the images from the two viewing locations along that hallway, along the eastern wall of the building 998 where object is present, and/or along the western wall of the building to include images of chairs, table, and nearby window). While it is possible that sufficient overlap may be present from other viewing locations to that of viewing location 910C to enable relative positional information to be determined from overlapping image information, such as for one or more of viewing locations 910E, 910F, and/or 910H, the general lack of overlap in visual information from the respective viewing locations may prevent such a determination using that information in the current example, and one or both of viewing locations 910D and 910G may similarly lack sufficient information to determine their respective inter-panorama links (or to determine the directions for such inter-panorama links with only low confidence values). Also, while viewing location 910A includes only a single inter-panorama link 925A-C in information 902 in this example, it will be appreciated that an additional inter-panorama link between viewing locations 910A and 910B may be determined in a manner similar to that discussed with respect to that of viewing locations 910A and 910C.

FIG. 9B continues the example of FIG. 9A, and in particular illustrates information 903 regarding similar types of inter-panorama rotation and distance information that may be determined corresponding to the viewing locations from which the panorama images are taken, but with the determination in FIG. 9B being based on analyzing linking information corresponding to a travel path that a user takes between viewing locations (whether in addition to or instead of using connection information determined from image/frame mapping as discussed with respect to FIG. 9A).

In particular, the information 903 of FIG. 9B illustrates viewing locations 910A, 910B, and 910C, and also shows travel path information 935*a* indicating a path of the user moving from viewing location 910A to viewing location 910B, and travel path information 935*b* indicating a path of the user subsequently moving from viewing location 910B to 910C. It will be appreciated that the order of obtaining the linking information may vary, such as if the user instead started at viewing location 910B and captured linking information as he or she traveled along path 935*b* to viewing location 910C, and later proceeding from viewing location 910A to viewing location 910B along travel path 935*a* with corresponding linking information captured (optionally after moving from viewing location 910C to 910A without capturing linking information). The information 903 includes some of the information 902 previously illustrated in FIG. 9A, and includes some additional information (e.g., regarding viewing location 910B), but some details are omitted in FIG. 9B relative to FIG. 9A for the sake of clarity —for example, information 920A is shown to illustrate the starting direction from which the video data is captured at viewing location 910A, but details such as information 922A about the number of frames and degrees of coverage captured for the resulting panorama image are not illustrated.

In addition, information 903 of FIG. 9B illustrates additional details about the user travel paths 935*a* and 935*b*, such as to indicate that the user departs from the viewing location 910A at a point 937 in a direction that is just west of due north (as illustrated with respect to directional indicator 909), proceeding in a primarily northward manner for approximately a first half of the travel path 935*a*, and then beginning to curve in a more easterly direction until arriving at an incoming point 938 to viewing location 910B in a direction that is mostly eastward and a little northward. In order to determine the departure direction from point 937 more specifically, including relative to the video acquisition starting direction 920A for viewing location 910A, initial video information captured as the user travels along travel path 935*a* may be compared to the frames of the panorama image for viewing location 910A in order to identify matching frames/images (in a manner similar to that discussed with respect to FIG. 9A and elsewhere for comparing frames/images from different viewing locations)—in particular, by matching one or more best frames in that panorama image that correspond to the information in the initial one or more video frames/images taken as the user departs from point 937, the departure direction from point 937 may be matched to the viewing direction for acquiring those matching panorama images. While not illustrated, the resulting determination may correspond to a particular degree of rotation from the starting direction 920A to the one or more matching frames/images of the panorama image for that departure direction. In a similar manner, in order to determine the arrival direction at point 938 more specifically, including relative to the video acquisition starting direction 920B for viewing location 910B, final video information captured as the user travels along travel path 935a may be compared to the frames of the panorama image for viewing location 910B in order to identify matching frames/images, and in particular to frames/images in direction 939 (opposite to the side of viewing location 910B at which the user arrives).

While such departure direction and arrival direction would match the actual relative direction 932 between the viewing locations 910A and 910B (with direction 932 being a two-way direction in a manner similar to that of direction 926 of FIG. 9A, including the direction of inter-panorama link 925A-B from viewing location 910A to 910B and the direction of inter-panorama link 925B-A from viewing location 910B to 910A) if the travel path 935a was completely straight, that is not the case here. Instead, in order to determine the direction 932, acceleration data captured as part of the linking information for the travel path 935a is analyzed to identify user velocity and location along the travel path 935a, in order to model the resulting relative locations of the travel path between starting point 937 and arrival point 938. Information 906 and 907 illustrates examples of such analysis of corresponding acceleration data captured along the travel path 935a, with information 906 corresponding to acceleration and velocity in a north-south direction, and information 907 corresponding to acceleration and velocity in an east-west direction—while not illustrated here, in some embodiments further information will be determined for acceleration and velocity in a vertical direction, such as to manage situations in which a user ascends or descends stairs or otherwise changes a vertical height (e.g., along a ramp) as he or she moves along the travel path. In this example, referring to information 906 corresponding to the north-south direction, the acceleration data acquired (e.g., from one or more IMU units in a mobile device carried by the user) illustrates that there is an initial significant acceleration spike in the northerly direction as the user began moving, which then drops to near zero as the user maintains a constant velocity in a generally northern direction along the middle portion of the travel path 935a, and then begins a longer but less sharp acceleration in the southerly direction as the user curves to a primarily easterly direction toward viewing location 910B and decelerates at arrival. As discussed in greater detail elsewhere herein, the acceleration data is integrated to determine corresponding north-south velocity information, as further illustrated in information 906, and is then further integrated to determine location information for each data point (not shown in information 906 in this example, but corresponding to the illustrated travel path 935a). By combining the determined velocity and location information, an amount of north-south movement by the user along travel path 935a may be determined, corresponding to an aggregate amount of north-south distance traveled between viewing locations 910A and 910B. In a similar manner, information 907 illustrates acceleration and velocity information in an east-west direction for the travel path 935a as the user moves along the travel path, with the resulting double integration in velocity and location data providing an aggregate amount of east-west distance that the user travels along the travel path 935a. By combining the aggregate north-south and east-west distances (and assuming in this example that no height change occurred) with the determined departure and arrival information, a total distance traveled between viewing locations 910A and 910B in a corresponding direction 932 is determined.

While a similar user travel path 935b is illustrated from viewing location 910B to 910C, with similar acceleration data captured as part of its linking information, corresponding acceleration and velocity information is not illustrated for the travel path 935b in a manner analogous to that of information 906 and 907. However, based on a similar analysis of departing direction from viewing location 910B, arrival direction at viewing location 910C, and intervening velocity and location for some or all data points for which acceleration data is captured along the travel path 935b, the user's movement for travel path 935b may be modeled, and resulting direction 931 and corresponding distance between viewing locations 910B and 910C may be determined. As a result, inter-panorama link 925B-C may be generated for the panorama image generated at viewing location 910B in a direction 931 to viewing location 910C, and similarly, inter-panorama link 925C-B may be determined for the panorama generated at viewing location 910C in direction 931 to viewing location 910B.

Despite the lack of linking information captured between viewing locations 910A and 910C (e.g., because the user did not travel along a path between those viewing locations, because linking information was not captured as a user did travel along such a path, etc.), information 903 further illustrates an example of direction 926 that may optionally be determined between viewing locations 910A and 910C based on the analysis of linking information for travel paths 935a and 935b (and with corresponding inter-panorama links 925A-C and 925C-A in direction 926). In particular, even if an absolute location of viewing locations 910A, 910B and 910C are not known from the analysis of the linking information for travel paths 935a and 935b, relative locations of those viewing locations may be determined in a manner discussed above, including distances and directions between viewing locations 910A and 910B and between viewing locations 910B and 910C. In this manner, the third side of the resulting triangle having determined lines 932 and 931 may be determined to be line 926 using geometrical analysis, despite the lack of direct linking information between viewing locations 910A and 910C. It will be further noted that the analysis performed with respect to travel paths 935a and 935b, as well as the estimation of direction and distance corresponding to 926, may be performed regardless of whether or not viewing locations 910A, 910B and/or 910C are visible to each other—in particular, even if the three viewing locations are in different rooms and/or are obscured from each other by walls (or by other structures or impediments), the analysis of the linking information may be used to determine the relative locations discussed above (including directions and distances) for the various viewing locations. It will be appreciated that the techniques illustrated with respect to FIGS. 9A and 9B may be continued to be performed for all viewing locations in building 998, resulting in a set of linked panorama images corresponding to viewing locations 910A-H, or otherwise in other similar buildings or other structures.

The following discussion provides example details regarding particular embodiments for determining inter-panorama connection information—however, it will be appreciated that the details presented are for illustrative purposes, and other embodiments may be performed in other manners.

As discussed in greater detail with respect to FIG. 9A and elsewhere, connections between at least some panorama images may be determined in part or in whole based on matching frames/images corresponding to those panorama images. Such techniques may be of particular use if the scene is rich in visual texture/features, and the two panoramas' viewing locations have direct line-of-sight to each other.

Consider, as an example, two panorama images 0 and 1, with panorama image 0 including a sequence of frames I-00, I-01, I-02, I-03, . . . I-0m and having respective angles a-00, a-01, a-02, a-03, . . . a-0m with respect to that panorama image's starting video acquisition direction, and with panorama image 1 including a sequence of frames I-10, I-11, I-12, I-13, . . . I-1n and having respective angles a-10, a-11, a-12, a-13, . . . a-1n with respect to that panorama image's starting video acquisition direction. The results of analyzing the matching frames/images between the panorama images includes determining whether the two panorama images are visually connected, and if so, what is the orientation angle A-01 in panorama image 0 toward panorama image 1, and what is the orientation angle A-10 in panorama image 1 toward panorama image 0.

As one technique for calculating such orientation angles A-01 and A-10, every frame from panorama image 0 is compared with every frame from panorama image 1, to see if they are visually connected. So if there are m frames in panorama image 0, and n frames in panorama image 1, m x n comparisons will be performed. For each comparison of such an image pair, a check is performed of whether the two images have sufficient visual feature matches to determine relative position information. To do so, visual feature locations of each of the two images are first detected, such as by using one or more of existing SIFT, MSER, FAST, KAZE, etc. feature detectors. Feature descriptor vectors are then calculated around the detected feature location neighborhood to describe the feature, such as by using one or more of existing SIFT, BRIEF, ORB, AKAZE etc. feature descriptors. A check is then made between the two images in the image pair for whether a feature descriptor from one image has a similar feature descriptor in the other image, and if so that feature pair forms a putative feature pair—in so doing, a feature descriptor is similar to another feature descriptor, when the descriptors have a short distance in the vector space (e.g., below a defined distance threshold, such as using L2 distance, L1 distance, Hamming distance for binary descriptors, etc.), and a frame pair has enough putative feature matches if they satisfy or exceed a defined feature match threshold.

Comparison of an image pair may in some embodiments include computing a homography matrix (referred to as "H" in this example) and/or an essential matrix (referred to as "E" in this example). If two images I-0i and I-1j of a putative matching image pair are looking at a planar surface (2D surface in the 3D world, such as a wall with some pictures on it), and if 4 pairs of putative feature matches exist given the matching locations on the images, a Homography matrix H can be recovered such that for any pair of features (p0x, p0y) in I-0i and (p1x, p1y) in I-1j, H can be applied to (p0x, p0y) to directly compute the location of the corresponding feature (p1x, p1y) in I-1j. If more than 4 pairs of putative feature matches exist that are all true matching features, a least square solution of H can be computed—in addition, if some of the putative matches are outliers, Random Sampling Consensus algorithm ("RANSAC") can be performed to achieve a robust estimation of H. If the two images I-0i and I-1j of a putative matching image pair are looking at a scene with 3D objects rather than a 2D surface (e.g., a room corner where two walls and a floor meet), and if 5 pairs of putative feature matches exist given the matching locations on the images, an Essential matrix E can be recovered such that for any pair of features (p0x, p0y) in I-0i and (p1x, p1y) in I-1j, (p0x, p0y) from I-0i can be mapped with E to the neighborhood of (p1x, p1y) in I-1j. The neighborhood is defined as closeness to the epipolar lines of (p1x, p1y) in I-1j, with those epipolar lines defined as lines connecting (p1x, p1y) and the epipole in I-1j, where the epipole is the projection of I-0i's camera center (the optical center 3D location of the camera which took the picture of I-0i) onto the image of I-1j. If more than 5 pairs of putative feature matches exist are all true matching features, a least square solution of E can be computed—n addition, if some of the putative matches are outliers, RANSAC can be performed to achieve a robust estimation of E. Once the H or E matrix is computed, the quantity of feature pairs that are actually inliers can be counted, and if smaller than a defined threshold (e.g., 15), the image pair is discarded for further evaluation as being unlikely to be a valid pair looking at the same region of a scene. Given Essential matrix E or Nomography matrix H and the camera parameters (intrinsics) which took the pictures I-0i, and I-1j, E or H can be decomposed into a relative rotation 3-by-3 matrix R and relative translation 3-by-1 vector T between the two camera locations (there may be up to four mathematical solution sets of the decomposition, at least two of which may further be invalidated if point correspondences are available by applying positive depth constraint, if all points are in front of both cameras). Additional details for computing H from corresponding feature locations, for computing E from corresponding feature locations, for performing least square solutions, for performing RANSAC, and for decomposing matrix E into matrix R and vector T are included in Multiple View Geometry in Computer Vision, $2^{nd}$ Edition, Richard Hartley and Andrew Zisserman, Cambridge University Press, 2004. Additional details for decomposing matrix H into matrix R and vector T are included in Deeper Understanding Of The Nomography Decomposition For Vision-Based Control, Ezio Malis and Manuel Vargas, Research Report RR-6303, INRIA, 2007, pp. 90.

Since information about whether an image pair is looking at a 2D planar surface (e.g. a wall) or a full 3D scene (e.g. a room corner) is not typically available in advance of analysis of the image pair, both H and E matrices of any given image pair are computed in some embodiments. The remaining solution sets can be further evaluated in two aspects: (1) reprojection error, in which given a pair of rotation and translation and feature correspondence locations on the two images, the 3D feature locations can be computed using a method called triangulation; and (2) rotational axis check, in which the relative rotation between any two given image pairs should be around a vertical rotational axis if users are holding the cameras vertically, and any solution set that does not have a rotation whose rotational axis is close to a vertical direction can be filtered out. The basic idea of reprojection error is to project the viewing rays of the feature back into the 3D space, with the 3D location being where the two viewing rays of the same feature from the two cameras meet or intersect, and with further details regarding performing robust triangulation available in Multiple View Geometry in Computer Vision, $2^{nd}$ Edition, as indicated above. The 3D points can then be reprojected onto the images again, to check how close the reprojections are to the original feature locations found in the feature detection step, and with the matrix R and vector T solution set with the best performance selected as the mostly likely true solution to the image pair. Solution sets passing the aforementioned two evaluation criteria are considered valid solutions, and an image pair with at least one valid solution set is considered a valid image pair for further angle computation.

Figure 10A:
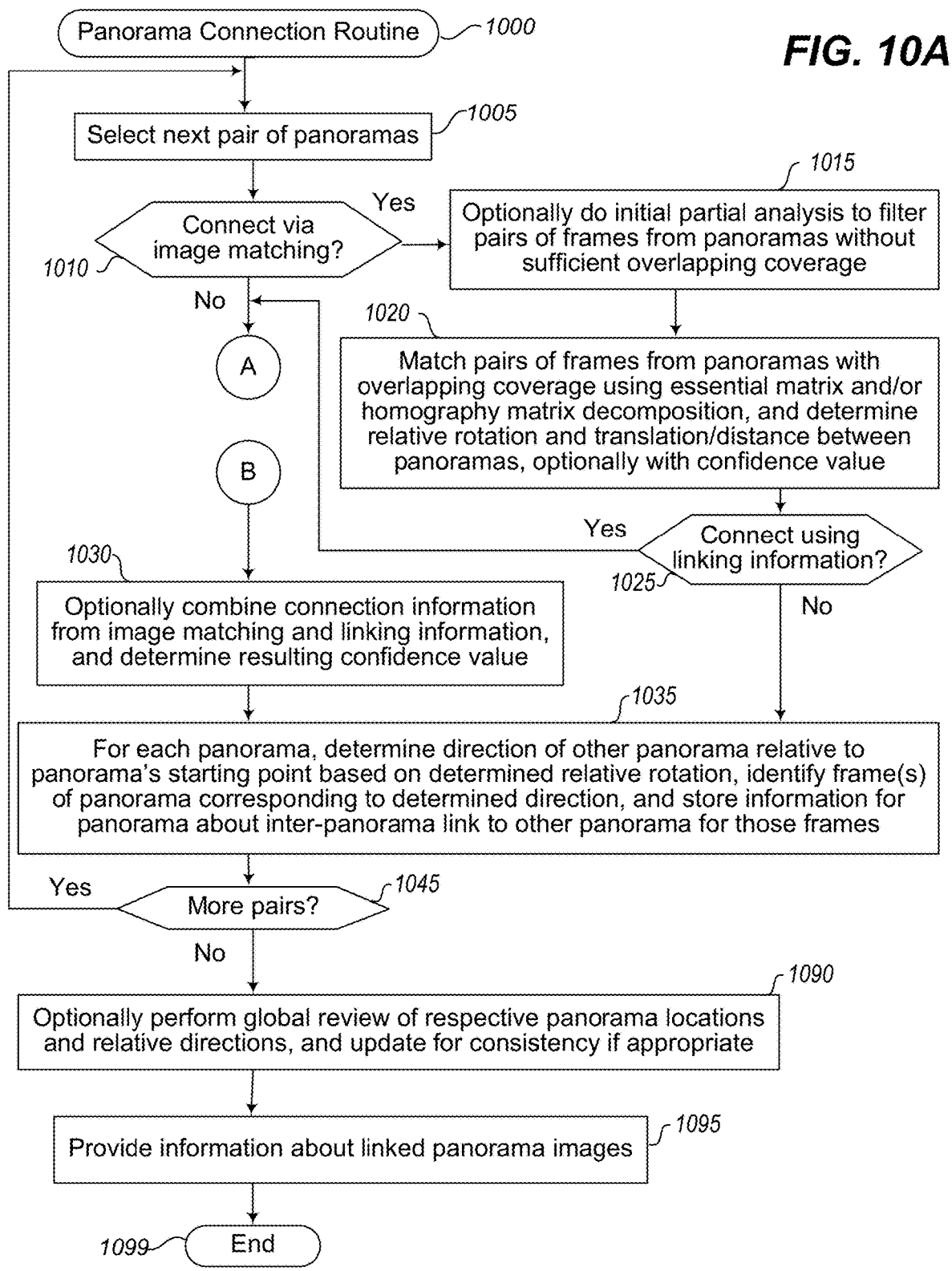

FIGS. 10A-10B illustrate an example flow diagram for an embodiment of a Panorama Connection routine 1000, such as to determine inter-panorama connection information based on using captured linking information and/or image/feature matching. In addition, the routine may be initiated in various manners in various embodiments.

In the illustrated embodiment, the routine begins at block 1005, where a next pair of panorama images is selected to be analyzed for inter-connection information, beginning with a first pair that includes the first and second panorama images corresponding to the first and second viewing locations in a sequence of multiple viewing locations within a house, building or other structure. The routine then continues to block 1010 to determine whether to attempt to determine connection information between the pair of panorama images via image/feature matching, such as based on overlap of features in images/frames from the two panorama images, and if so, continues to block 1015. It will be appreciated that in some embodiments, connection determination via image/feature matching may not be performed, such as if all connection information between pairs of panorama images is determined using captured linking information, as discussed in greater detail with respect to blocks 1055-1070.

In the illustrated embodiment, the routine in block 1015 begins by optionally filtering pairs of frames/images from the panorama images (e.g., corresponding to individual frames from a video used to construct the panorama images) that do not have sufficient overlapping coverage, although in other embodiments each image/frame in one of the two panoramas may be compared to each image/frame in the other of the two panorama images to determine an amount of overlap, if any, between the pair of images. In the illustrated embodiment, the routine continues to block 1020 from block 1015, where it matches non-filtered pairs of frames/images from the two panorama images with overlapping coverage using one or both of essential matrix and/or homography matrix decomposition processing techniques, although other processing techniques may be used in other embodiments. In addition, the routine may optionally select in block 1020 whether to retain and use results for each pair from only one of essential matrix processing and homography matrix decomposition processing if both are performed, such as depending on whether information in the pair of frames corresponds to a flat planar surface or instead as information in a 3D space. In other embodiments, results from both essential matrix processing and homography matrix decomposition processing may be retained and used, or instead only one of the two (and possibly other) types of processing may be used. The routine further continues in block 1020 to determine relative rotation and translation/distance between the viewing locations for the two panorama images from the results of the one or more processing techniques, optionally by combining results from multiple matching image/frame pairs to determine aggregate consensus inter-panorama connection information, and optionally computing a confidence value in the resulting information, as discussed in greater detail elsewhere herein.

After block 1020, the routine continues to block 1025 to determine whether to attempt to also connect the two panorama images via analysis of captured linking information along a travel path that the user took between the viewing locations corresponding to the two panorama images. If so, or if it is instead determined in block 1010 to not attempt to connect the two panorama images via image matching, the routine continues to perform blocks 1050-1070 to use such linking information to determine relative rotation and location/direction/distance between the panorama images. In particular, the routine determines in block 1050 whether the two panorama images are consecutive images in the sequence, such that linking information is available for a travel path that the user travels between the two viewing locations corresponding to the two panorama images, and if not continues to block 1030. Otherwise, the routine continues to block 1055 to obtain that linking information for that travel path, including acceleration data from the mobile device IMU sensor unit(s), and optionally video information as well if available.

After block 1055, the routine continues to block 1060 to determine the departure direction of leaving the viewing location corresponding to the start panorama image and the arrival direction of arriving at the viewing location of the end panorama image, using video information if available to match initial video information for the departure to one or more corresponding frames of the start panorama image and to match final video information for the arrival to one or more corresponding opposite-side frames of the end panorama image. If video information is not available, leaving and arrival directions may be determined in other manners, such as based solely on analysis of the captured acceleration data and/or other location information for the mobile device. After block 1060, the routine continues to block 1065 to analyze the acceleration data in the captured linking information along the travel path —in particular, for each acceleration data point, a double integration operation is performed to determine first velocity and then location corresponding to that acceleration data point, including in the illustrated embodiment to determine corresponding velocity and location for each of x, y, and z axes in three dimensions. In block 1070, the routine then combines the determined velocity and location for each of the acceleration data points to form a modeled travel path, along with the determined leaving/arriving directions, and uses the resulting information to determine relative rotation and location/distance between the panorama images, optionally with a corresponding confidence value.

After block 1070, or if it instead determined in block 1050 that the two panorama images do not have captured linking information for a travel path between them, the routine continues to block 1030 to, if connection information is available from both image matching and linking information, combine the information into a final determined aggregate relative direction and distance/location for the panorama images, along with the resulting confidence value from the combination. After block 1030, or if it is instead determined in block 1025 to not use linking information to connect the two panorama images, the routine continues to block 1035 to, for each panorama in the pair and based on the determined relative position information, determine a direction of the other panorama relative to the current panorama starting point, identify one or more frames in the current panorama that correspond to that determined direction, and store information for the current panorama about an inter-panorama link to the other panorama for those one or more frames.

After block 1035, the routine continues to block 1045 to determine whether there are more pairs of panorama images to analyze, and if so, returns to block 1005 to select the next such pair. In some embodiments, each consecutive pair of panorama images in the sequence of viewing locations is analyzed, and then some or all other pairs of panorama images that do not have corresponding linking information based on a travel path between those viewing locations are considered, so as to determine and provide inter-panorama connection information for all pairs of panorama images for which information is available. As discussed in greater detail elsewhere herein, in some embodiments, some links between pairs of panoramas may not be provided even if they may be calculated, however, such as to provide inter-panorama links upon display to an end user only for a subset of panorama pairs (e.g., corresponding to panorama pairs that are visible to each other, or near each other within a defined distance, or otherwise satisfy one or more specified criteria).

If it is instead determined in block 1045 that there are no more pairs of panorama images to consider, the routine continues to block 1090 to optionally perform a global review of the respective panorama locations and the relative directions between them for overall consistency, and to update that determined information as appropriate, as discussed in greater detail elsewhere. If so, such an update may include updating the stored information for one or more panoramas about one or more inter-panorama links from that panorama to one or more other panoramas. After block 1090, the routine continues to block 1095 to provide information about the determined linked panorama images, and continues to block 1099 and ends.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited by those claims. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. A computer-implemented method comprising:
   obtaining, by one or more computing devices, a video taken along a path through multiple rooms of a building and a sequence of images captured at a plurality of acquisition locations in the multiple rooms, wherein the images of the sequence include a plurality of panorama images that each has 360 degrees of horizontal coverage around a vertical axis and further includes multiple images in each of the multiple rooms;
   generating, by the one or more computing devices, a floor map of the building based at least in part on positioning estimated room shapes relative to each other, including:
      determining, by the one or more computing devices using the sequence of images and without using any acquired depth information about a depth from the plurality of acquisition locations to walls of the multiple rooms, an estimated room shape of each of the multiple rooms by, for each of the multiple rooms:
         analyzing, from the sequence of images, the multiple images in the room to detect features of the room that include at least one connecting passage to another room, and to determine planar surfaces for the room that are associated with at least some of the detected features of the room; and
         using information about the determined planar surfaces for the room to identify estimated positions of the walls of the room, and connecting the estimated positions of the walls to generate the estimated room shape of the room; and
      determining, by the one or more computing devices and based at least in part on visual data from the video, relative positional information for at least some of the plurality of acquisition locations, including determining, for each of multiple pairs of acquisition locations, at least a direction between the acquisition locations of that pair; and
      arranging, by the one or more computing devices, the estimated room shapes for the multiple rooms relative to each other to produce the floor map, including using the determined relative positional information and constraining locations of the estimated room shapes in the floor map based at least in part on connecting passages between rooms; and
   presenting, by the one or more computing devices, the floor map of the building on one or more client devices, to cause use of the displayed floor map of the building for navigating the building.

2. The computer-implemented method of claim 1 wherein, for each of the multiple rooms, the analyzing of the multiple images in that room includes determining normal directions that are orthogonal to the planar surfaces for that room, and the using of the information about the determined planar surfaces for the room to identify the estimated positions of the walls of the room includes combining of the determined normal directions for the room by at least one of using constraints that include the walls of the room being flat and include corners of the room having right angles between two of the walls, or of applying machine learning techniques to determine the identified estimated positions of the walls of the room from the determined normal directions for the room.

3. The computer-implemented method of claim 1 wherein the presenting of the floor map further includes:
- transmitting, by the one or more computing devices, the floor map to one of the client devices for display to a user in a graphical user interface on the one client device along with user-selectable controls;
- receiving information about a selection by the user of one of the user-selectable controls; and
- displaying, to the user and in response to the selection, at least one of the following:
  - one or more frames of the video that correspond to a location along the path corresponding to the selection; or
  - a three-dimensional model of the building that is generated based at least in part on adding estimated height information for one or more of the multiple rooms to the floor map; or
  - an additional image captured at a location on the floor map corresponding to the selection; or
  - a textual annotation associated with at a location on the floor map corresponding to the selection; or
  - information about an additional story of the building that is different than a story of the building initially displayed during the presenting of the floor map and that corresponds to the selection; or
  - information indicating a room type for one of the multiple rooms that corresponds to the selection, wherein the room type is further determined based at least in part on the analyzing of the multiple images in that one room.

4. A non-transitory computer-readable medium having stored contents that cause one or more computing devices to perform automated operations including at least:
- obtaining, by the one or more computing devices, a video taken along a path through multiple rooms of a building and a sequence of images captured at a plurality of acquisition locations in the multiple rooms, wherein the images of the sequence include a plurality of panorama images and further includes at least one image in each of the multiple rooms;
- generating, by the one or more computing devices, a floor map of the building based at least in part on positioning estimated room shapes relative to each other, including:
  - determining, by the one or more computing devices using the sequence of images, estimated room shapes for the multiple rooms by analyzing the images of the sequence to detect features in the multiple rooms and to determine planes associated with at least some of the detected features, by identifying estimated positions of walls of the multiple rooms based at least in part on the determined planes, and by connecting the estimated positions of the walls to generate the estimated room shapes for the multiple rooms;
  - determining, by the one or more computing devices and based at least in part on visual data from the video, relative positional information for at least some of the plurality of acquisition locations, including determining, for each of multiple pairs of acquisition locations, at least a direction between the acquisition locations of that pair; and
  - arranging, by the one or more computing devices, the estimated room shapes for the multiple rooms relative to each other to produce the floor map, including using the determined relative positional information; and
- providing, by the one or more computing devices, the floor map of the building for further use.

5. The non-transitory computer-readable medium of claim 4 wherein the video and the images of the sequence are acquired using one or more visual capture devices, wherein the stored contents include software instructions that, when executed, program the one or more computing devices to select at least some of the images of the sequence from a subset of a plurality of frames of the video, and wherein the automatic generating of the floor map is further performed without using any depth information acquired by the visual capture devices to any surrounding objects.

6. The non-transitory computer-readable medium of claim 4 wherein determining of the estimated room shape for one of the multiple rooms includes generating, using a Structure-From-Motion analysis of multiple images captured in that one room, a three-dimensional point cloud for that one room that includes a plurality of three-dimensional points along walls of that one room, and using the generated three-dimensional point cloud for that one room as part of generating the estimated room shape of that one room.

7. The non-transitory computer-readable medium of claim 6 wherein the using of the generated three-dimensional point cloud for the one room includes using data from the generated three-dimensional point cloud as part of at least one of detecting the features of that one room or of determining planes for that one room.

8. The non-transitory computer-readable medium of claim 6 wherein determining of planes for the one room includes determining normal directions for at least some features detected for that one room, and wherein the using of the generated three-dimensional point cloud for the one room includes using combined determined normal directions for that one room to identify portions of the generated three-dimensional point cloud that correspond to each of the walls of that one room.

9. The non-transitory computer-readable medium of claim 4 wherein determining of the estimated room shape for one of the multiple rooms includes analyzing, by the one or more computing devices and without using any depth information acquired during capturing of the video or capturing of the images of the sequence, visual data of the at least one image in that one room to determine normal directions for at least some features detected for that one room, and using the determined normal directions as part of identifying the estimated positions of the walls of that one room.

10. The non-transitory computer-readable medium of claim 4 wherein determining of the estimated room shape for one of the multiple rooms further includes determining, separately for each of multiple images captured in that one room, estimated positions of the walls of that one room using normal directions determined from analysis of that image, and further includes projecting pixel data from at least one of the multiple images for that one room onto the estimated positions of the walls of that one room that are determined for at least one other image of the multiple images for that one room, and further includes measuring an amount of reprojection error from the projecting.

11. The non-transitory computer-readable medium of claim 4 wherein the panorama images are taken by a capture device that includes one or more lenses aggregately providing 360° of simultaneous horizontal coverage around a vertical axis, and wherein each of the panorama images has 360° of horizontal coverage around a vertical axis.

12. The non-transitory computer-readable medium of claim 4 wherein the determining of the estimated room shapes for the multiple rooms involves using constraints that include walls being flat and include corners of a room having right angles between two walls of the room.

13. The non-transitory computer-readable medium of claim 4 wherein the determining of the estimated room shapes for the multiple rooms includes applying machine learning techniques to determine the identified estimated positions of walls of a room based at least in part on determined normal directions for the room.

14. The non-transitory computer-readable medium of claim 4 wherein the providing of the floor map further includes:
  transmitting, by the one or more computing devices, the floor map to a client device for display to a user in a graphical user interface on the client device along with user-selectable controls;
  receiving information about a selection by the user of one of the user-selectable controls corresponding to a location along the path; and
  displaying, to the user and in response to the selection, one or more frames of the video corresponding to the location along the path.

15. The non-transitory computer-readable medium of claim 4 wherein the generating of the floor map further includes generating, by the one or more computing devices, a three-dimensional model of the building based at least in part on adding estimated height information for one or more of the multiple rooms to the floor map, and wherein the providing of the floor map further includes presenting at least a portion of the three-dimensional model.

16. The non-transitory computer-readable medium of claim 4 wherein the providing of the floor map includes presenting at least a portion of the floor map to a user in a graphical user interface and further includes at least one of:
  receiving information about a first user selection of a first location on the floor map at which an additional image was captured, and presenting the additional image in response to the first user selection; or
  receiving information about a second user selection of a second location on the floor map with which a textual annotation is associated, and presenting the textual annotation in response to the second user selection; or
  receiving information about a third user selection of a user-selectable control on the floor map associated with an additional story of the building that is different than a story of the building initially displayed during the presenting of the at least portion of the floor map, and presenting at least some of the floor map for the additional story in response to the third user selection; or
  presenting information on the floor map that indicates a room type for one of the multiple rooms, wherein the room type is further determined based at least in part on the analyzing of the at least one images in that one room.

17. The non-transitory computer-readable medium of claim 4 wherein the automated operations further include using, by the one or more computing devices, the floor map to further control navigation activities by an autonomous vehicle, including providing the floor map for use by the autonomous vehicle in moving between the multiple rooms of the building.

18. A system comprising:
  one or more hardware processors of one or more computing devices; and
  one or more memories with stored instructions that, when executed by at least one of the one or more hardware processors, cause at least one of the one or more computing devices to perform automated operations including at least:
    obtaining a group of images that include multiple panorama images taken at a plurality of acquisition locations in multiple rooms of a building and one or more videos taken in the multiple rooms;
    determining estimated room shapes for the multiple rooms by analyzing the panorama images of the group to detect features in the multiple rooms that include connecting passages between rooms and to determine planar surfaces, by combining the determined planar surfaces to identify estimated positions of walls of the multiple rooms, and by connecting the estimated positions of the walls to generate the estimated room shapes for the multiple rooms;
    determining, based at least in part on visual data from the one or more videos, relative positional information for at least some of the plurality of acquisition locations, including determining direction between at least some pairs of acquisition locations;
    arranging, based at least in part on the determined relative positional information and information about the connecting passages between rooms, the estimated room shapes for the multiple rooms relative to each other to produce a floor map of the building; and
    providing the floor map of the building to one or more client devices.

19. The system of claim 18 wherein the stored instructions include software instructions that, when executed, program the at least one computing device to perform the determining of the estimated room shapes and the determining of the relative positional information without using any depth information acquired during capturing of the multiple panorama images or of the one or more videos.

20. The system of claim 19 wherein the one or more computing devices include a client device in use by an end user, and wherein the providing of the floor map further includes displaying the floor map to the end user in a graphical user interface on the client device, for use in navigating the building.

* * * * *